(12) United States Patent
Levien et al.

(10) Patent No.: US 9,002,937 B2
(45) Date of Patent: Apr. 7, 2015

(54) MULTI-PARTY MULTI-MODALITY COMMUNICATION

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 262 days.

(21) Appl. No.: 13/374,468

(22) Filed: Dec. 28, 2011

(65) Prior Publication Data

US 2013/0078975 A1    Mar. 28, 2013

Related U.S. Application Data

(63) Continuation-in-part of application No. 13/200,741, filed on Sep. 28, 2011, and a continuation-in-part of application No. 13/200,805, filed on Sep. 30, 2011, and a continuation-in-part of application No.

(Continued)

(51) Int. Cl.
*H04W 88/06* (2009.01)
*H04L 29/08* (2006.01)
*H04W 4/18* (2009.01)
*H04L 29/06* (2006.01)

(Continued)

(52) U.S. Cl.
CPC .............. *H04L 67/2823* (2013.01); *H04W 4/18* (2013.01); *H04L 65/1069* (2013.01); *H04L 65/1093* (2013.01); *H04L 65/1059* (2013.01); *H04L 67/303* (2013.01); *H04W 84/18* (2013.01)

(58) Field of Classification Search
CPC . H04W 4/18; H04L 65/1069; H04L 65/1089; H04L 65/1093; H04L 65/601; H04L 12/1818; H04L 12/1827; H04L 67/2823; H04L 69/08
USPC ................... 709/204; 455/416; 715/751–753
See application file for complete search history.

(56) References Cited

U.S. PATENT DOCUMENTS 5,280,521 A    1/1994 Itoh
5,710,806 A    1/1998 Lee
(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Alina N Boutah

(57) ABSTRACT

Disclosed herein are example embodiments for multi-party multi-modality communication. By way of example but not limitation, a third communication device may receive first communication data for a first communication flow that is associated with a first communication device or receive second communication data for a second communication flow that is associated with a second communication device. It may further effectuate at least one conversion with respect to at least one of the first communication data or the second communication data to cause a conversion of communication data from corresponding to one type of user interaction communication modality to corresponding to another type of user interaction communication modality. A third communication device may present to a third user thereof a version of the first communication data while the second communication flow is extant or a version of the second communication data while the first communication flow is extant.

31 Claims, 30 Drawing Sheets

Related U.S. Application Data

13/200,804, filed on Sep. 30, 2011, and a continuation-in-part of application No. 13/317,985, filed on Oct. 31, 2011, and a continuation-in-part of application No. 13/317,983, filed on Oct. 31, 2011, and a continuation-in-part of application No. 13/317,987, filed on Oct. 31, 2011, and a continuation-in-part of application No. 13/373,643, filed on Nov. 21, 2011, and a continuation-in-part of application No. 13/373,824, filed on Nov. 30, 2011, and a continuation-in-part of application No. 13/374,079, filed on Dec. 9, 2011, and a continuation-in-part of application No. 13/374,372, filed on Dec. 23, 2011.

(51) Int. Cl.
*H04W 4/16* (2009.01)
*H04W 84/18* (2009.01)

(56) References Cited

U.S. PATENT DOCUMENTS

| | | | |
|---|---|---|---|
| 5,724,410 | A | 3/1998 | Parvulescu et al. |
| 6,249,808 | B1 | 6/2001 | Seshadri |
| 6,301,338 | B1 | 10/2001 | Mäakelä et al. |
| 6,366,651 | B1 | 4/2002 | Griffith |
| 6,504,910 | B1 | 1/2003 | Engelke |
| 6,701,162 | B1 | 3/2004 | Everett |
| 6,954,781 | B2 | 10/2005 | Bhattacharya |
| 7,076,255 | B2 | 7/2006 | Parupudi et al. |
| 7,103,349 | B2 | 9/2006 | Himanen |
| 7,133,899 | B2 | 11/2006 | Rowe |
| 7,184,786 | B2 | 2/2007 | Mumick |
| 7,359,492 | B2 | 4/2008 | Myers |
| 7,428,580 | B2 | 9/2008 | Hullfish et al. |
| 7,496,625 | B1 | 2/2009 | Belcher |
| 7,523,226 | B2 | 4/2009 | Anderson et al. |
| 7,551,583 | B1 | 6/2009 | Gazzard |
| 7,555,521 | B1 | 6/2009 | McLaughlin |
| 7,702,792 | B2 | 4/2010 | Shaffer |
| 7,725,116 | B2 | 5/2010 | Mumick |
| 7,733,903 | B2 | 6/2010 | Bhogal |
| 7,814,160 | B2 * | 10/2010 | Burtner et al. ............ 709/206 |
| 7,912,187 | B1 | 3/2011 | Mikan |
| 7,921,158 | B2 * | 4/2011 | Mandalia et al. ......... 709/205 |
| 7,983,706 | B2 | 7/2011 | Wolter |
| 8,041,025 | B2 | 10/2011 | Dolph et al. |
| 8,260,332 | B2 | 9/2012 | Reunamäki |
| 8,315,361 | B1 | 11/2012 | Becker et al. |
| 2001/0033639 | A1 | 10/2001 | Martin |
| 2002/0055350 | A1 | 5/2002 | Gupte et al. |
| 2002/0077830 | A1 | 6/2002 | Suomela et al. |
| 2002/0169610 | A1 | 11/2002 | Luegger |
| 2003/0028601 | A1 | 2/2003 | Rowe |
| 2003/0064716 | A1 * | 4/2003 | Gailey et al. ............... 455/414 |
| 2003/0069997 | A1 * | 4/2003 | Bravin et al. ............... 709/250 |
| 2003/0125952 | A1 | 7/2003 | Engleke et al. |
| 2003/0174155 | A1 | 9/2003 | Weng et al. |
| 2004/0015547 | A1 | 1/2004 | Griffin et al. |
| 2004/0034531 | A1 * | 2/2004 | Chou et al. ............... 704/270.1 |
| 2004/0034690 | A1 | 2/2004 | Schmitz et al. |
| 2004/0057562 | A1 | 3/2004 | Myers et al. |
| 2004/0082317 | A1 | 4/2004 | Graefen |
| 2004/0117804 | A1 * | 6/2004 | Scahill et al. ............... 719/320 |
| 2004/0139157 | A1 | 7/2004 | Neely, III et al. |
| 2004/0203708 | A1 | 10/2004 | Khan et al. |
| 2004/0267527 | A1 | 12/2004 | Creamer et al. |
| 2004/0268265 | A1 * | 12/2004 | Berger ............... 715/752 |
| 2005/0021868 | A1 | 1/2005 | Sharma et al. |
| 2005/0049879 | A1 * | 3/2005 | Audu et al. ............... 704/277 |
| 2005/0135595 | A1 | 6/2005 | Bushey et al. |
| 2005/0136955 | A1 * | 6/2005 | Mumick et al. ............ 455/466 |
| 2005/0198096 | A1 | 9/2005 | Shaffer et al. |
| 2005/0250550 | A1 | 11/2005 | Fields |
| 2005/0255837 | A1 | 11/2005 | Kwon |
| 2006/0052127 | A1 | 3/2006 | Wolter |
| 2006/0104293 | A1 * | 5/2006 | Kopp et al. ............... 370/401 |
| 2006/0159099 | A1 * | 7/2006 | Hensley ............... 370/395.1 |
| 2006/0168095 | A1 * | 7/2006 | Sharma et al. ............ 709/217 |
| 2006/0189333 | A1 | 8/2006 | Othmer |
| 2006/0217159 | A1 * | 9/2006 | Watson ............... 455/563 |
| 2006/0224623 | A1 * | 10/2006 | Graziadio et al. ......... 707/104.1 |
| 2006/0293888 | A1 | 12/2006 | Jindal |
| 2007/0005366 | A1 * | 1/2007 | Sravanapudi et al. ..... 704/270.1 |
| 2007/0082686 | A1 * | 4/2007 | Mumick et al. ............ 455/466 |
| 2007/0192418 | A1 | 8/2007 | Adams et al. |
| 2007/0203987 | A1 * | 8/2007 | Amis ............... 709/206 |
| 2007/0238474 | A1 * | 10/2007 | Ballas et al. ............... 455/466 |
| 2007/0260984 | A1 | 11/2007 | Marks et al. |
| 2008/0057925 | A1 | 3/2008 | Ansari |
| 2008/0068671 | A1 | 3/2008 | Yoshida et al. |
| 2008/0095332 | A1 | 4/2008 | Myers et al. |
| 2008/0119137 | A1 * | 5/2008 | Lee ............... 455/41.2 |
| 2008/0192736 | A1 | 8/2008 | Jabri et al. |
| 2008/0248818 | A1 | 10/2008 | Venkatesulu et al. |
| 2009/0028306 | A1 * | 1/2009 | Rhie ............... 379/93.01 |
| 2009/0037170 | A1 | 2/2009 | Williams |
| 2009/0135741 | A1 | 5/2009 | Mykhalchuck et al. |
| 2009/0150574 | A1 | 6/2009 | Kawahara et al. |
| 2009/0186636 | A1 | 7/2009 | Salonen |
| 2009/0216840 | A1 | 8/2009 | Pajunen et al. |
| 2009/0238346 | A1 | 9/2009 | Toutain et al. |
| 2009/0279455 | A1 * | 11/2009 | Wang et al. ............... 370/260 |
| 2009/0290691 | A1 | 11/2009 | Salonen |
| 2009/0319918 | A1 * | 12/2009 | Affronti et al. ............ 715/753 |
| 2010/0011069 | A1 * | 1/2010 | Haruna et al. ............ 709/206 |
| 2010/0030557 | A1 | 2/2010 | Molloy et al. |
| 2010/0053212 | A1 | 3/2010 | Kang et al. |
| 2010/0057466 | A1 | 3/2010 | Garg et al. |
| 2010/0100809 | A1 * | 4/2010 | Thomas et al. ............ 715/235 |
| 2010/0150333 | A1 | 6/2010 | Goodman et al. |
| 2010/0169096 | A1 | 7/2010 | Lv et al. |
| 2010/0174421 | A1 | 7/2010 | Tsai et al. |
| 2010/0191590 | A1 | 7/2010 | Hakkarainen et al. |
| 2010/0211389 | A1 | 8/2010 | Marquardt |
| 2010/0239081 | A1 | 9/2010 | Krantz et al. |
| 2010/0269134 | A1 | 10/2010 | Storan et al. |
| 2010/0322395 | A1 | 12/2010 | Michaelis et al. |
| 2011/0038512 | A1 | 2/2011 | Petrou et al. |
| 2011/0116610 | A1 | 5/2011 | Shaw et al. |
| 2011/0170675 | A1 | 7/2011 | Mikan et al. |
| 2011/0177800 | A1 | 7/2011 | Gilson |
| 2011/0179180 | A1 | 7/2011 | Schleifer et al. |
| 2011/0211679 | A1 | 9/2011 | Mezhibovsky et al. |
| 2011/0212737 | A1 | 9/2011 | Isidore |
| 2011/0270613 | A1 * | 11/2011 | Da Palma et al. ............ 704/260 |
| 2011/0294525 | A1 | 12/2011 | Jonsson |
| 2012/0034904 | A1 | 2/2012 | LeBeau et al. |
| 2012/0077526 | A1 | 3/2012 | Riffe |
| 2012/0096095 | A1 | 4/2012 | Bhargava |
| 2012/0237009 | A1 | 9/2012 | Szpilfogel |
| 2013/0040660 | A1 | 2/2013 | Fisher et al. |
| 2013/0079061 | A1 | 3/2013 | Jadhav et al. |
| 2013/0158988 | A1 | 6/2013 | Katis et al. |

OTHER PUBLICATIONS

"Telecommunications device for the deaf" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

Brown, D.M.; "How to Make a Phone Call Using Text to Speech Software;" eHow.com, pp. 1-2; located at: http://www.ehow.com/print/how_6075364_make-using-text-speech-software.html.

* cited by examiner

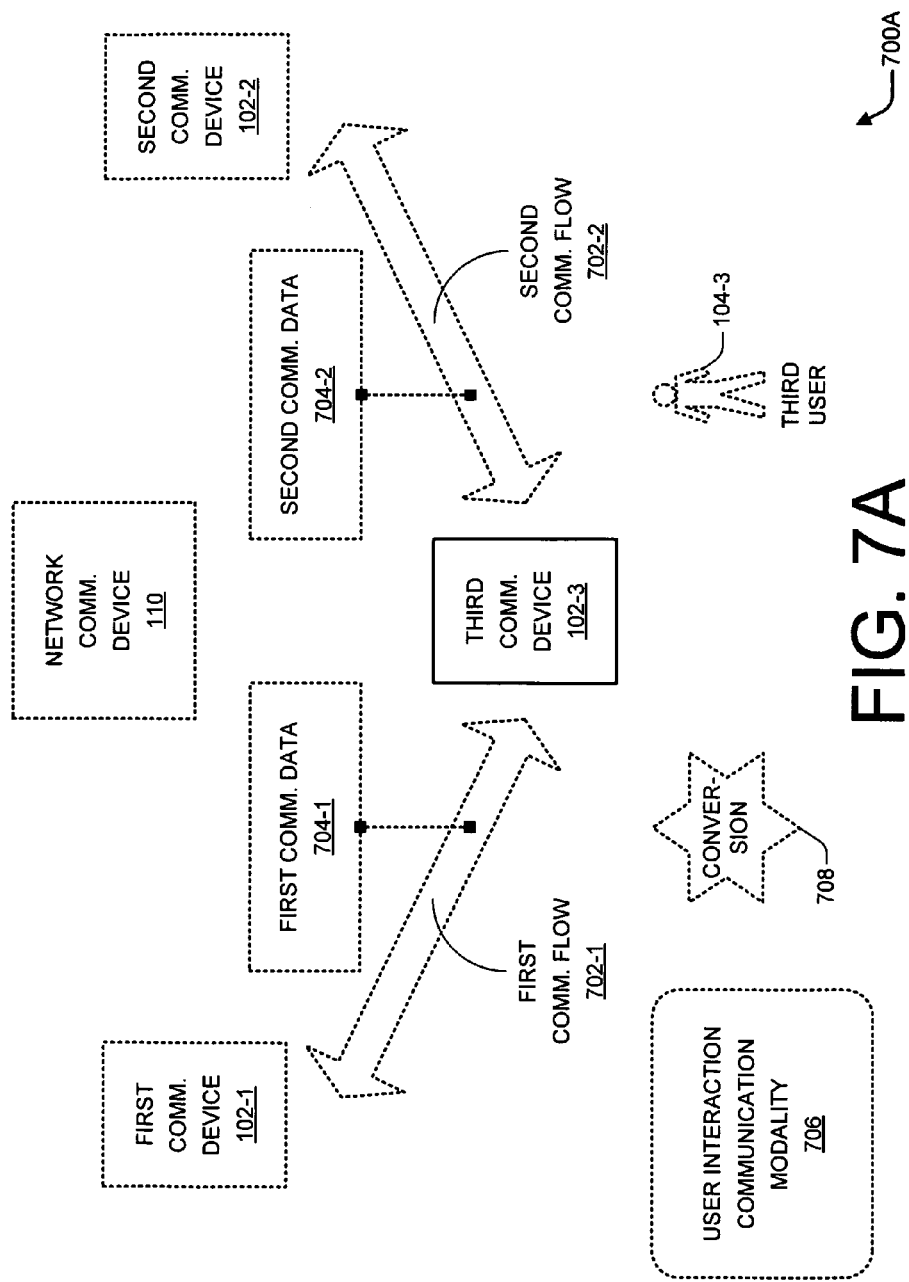

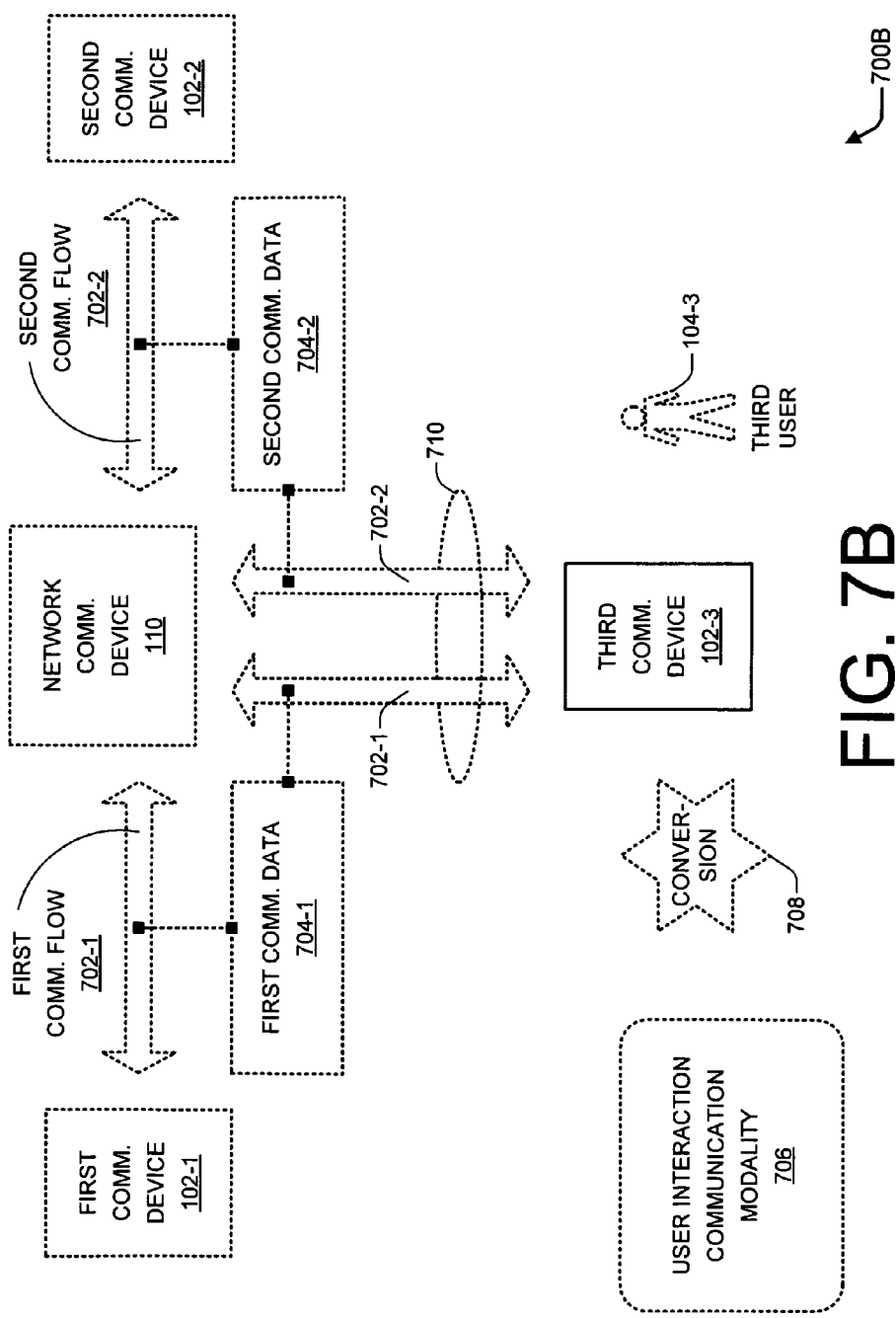

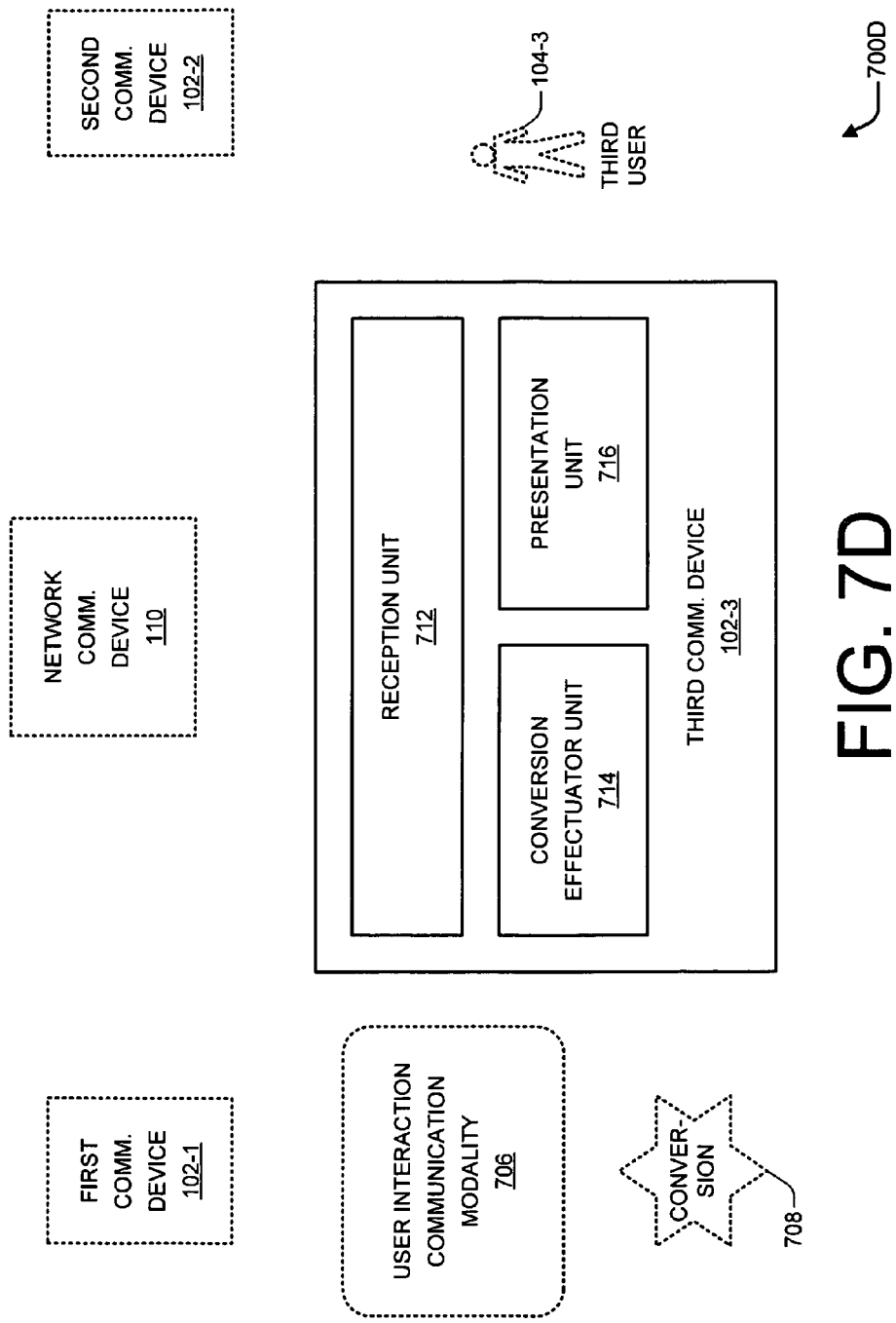

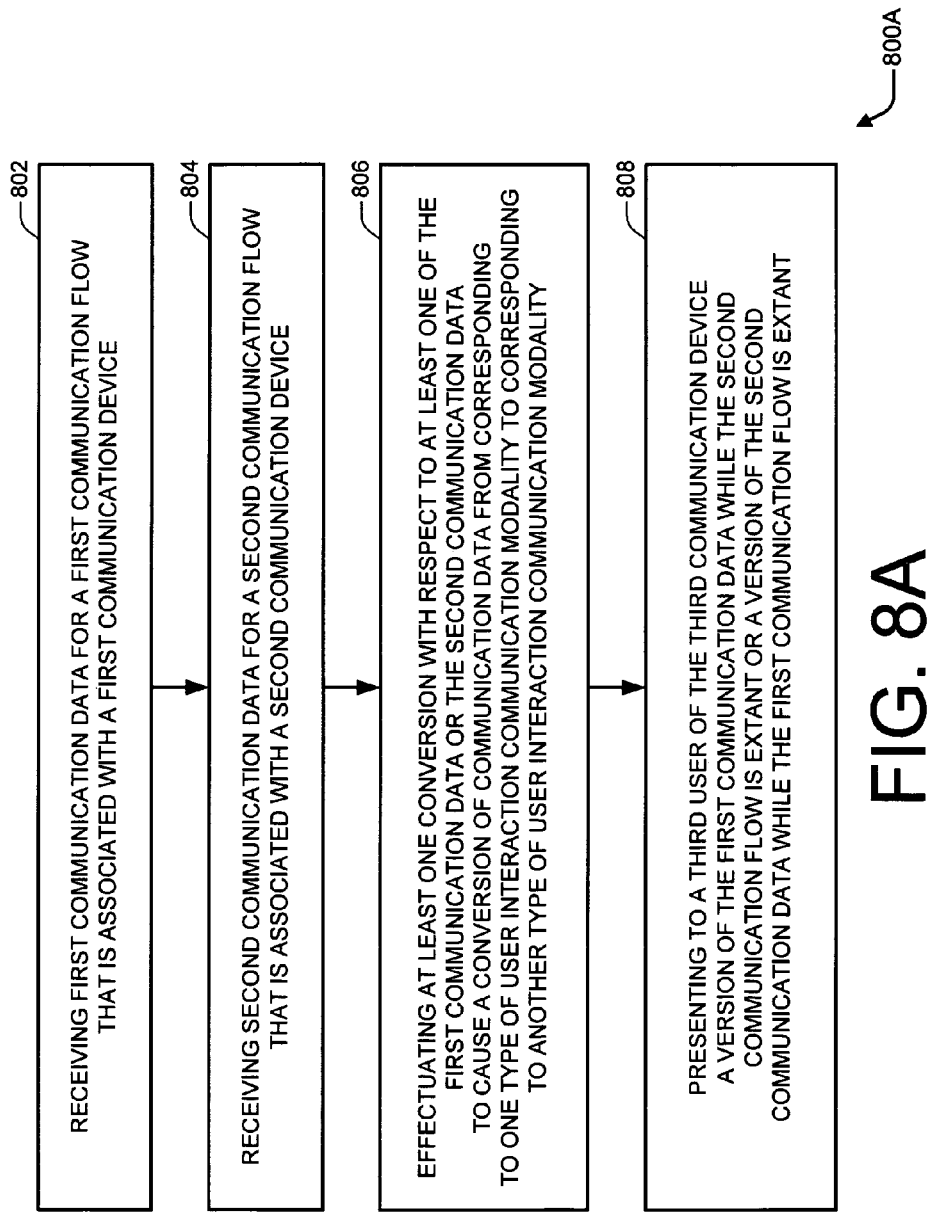

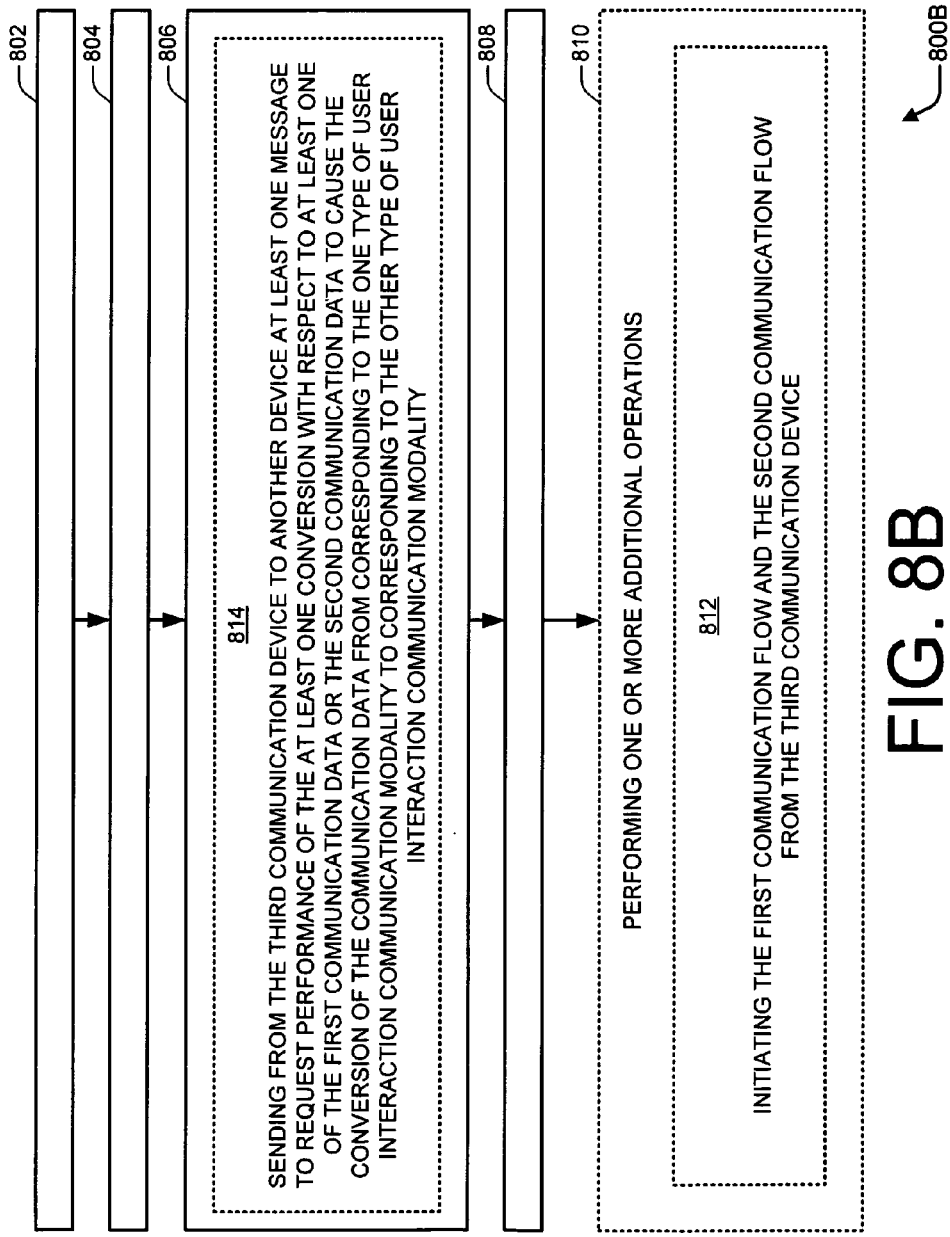

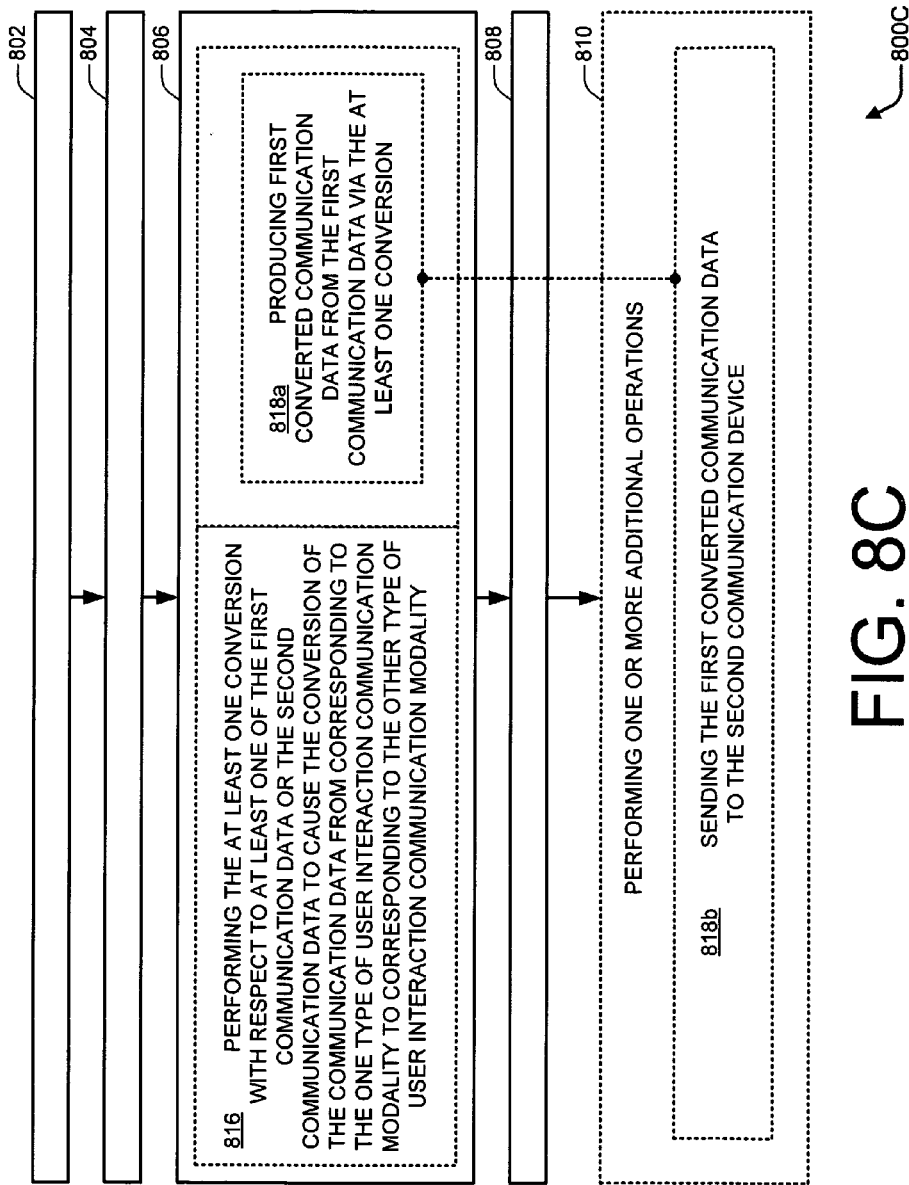

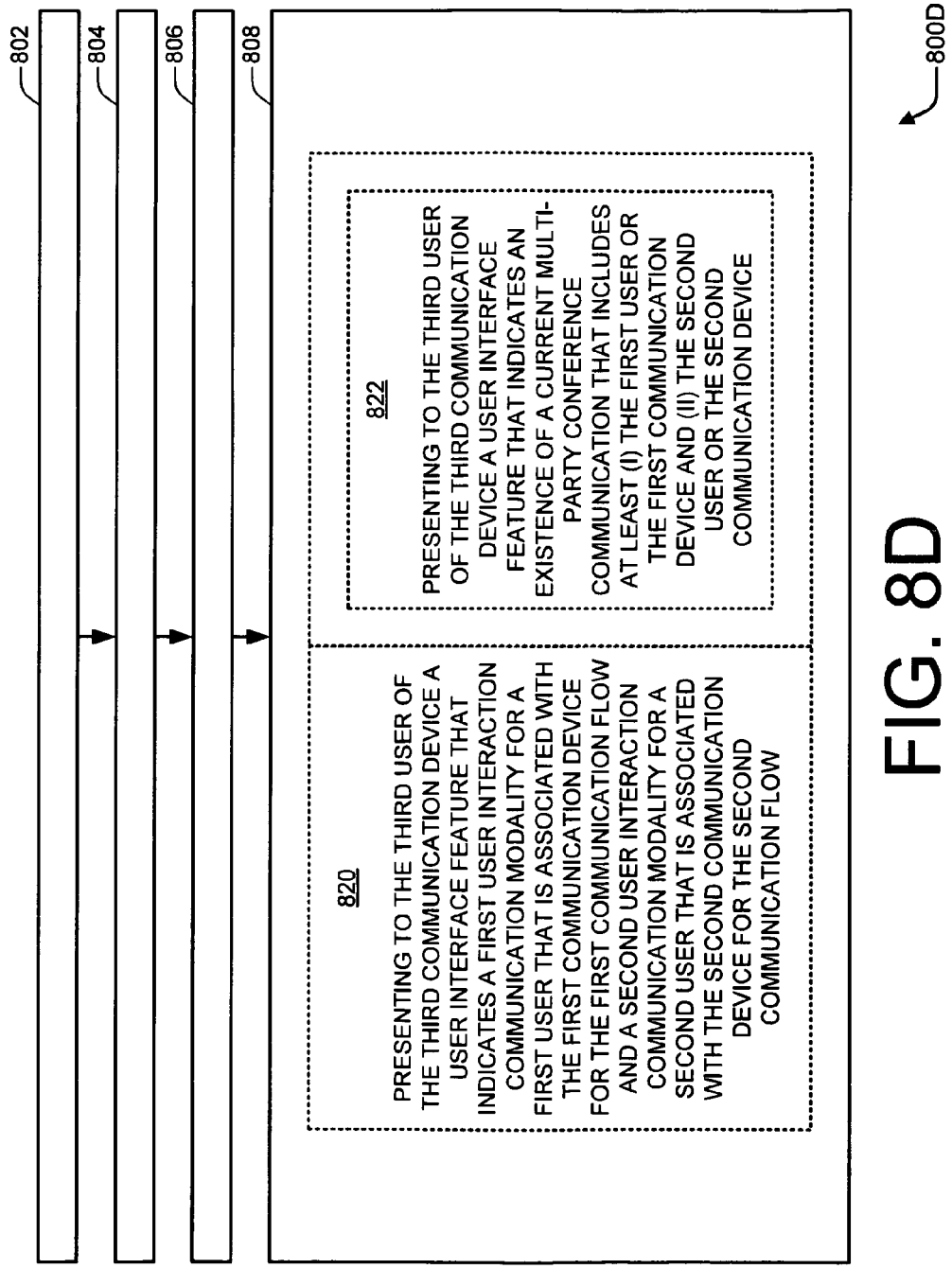

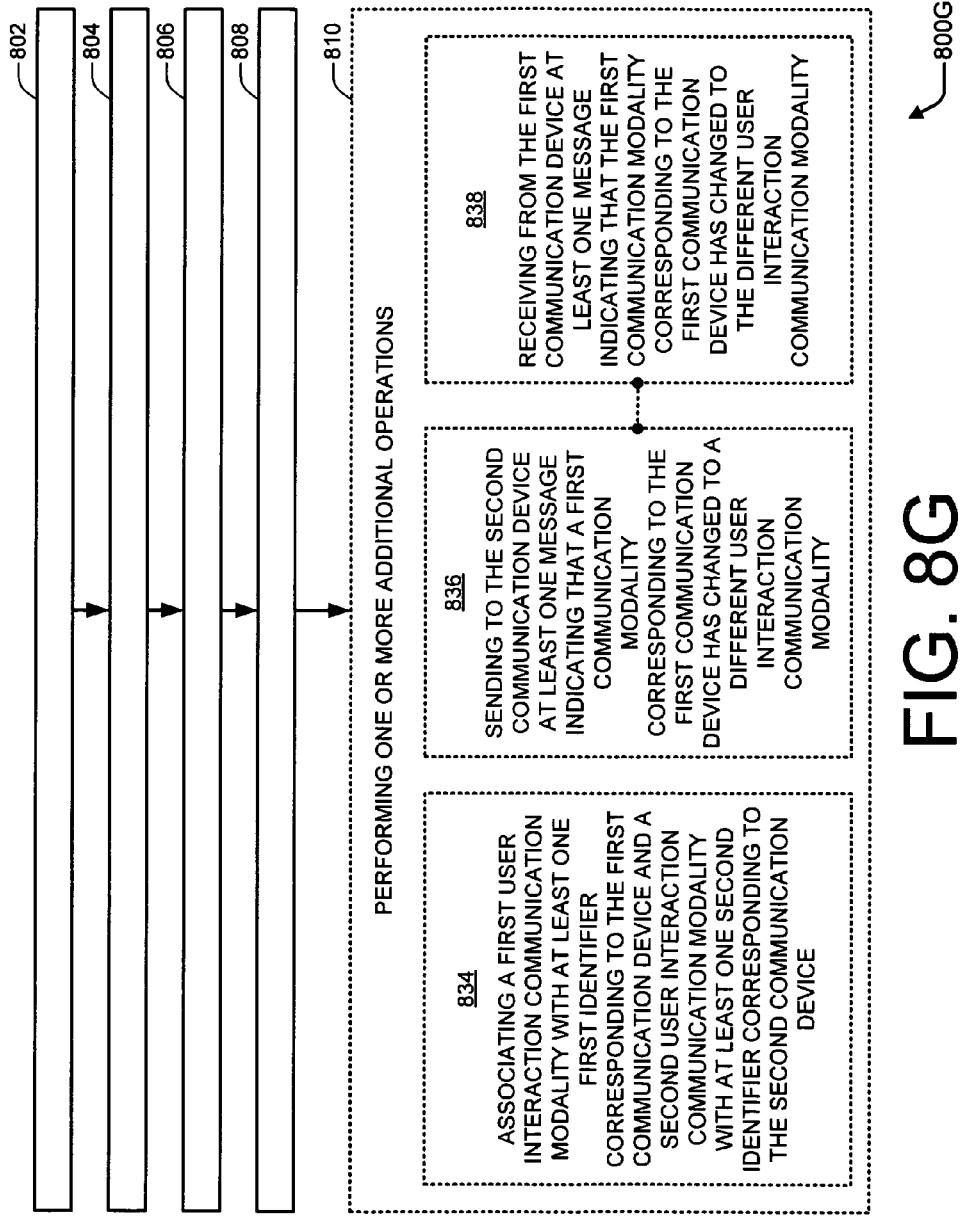

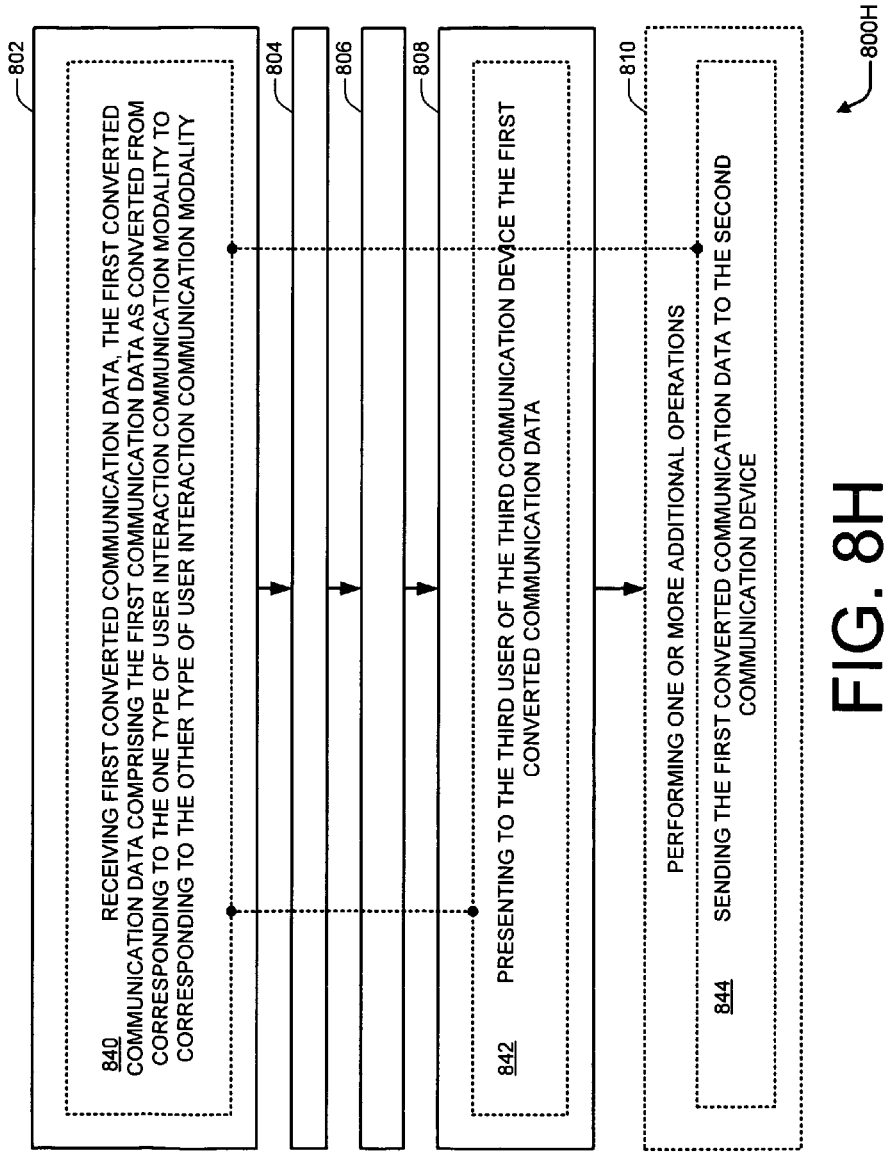

MULTI-PARTY MULTI-MODALITY COMMUNICATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:

the present application constitutes a continuation-in-part of U.S. patent application Ser. No. 13/200,741, entitled "MULTI-MODALITY COMMUNICATION", naming Royce A. Levien, Richard T. Lord, Robert W. Lord, Mark A. Malamud, John D. Rinaldo Jr. as inventors, filed 28 Sep. 2011, which is currently co-pending, or is an application of which a currently co-pending application is entitled to the benefit of the filing date;

the present application constitutes a continuation-in-part of U.S. patent application Ser. No. 13/200,805, entitled "MULTI-MODALITY COMMUNICATION PARTICIPATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/200,804, entitled "USER INTERFACE FOR MULTI-MODALITY COMMUNICATION", naming Royce A. Levien, Richard T. Lord, Robert W. Lord, Mark A. Malamud, John D. Rinaldo Jr. as inventors, filed 30 Sep. 2011, which is currently co-pending, or is an application of which a currently co-pending application is entitled to the benefit of the filing date;

the present application constitutes a continuation-in-part of U.S. patent application Ser. No. 13/317,985, entitled "MULTI-MODALITY COMMUNICATION WITH CONVERSION OFFLOADING", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/317,983, entitled "MULTI-MODALITY COMMUNICATION WITH INTERCEPTIVE CONVERSION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/317,987, entitled "MULTI-MODALITY COMMUNICATION INITIATION", naming Royce A. Levien, Richard T. Lord, Robert W. Lord, Mark A. Malamud, John D. Rinaldo Jr. as inventors, filed 31 Oct. 2011, which is currently co-pending, or is an application of which a currently co-pending application is entitled to the benefit of the filing date;

the present application constitutes a continuation-in-part of U.S. patent application Ser. No. 13/373,643, entitled "MULTI-MODALITY COMMUNICATION AUTO-ACTIVATION", naming Royce A. Levien, Richard T. Lord, Robert W. Lord, Mark A. Malamud, John D. Rinaldo Jr. as inventors, filed 21 Nov. 2011, which is currently co-pending, or is an application of which a currently co-pending application is entitled to the benefit of the filing date;

the present application constitutes a continuation-in-part of U.S. patent application Ser. No. 13/373,824, entitled "MULTI-MODALITY COMMUNICATION NETWORK AUTO-ACTIVATION", naming Royce A. Levien, Richard T. Lord, Robert W. Lord, Mark A. Malamud, John D. Rinaldo Jr. as inventors, filed 30 Nov. 2011, which is currently co-pending, or is an application of which a currently co-pending application is entitled to the benefit of the filing date;

the present application constitutes a continuation-in-part of U.S. patent application Ser. No. 13/374,079, entitled "MULTI-MODALITY COMMUNICATION MODIFICATION", naming Royce A. Levien, Richard T. Lord, Robert W. Lord, Mark A. Malamud, John D. Rinaldo Jr. as inventors, filed 9 Dec. 2011, which is currently co-pending, or is an application of which a currently co-pending application is entitled to the benefit of the filing date; and the present application constitutes a continuation-in-part of U.S. patent application Ser. No. 13/374,372, entitled "NETWORK FACILITATION OF MULTI-MODALITY COMMUNICATION MODIFICATION", naming Royce A. Levien, Richard T. Lord, Robert W. Lord, Mark A. Malamud, John D. Rinaldo Jr. as inventors, filed 23 Dec. 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BRIEF DESCRIPTION OF THE FIGURES

FIGS. 7A-7F are schematic diagrams that include at least one example communication device and that depict example scenarios for multi-party multi-modality communication in accordance with certain example embodiments.

FIG. 8A is a flow diagram illustrating an example method for a communication device with regard to multi-party multi-modality communication in accordance with certain example embodiments.

FIGS. 8B-8H depict example additions or alternatives for a flow diagram of FIG. 8A in accordance with certain example embodiments.

DETAILED DESCRIPTION

Figure 1:
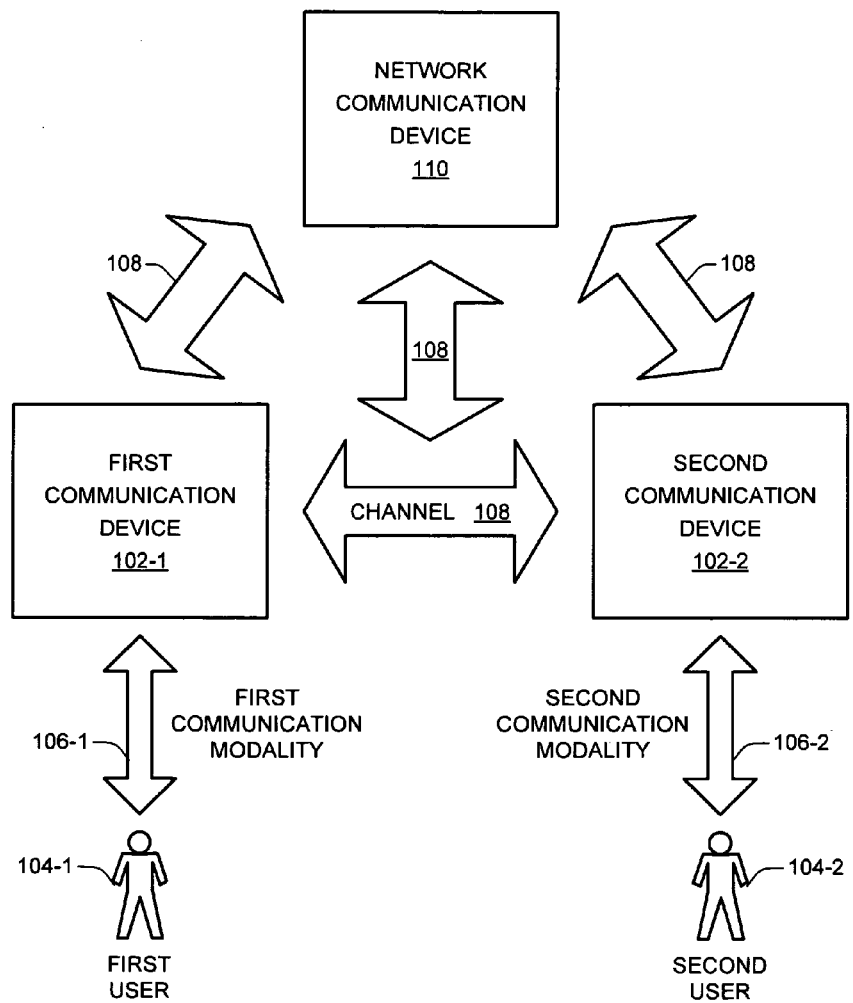
FIG. 1 is a schematic diagram of a network communication device and two communication devices that may participate in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a network communication device and two communication devices that may participate in an example communication in accordance with certain example embodiments. As shown in FIG. 1, by way of example but not limitation, schematic diagram 100 may include communication devices 102, users 104, communication modalities 106, at least one channel 108, or at least one network communication device 110. More specifically, schematic diagram 100 may include a first communication device 102-1, a first user 104-1, a first communication modality 106-1, a second communication device 102-2, a second user 104-2, a second communication modality 106-2, one or more channels 108, or at least one network communication device 110.

For certain example embodiments, a user 104 may be associated with at least one communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, at least one person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth. Additional example communication modalities 106 may include, by way of example but not limitation, emailed communications, instant messaging, chatting communications, social media communications (e.g., commenting, posting, liking, tweeting, "+1ing", a combination thereof, etc.), any combination thereof, and so forth. By way of example but not limitation, a multi-modality communication, such as a multi-party multi-modality communication, may be realized, implemented, participated in, a combination thereof, etc. in at least substantially real-time. For certain example implementations, a multi-modality communication may be considered to occur in substantially real-time if a related conversational flow may be continued without introducing significant person-perceptible delay(s) (e.g., at least not in addition to those introduced by, for instance, one participant entering text if another participant is interacting with voice or video). However, claimed subject matter is not limited to any particular described embodiments, implementations, examples, etc.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. First communication device 102-1 or first user 104-1 may be participating in at least one communication (not explicitly shown in FIG. 1) with second communication device 102-2 or second user 104-2 via one or more channels 108. A communication may comprise, by way of example but not limitation, a transmission of data, a reception of data, an exchange of data, a flow of data (e.g., between or among two or more endpoints), any combination thereof, and so forth.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, at least part of an internet backbone, at least part of a satellite network, at least part of a fibre network, multiple instances of any of the above, any combination of the above, and so forth. A channel 108 may include one or more nodes (e.g., a telecommunication node, an access point, a base station, an internet server, a gateway, an internet or telecommunication switch, any combination thereof, etc.) through which signals are propagated. A network communication device 110 may comprise, by way of example but not limitation, at least one node through which signals are propagated for a communication that includes a first communication device 102-1 or a second communication device 102-2. A network communication device 110 may communicate with first communication device 102-1 or second communication device 102-2 using any one or more of multiple channels 108, a few examples of which are illustrated in schematic diagram 100.

For certain example implementations, a communication may be initiated by first communication device 102-1, first user 104-1, second communication device 102-2, second user 104-2, any combination thereof, and so forth. For certain example implementations, first communication modality 106-1 may comprise at least one different communication modality from second communication modality 106-2. Furthermore, for certain example implementations, first communication modality 106-1 or second communication modality 106-2 may change from one communication modality to another communication modality during a single communication, across different communications, and so forth. Additionally or alternatively, another (e.g., different) communication modality may be referred to herein as a "third communication modality" or a "fourth communication modality", for example.

Moreover, it should be understood that the terms "first" or "second" may, depending on context, be a matter of perspective. For instance, a communication device 102 or a user 104 or a communication modality 106 may be considered a first one at a given moment, for a given communication, from a given perspective, etc. but may be considered a second one at a different moment, for a different communication, from a different perspective, etc. However, one of ordinary skill in the art will recognize that the term "first" or "second" (or "third" or "fourth" etc.) may serve, depending on context, to indicate that different interactions, acts, operations, functionality, a combination thereof, etc. may be occurring at, may be more closely associated with, a combination thereof etc. one side, aspect, location, combination thereof, etc. of a particular communication as compared to another side, aspect, location, combination thereof, etc. of the particular communication. For example, one signal including data may be transmitted from a first communication device 102-1 and received at a second communication device 102-2, or another signal including data may be transmitted from a second communication device 102-2 and received at a first communication device 102-1.

Figure 2:
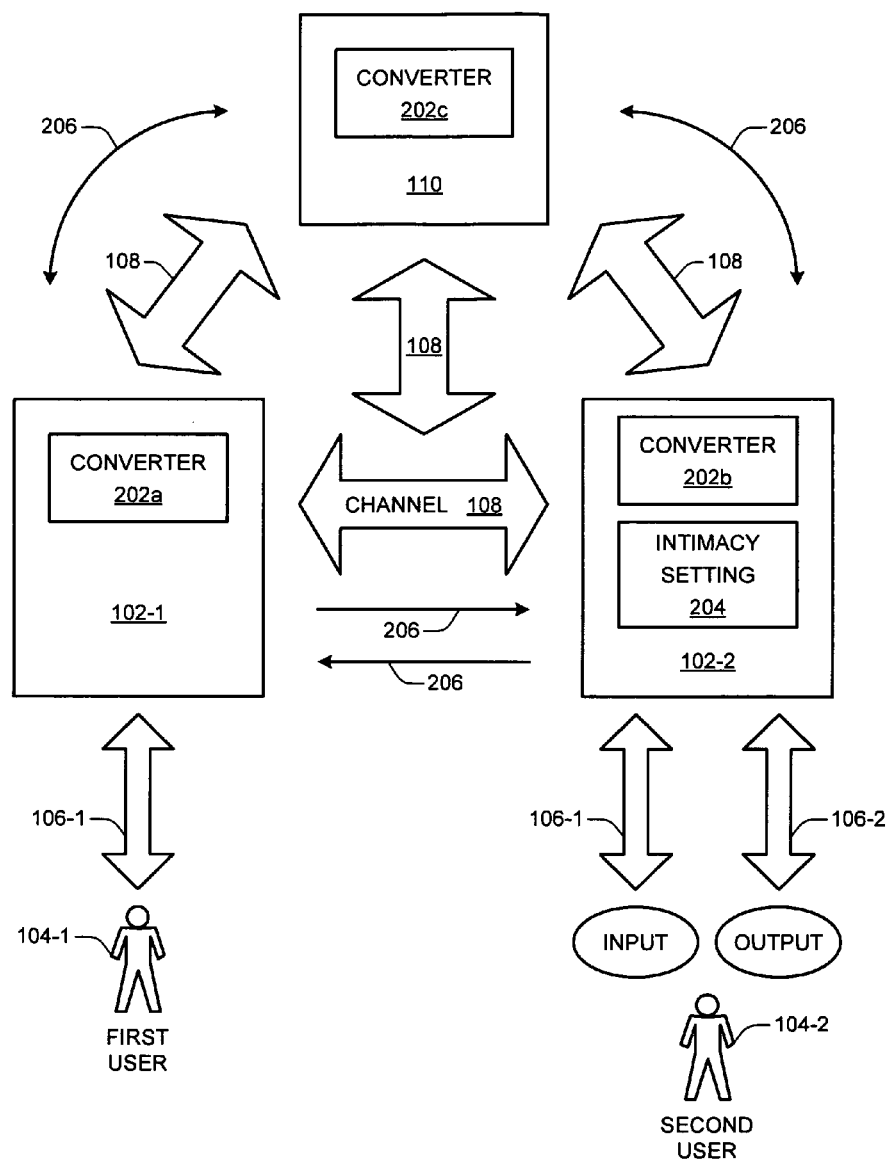
FIG. 2 is a schematic diagram of communication devices that may be involved in a communication relating to at least two communication modalities or one or more converters responsive to at least one example intimacy setting in accordance with certain example embodiments.

FIG. 2 is a schematic diagram 200 of communication devices that may be involved in a communication relating to at least two communication modalities or one or more converters responsive to at least one example intimacy setting in accordance with certain example embodiments. As shown in FIG. 2, by way of example but not limitation, schematic diagram 200 may include communication devices 102, users 104, communication modalities 106, at least one channel 108, at least one network communication device 110, or one or more signals 206. More specifically, schematic diagram 200 may include a first communication device 102-1, a first user 104-1, a first communication modality 106-1, a second communication device 102-2, a second user 104-2, a second communication modality 106-2, one or more channels 108, at least one network communication device 110, or one or more signals 206. Furthermore, one or more of first communication device 102-1, second communication device 102-2, or network communication device 110 may include at least one converter 202 (e.g., a converter 202a, a converter 202b, or a converter 202c, respectively). Additionally or alternatively, at least second communication device 102-2 may include (e.g., store, establish, have access to, a combination thereof, etc.) at least one intimacy setting 204.

For certain example embodiments, first user 104-1 may be associated with first communication device 102-1. First user 104-1 may be interacting with first communication device 102-1 via at least one first communication modality 106-1. Second user 104-2 may be associated with second communication device 102-2. Second user 104-2 may be interacting with second communication device 102-2 via at least one second communication modality 106-2. Additionally or alternatively, second user 104-2 may be interacting with second communication device 102-2 via at least one first communication modality 106-1. As described further herein below, at least one user 104 for at least one side of a communication may be engaged in a multi-modality communication by interacting with an associated communication device 102 using two or more communication modalities 106, such as a first communication modality 106-1 and a second communication modality 106-2. First communication modality 106-1 may differ from second communication modality 106-2. First communication device 102-1 or first user 104-1 may be participating in at least one communication with second communication device 102-2 or second user 104-2 via one or more signals 206, a few examples of which are shown in FIG. 2. Signals 206 may propagate via one or more channels 108. Signals 206, by way of example but not limitation, may comprise, electrical signals, magnetic signals, electromagnetic signals, photonic signals, wireless signals, wired signals, multiples ones thereof, any combination thereof, and so forth.

For certain example embodiments, a second communication device 102-2 may receive one or more signals 206 corresponding to a first communication modality 106-1. A second communication device 102-2 may respond to one or more received signals 206 corresponding to first communication modality 106-1 based at least partly on second user 104-2 interaction via a second communication modality 106-2 in accordance with at least one intimacy setting 204. By way of example but not limitation, at least one intimacy setting 204 may indicate what kind or kinds of one or more communication modalities 106 a user 104 is willing to expose for at least one communication.

For certain example embodiments, at least one intimacy setting 204 may indicate how a user 104 is to interact with a communication device 102 with respect to a given communication without condition (e.g., a user may limit any current communications to text, to voice, to video, etc.). Additionally or alternatively, at least one intimacy setting 204 may indicate how a user 104 is to interact with a communication device with respect to a given communication on a conditional basis. By way of example only, a user 104 may indicate a communication modality (e.g., as represented by at least one intimacy setting 204) in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated (e.g., accepted, received, a combination thereof, etc.) using a textual communication modality.

As another example of a conditional intimacy setting 204, a second user 104-2 may indicate a second communication modality 106-2 in at least partial dependence on a first communication modality 106-1. For instance, at least one intimacy setting 204 may indicate that if a first communication modality 106-1 corresponds to text, a second communication modality 106-2 is also to correspond to text; furthermore, the at least one intimacy setting 204 may indicate that if a first communication modality 106-1 corresponds to voice, a second communication modality 106-2 is to correspond to text; moreover, the at least one intimacy setting 204 may indicate that if a first communication modality 106-1 corresponds to video, a second communication modality 106-2 is to correspond to voice. Additionally or alternatively, a second user 104-2 may indicate a second communication modality 106-2 that is based at least partially on: an identity of a first user 104-1; a time of day, day of week, a combination thereof, etc.; an environmental condition (e.g., an ambient lighting level, a level or type of movement—e.g. vehicle motion may be detected, a combination thereof, etc.) detectable by sensor(s) or otherwise determinable by a device; a calendar; any combination thereof; and so forth. However, claimed subject matter is not limited to any particular examples.

For certain example embodiments, a user 104 may interact with a single device (or multiple devices) for a single communication using one communication modality 106. Additionally or alternatively, a user 104 may interact with a single device (or multiple devices) for a single communication using two or more communication modalities 106. For certain example implementations, and as illustrated with respect to second communication device 102-2 in schematic diagram 200, a second user 104-2 may interact with input features of second communication device 102-2 in accordance with a first communication modality 106-1 and may interact with output features of second communication device 102-2 in accordance with a second communication modality 106-2. For instance, if first communication modality 106-1 comprises voice interaction, second communication modality 106-2 may comprise textual interaction. In such an instance, first user 104-1 may interact with first communication device 102-1 using voice (e.g., for both input and output) for a voice call initiated at first communication device 102-1, and second user 104-2 may interact with second communication device 102-2 using voice with respect to input features of second communication device 102-2 (e.g., second user 104-2 may speak into a microphone to input vocal sounds). However, with respect to output features of second communication device 102-2, second user 104-2 may interact with second communication device 102-2 using text. Second communication device 102-2 may, for example, display text on a screen (e.g., a LCD or LED screen) or a projection surface for the data that corresponds to vocal input from first user 104-1 at first communication device 102-1. To provide a textual version for display of voice input data, voice data may be converted to text data (e.g., at a converter).

For certain example embodiments, communication data (e.g., video data, voice data, text data, a combination thereof, etc.) may be converted from corresponding to one type of communication modality 106 to corresponding to another type of communication modality 106 by at least one converter 202. For certain example implementations, a converter 202 may perform a conversion of a correspondence with one communication modality 106 to a correspondence with another communication modality 106. By way of example but not limitation, a converter 202 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. By way of example only, a converter 202 may convert voice data to text data, text data to video data, text data to voice data, voice data to video data, any combination thereof, and so forth. A given multi-modality communication may be subject to one or more conversions by one or more converters 202.

For certain example embodiments, a device may include (e.g., comprise at least a portion of, have access to, implement, realize, execute, a combination thereof, etc.) at least one converter 202. As shown in schematic diagram 200, but by way of example only, a first communication device 102-1 may include a converter 202a, a second communication device 102-2 may include a converter 202b, or a network communication device 110 may include a converter 202c. Additional or alternative implementations are described herein. One or more converters 202 may be employed in different communication path or conversion scenarios.

FIGS. 3A-3H are schematic diagrams illustrating different communication path or conversion scenarios 300A-300H for different example communications in accordance with certain example embodiments. As illustrated, each schematic diagram includes at least one conversion 302 or at least one communication path 304. By way of example but not limitation, a conversion 302 may comprise a conversion of data from corresponding to one communication modality to corresponding to another communication modality. By way of example but not limitation, a communication path 304 may comprise a path in which one or more signals (e.g., one or more signals 206) that include data (e.g., text data, voice data, video data, a combination thereof, etc.) traverse between two or more devices via one or more channels 108 (e.g., of FIGS. 1 and 2). Although not explicitly illustrated in FIGS. 3A-3H for the sake of visual clarity, a first user 104-1, a second user 104-2, a first communication modality 106-1, and a second communication modality 106-2 (e.g., each of FIGS. 1 and 2) are referred to herein below with regard to one or more of example scenarios 300A-300H.

Figure 3A:
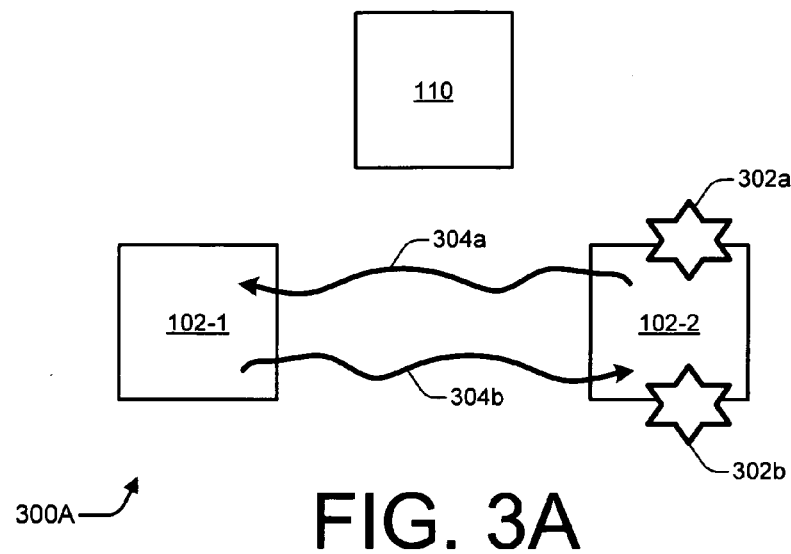
FIGS. 3A-3H are schematic diagrams illustrating different communication path or conversion scenarios for different example communications in accordance with certain example embodiments.

For certain example embodiments, with regard to example scenario 300A of FIG. 3A, a conversion 302a or a conversion 302b may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction (e.g., video, voice, text, a combination thereof, etc.) at second communication device 102-2 in accordance with second communication modality 106-2. Data corresponding to second communication modality 106-2 may be converted to data corresponding to first communication modality 106-1 via conversion 302a. Data corresponding to first communication modality 106-1 may be transmitted from second communication device 102-2 or received at first communication device 102-1 via communication path 304a.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304b. At conversion 302b, data corresponding to first communication modality 106-1 may be converted to data corresponding to second communication modality 106-2. Second communication device 102-2 may present data corresponding to second communication modality 106-2 as user output to second user 104-2. By way of example only, first communication modality 106-1 may comprise voice interaction, and second communication modality 106-2 may comprise text interaction. With conversion 302a or conversion 302b, first user 104-1 may interact with first communication device 102-1 via voice, and second user 104-2 may interact with second communication device 102-2 via text.

Figure 3B:
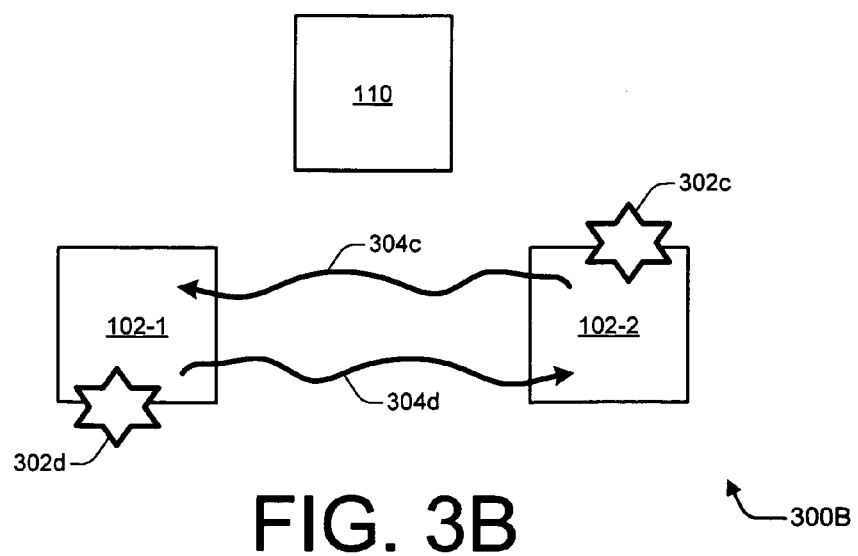

For certain example embodiments, with regard to example scenario 300B of FIG. 3B, a conversion 302c may be performed at a second communication device 102-2, or a conversion 302d may be performed at a first communication device 102-1. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be converted to data corresponding to first communication modality 106-1 via conversion 302c. Data corresponding to first communication modality 106-1 may be transmitted from second communication device 102-2 or received at first communication device 102-1 via communication path 304c.

For certain example implementations, first communication device 102-1 may present data corresponding to first communication modality 106-1 to first user 104-1 as user output. First communication device 102-1 may accept user input to acquire data corresponding to first communication modality 106-1. At conversion 302d, data corresponding to first communication modality 106-1 may be converted to data corresponding to second communication modality 106-2. First communication device 102-1 may transmit or second communication device 102-2 may receive data corresponding to second communication modality 106-2 via communication path 304d. Second communication device 102-2 may present data corresponding to second communication modality 106-2 as user output to second user 104-2. By way of example only, first communication modality 106-1 may comprise text interaction, and second communication modality 106-2 may comprise voice interaction. With conversion 302c or conversion 302d, first user 104-1 may interact with first communication device 102-1 via text, and second user 104-2 may interact with second communication device 102-2 via voice, with conversions 302c and 302d being performed prior to transmission on both sides of a communication or at a device that receives user input data that is to be converted. A given communication device 102 may have expertise at converting user input data from a frequent user of the given communication device 102 (e.g., by using recorded sound samples—for conversion of text to voice, vocal training samples—for converting voice to text, a combination thereof, etc.). Alternatively, conversion 302c or conversion 302d may be performed on received data after transmission on one side or on two sides of a communication.

Figure 3C:
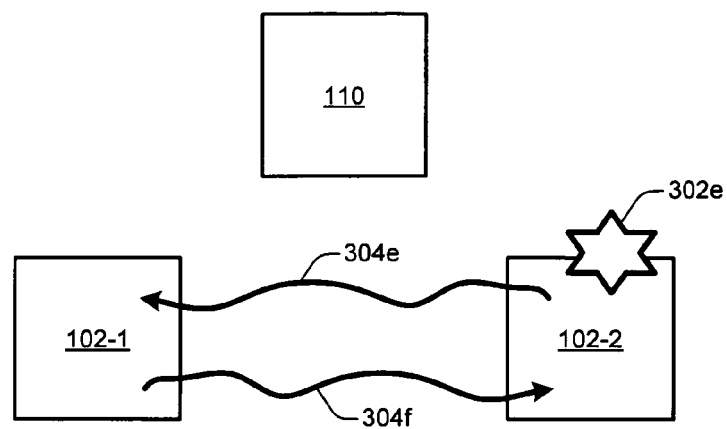

For certain example embodiments, with regard to example scenario 300C of FIG. 3C, a conversion 302e may be performed at a second communication device 102-2. For certain example implementations, a first user 104-1 may interact with a first communication device 102-1 in accordance with a first communication modality 106-1, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be converted to data corresponding to first communication modality 106-1 via conversion 302e. Data corresponding to first communication modality 106-1 may be transmitted from second communication device 102-2 or received at first communication device 102-1 via communication path 304e.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304f. Second communication device 102-2 may present data corresponding to first communication modality 106-1 as user output to second user 104-2. By way of example only, first communication modality 106-1 may comprise voice interaction, and second communication modality 106-2 may comprise text interaction. With conversion 302e, first user 104-1 may interact with first communication device 102-1 via voice, and second user 104-2 may interact with second communication device 102-2 via voice for user output interaction (e.g., may listen to sounds at second communication device 102-2 as produced by first user 104-1 at first communication device 102-1) and via text for user input interaction (e.g., may type text into second communication device 102-2). Conversion 302e may convert input text data into converted voice data for transmission via communication path 304e.

Although not explicitly shown in FIGS. 3A-3C, a communication path between e.g. first communication device 102-1 and second communication device 102-2 may traverse one or more network communication devices. However, for example scenarios 300A-300C, conversion(s) 302 are performed at first communication device 102-1 or second communication device 102-2. In contrast, for example scenarios 300D-300F of FIGS. 3D-3F, at least one conversion 302 is performed at a network communication device 110. If a communication path 304 is "naturally" traversing a network communication device 110 (e.g., if a communication path 304 is to traverse a network communication device 110 regardless of whether a multi-modality-communication-related feature is to be facilitated by network communication device 110), then network communication device 110 may intercept communication data flowing along communication path 304. Communication data may be intercepted by a network communication device 110 on its own accord or based on its own instructions, in response to a request by a first communication device 102-1, in response to a request by a second communication device 102-2, in response to a request from a third party, in response to one or more stored settings, in response to an indication in a communication initiation or setup message, any combination thereof, and so forth. By way of example but not limitation, a network communication device 110 that comprises a telecommunication node, an internet node facilitating a voice over internet protocol (VoIP) communication, a combination thereof, etc. may be capable of intercepting a communication flow along a communication path 304 and implementing a multi-modality-communication-related-feature (e.g., a communication modality conversion) for an intercepted communication flow. Additionally or alternatively, a communication path 304 may be redirected so as to traverse a network communication device 110 that is capable of implementing a multi-modality-communication-related-feature (e.g., a communication modality conversion) for a redirected communication flow. A communication path may be redirected in response to a command by a first communication device 102-1, in response to a command by a second communication device 102-2, in response to a request from a third party, any combination thereof, and so forth.

Figure 3D:
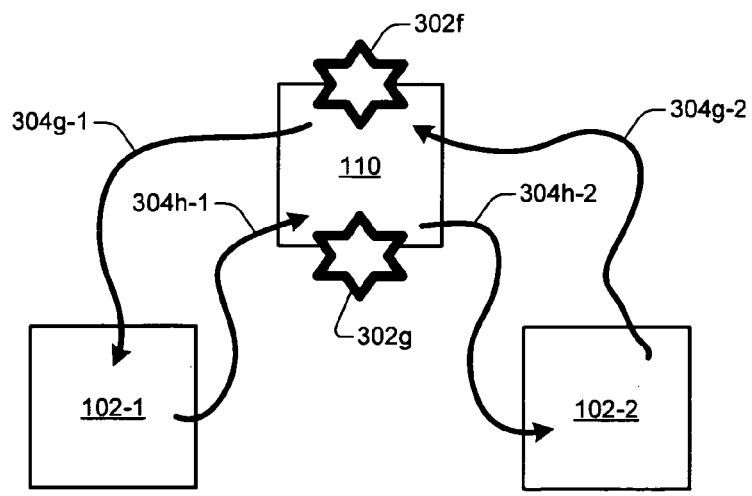

For certain example embodiments, with regard to example scenario 300D of FIG. 3D, a conversion 302*f* or a conversion 302*g* may be performed at a network communication device 110. For certain example implementations, a first user 104-1 may interact with a first communication device 102-1 in accordance with a first communication modality 106-1, or a second user 104-2 may interact with a second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304*g*-2. Data corresponding to second communication modality 106-2 may be converted to data corresponding to first communication modality 106-1 via conversion 302*f*. Data corresponding to first communication modality 106-1 may be transmitted from network communication device 110 or received at first communication device 102-1 via communication path 304*g*-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or network communication device 110 may receive data corresponding to first communication modality 106-1 via communication path 304*h*-1. Data corresponding to first communication modality 106-1 may be converted to data corresponding to second communication modality 106-2 via conversion 302*g*. Data corresponding to second communication modality 106-2 may be transmitted from network communication device 110 or received at second communication device 102-2 via communication path 304*h*-2. Second communication device 102-2 may present data corresponding to second communication modality 106-2 as user output to second user 104-2. By way of example only, first communication modality 106-1 may comprise video interaction, and second communication modality 106-2 may comprise voice interaction. With conversion 302*f* and conversion 302*g* at network communication device 110, first user 104-1 may interact with first communication device 102-1 via video, and second user 104-2 may interact with second communication device 102-2 via voice. It should be understood that conversion 302*f* may not be a reciprocal or inverse process of conversion 302*g* (or vice versa); additionally or alternatively, data corresponding to first communication modality 106-1 may be converted to data corresponding to a third communication modality via a conversion 302*g*, for example if user output interaction at second communication device 102-2 corresponds to a third communication modality. Additionally or alternatively, first communication device 102-1 or second communication device 102-2 may perform at least one conversion (e.g., a conversion 302*f* or 302*g* in lieu of two conversions being performed by network communication device 110 as shown in example scenario 300D).

Figure 3E:
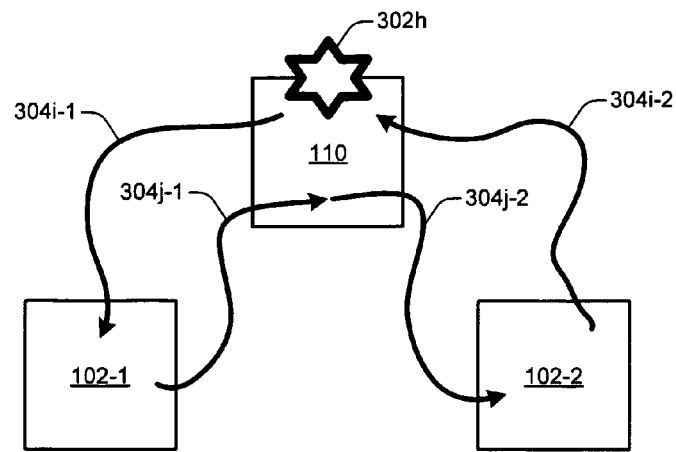

For certain example embodiments, with regard to example scenario 300E of FIG. 3E, a conversion 302*h* may be performed at a network communication device 110. For certain example implementations, a first user 104-1 may interact with a first communication device 102-1 in accordance with a first communication modality 106-1 for user output interaction and in accordance with a second communication modality 106-2 for user input interaction, or a second user 104-2 may interact with second communication device 102-2 in accordance with a second communication modality 106-2 for user input interaction and for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304*i*-2. Data corresponding to second communication modality 106-2 may be converted to data corresponding to first communication modality 106-1 via conversion 302*h*. Data corresponding to first communication modality 106-1 may be transmitted from network communication device 110 or received at first communication device 102-1 via communication path 304*i*-1.

For certain example implementations, first communication device 102-1 may present data corresponding to first communication modality 106-1 to first user 104-1 as user output. First communication device 102-1 may accept user input to acquire data corresponding to second communication modality 106-2. First communication device 102-1 may transmit or network communication device 110 may receive data corresponding to second communication modality 106-2 via communication path 304*j*-1. Data corresponding to second communication modality 106-2 may be transmitted from network communication device 110 or received at second communication device 102-2 via communication path 304*j*-2. Second communication device 102-2 may present data corresponding to second communication modality 106-2 as user output to second user 104-2. By way of example only, first communication modality 106-1 may comprise voice interaction, and second communication modality 106-2 may comprise video interaction. With conversion 302*h*, first user 104-1 may interact with first communication device 102-1 via voice for user output interaction and via video for user input interaction, and second user 104-2 may interact with second communication device 102-2 via video for user input and user output. As shown for an example scenario 300E, a communication flow may traverse a network communication device 110 without a conversion being applied thereto.

Figure 3F:
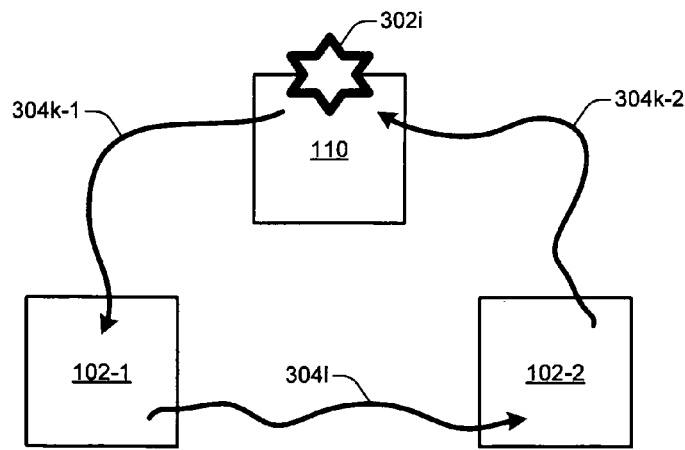

For certain example embodiments, with regard to example scenario 300F of FIG. 3F, a conversion 302*i* may be performed at a network communication device 110. For certain example implementations, a first user 104-1 may interact with a first communication device 102-1 in accordance with a first communication modality 106-1 for user input interaction and for user output interaction, or a second user 104-2 may interact with second communication device 102-2 in accordance with a second communication modality 106-2 for user input interaction and in accordance with first communication modality 106-1 for user output interaction. Second user 104-2 may provide user input interaction at second communication device 102-2 in accordance with second communication modality 106-2. Data corresponding to second communication modality 106-2 may be transmitted from second communication device 102-2 or received at network communication device 110 via communication path 304*k*-2. Data corresponding to second communication modality 106-2 may be converted to data corresponding to first communication modality 106-1 via conversion 302*i*. Data corresponding to first communication modality 106-1 may be transmitted from network communication device 110 or received at first communication device 102-1 via communication path 304*k*-1.

For certain example implementations, first communication device 102-1 may present data corresponding to first communication modality 106-1 to first user 104-1 as user output. First communication device 102-1 may accept user input to acquire data corresponding to first communication modality 106-1. First communication device 102-1 may transmit or second communication device 102-2 may receive data corresponding to first communication modality 106-1 via communication path 304*l*. Second communication device 102-2 may present data corresponding to first communication modality 106-1 as user output to second user 104-2. As shown by communication path 304*l* for an example scenario 300F, and in contrast with example scenario 300E (of FIG. 3E), a communication may omit traversal of a network communication device 110 for one part of a communication flow even if that network communication device 110 is performing a conversion for another part of the communication flow.

Figure 3G:
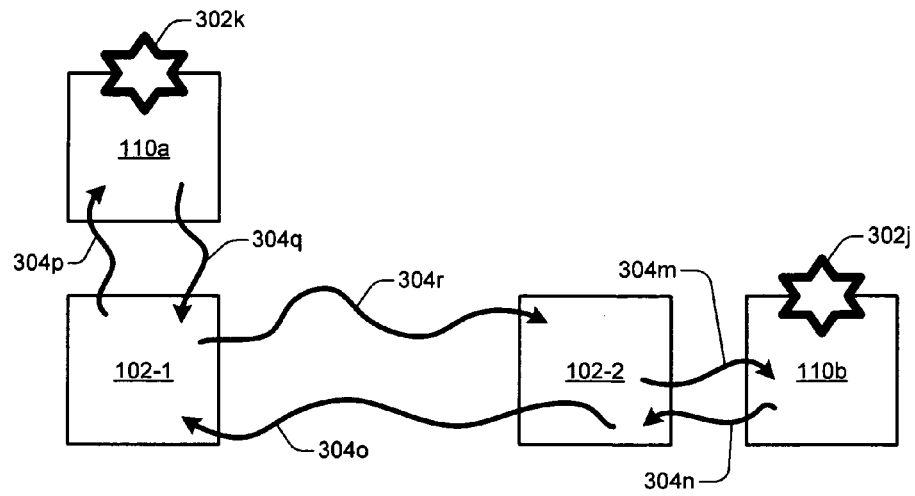
Figure 3H:
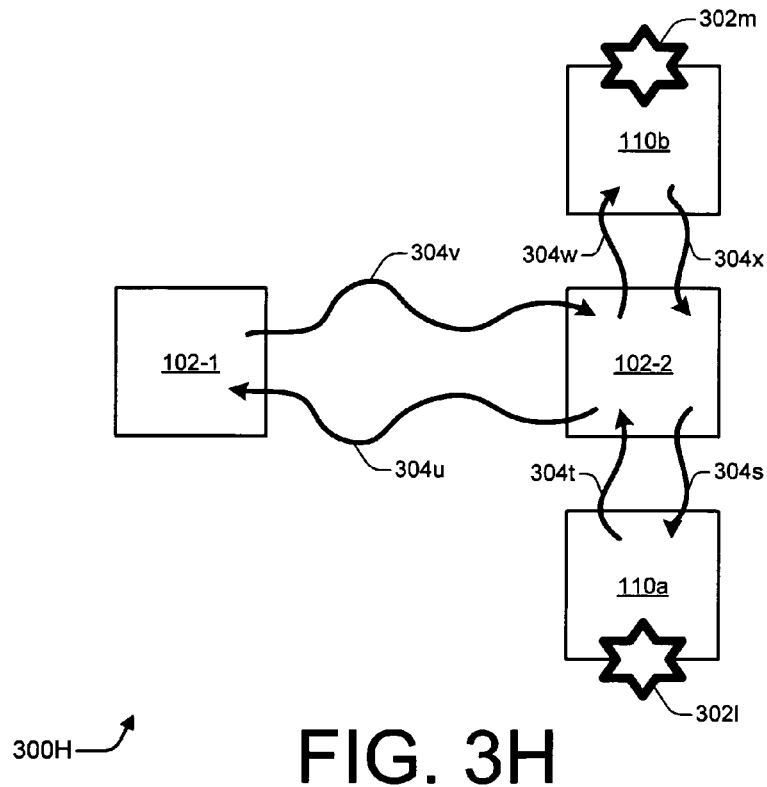

FIGS. 3A-3C illustrate example scenarios 300A-300C in which conversion is performed at a first communication device 102-1 or a second communication device 102-2. A communication device 102 may effectuate a conversion of data from corresponding to one communication modality to corresponding to another communication modality using an on-board converter (e.g., a converter 202). Additionally or alternatively, a communication device 102 may effectuate a conversion of data by causing (e.g., requesting, commanding, notifying, a combination thereof, etc.) a network communication device 110 to perform a conversion. FIGS. 3D-3F illustrate example scenarios 300D-300F in which conversion is performed at a network communication device 110 along a communication path between a first communication device 102-1 and a second communication device 102-2. In contrast, FIGS. 3G and 3H illustrate example scenarios 300G and 300H in which conversion is performed at a network communication device 110 by "farming out" a conversion process. For example, a first communication device 102-1 or a second communication device 102-2 may send data in one communication modality to a network communication device 110 and may receive in return converted data in another communication modality from the network communication device 110.

It should be understood, however, that described scenarios 300A-300H are not mutually exclusive; instead, they may be combined fully or partially or otherwise modified without departing from claimed subject matter. By way of example only, a second communication device 102-2 may perform one conversion itself and farm out another conversion to a network communication device 110. Additionally or alternatively, a network communication device 110 may perform a conversion via an interception of a communication flow, and a first communication device 102-1 may perform another conversion for the communication flow. Additionally or alternatively, a network communication device 110 may itself farm out one, two, or more conversions to other network communication device(s). Moreover, if two or more conversions are farmed out to different network communication devices, the different network communication devices may be associated with (e.g., owned by, managed by, operated by, controlled by, a combination thereof, etc.) different entities. Other combinations or modifications of described scenarios may alternatively be implemented.

For certain example embodiments, with regard to example scenario 300G of FIG. 3G, a conversion 302*j* may be performed at a network communication device 110*b*, or a conversion 302*k* may be performed at a network communication device 110*a*. For certain example implementations, a first user 104-1 may interact with a first communication device 102-1 in accordance with a first communication modality 106-1, or a second user 104-2 may interact with second communication device 102-2 in accordance with a second communication modality 106-2. Second user 104-2 may provide user input interaction at second communication device 102-2 in accordance with second communication modality 106-2. Data corresponding to second communication modality 106-2 may be transmitted from second communication device 102-2 or received at network communication device 110*b* via communication path 304*m*. Data corresponding to second communication modality 106-2 may be converted to data corresponding to first communication modality 106-1 via conversion 302*j*. Data corresponding to first communication modality 106-1 may be transmitted from network communication device 110*b* or received at second communication device 102-2 via communication path 304*n*. Data corresponding to first communication modality 106-1 may be transmitted from second communication device 102-2 or received at first communication device 102-1 via communication path 304*o*.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at network communication device 110*a* via communication path 304*p*. At conversion 302*k*, data corresponding to first communication modality 106-1 may be converted to data corresponding to second communication modality 106-2. Data corresponding to second communication modality 106-2 may be transmitted from network communication device 110*a* or received at first communication device 102-1 via communication path 304*q*. First communication device 102-1 may transmit or second communication device 102-2 may receive data corresponding to second communication modality 106-2 via communication path 304*r*. Second communication device 102-2 may present data corresponding to second communication modality 106-2 as user output to second user 104-2. Although conversions 302*j* and 302*k* are described as being performed after receiving user input but prior to transmission to another communication device 102, one or more conversions may additionally or alternatively be performed after receiving a transmission of data corresponding to one communication modality but prior to presentation of converted data corresponding to another communication modality. Additionally or alternatively, first communication device 102-1 and second communication device 102-2 may farm out conversion to a single network communication device 110. A network communication device 110a or a network communication device 110b may be associated with a same entity or with different entities.

For certain example embodiments, with regard to example scenario 300H of FIG. 3H, a conversion 302l may be performed at a network communication device 110a, or a conversion 302m may be performed at a network communication device 110b. For certain example implementations, a first user 104-1 may interact with a first communication device 102-1 in accordance with a first communication modality 106-1, or a second user 104-2 may interact with second communication device 102-2 in accordance with a second communication modality 106-2. Second communication device 102-2 may accept user input interaction from second user 104-2 in accordance with second communication modality 106-2. Data corresponding to second communication modality 106-2 may be transmitted from second communication device 102-2 or received at network communication device 110a via communication path 304s. Data corresponding to second communication modality 106-2 may be converted to data corresponding to first communication modality 106-1 via conversion 302l. Data corresponding to first communication modality 106-1 may be transmitted from network communication device 110a or received at second communication device 102-2 via communication path 304t. Data corresponding to first communication modality 106-1 may be transmitted from second communication device 102-2 or received at first communication device 102-1 via communication path 304u.

For certain example implementations, first communication device 102-1 may present data corresponding to first communication modality 106-1 to first user 104-1 as user output. First communication device 102-1 may accept user input to acquire data corresponding to first communication modality 106-1. Data corresponding to first communication modality 106-1 may be transmitted from first communication device 102-1 or received at second communication device 102-2 via communication path 304v. Data corresponding to first communication modality 106-1 may be transmitted from second communication device 102-2 or received at network communication device 110b via communication path 304w. At conversion 302m, data corresponding to first communication modality 106-1 may be converted to data corresponding to second communication modality 106-2. Network communication device 110b may transmit or second communication device 102-2 may receive data corresponding to second communication modality 106-2 via communication path 304x. Second communication device 102-2 may present data corresponding to second communication modality 106-2 as user output to second user 104-2. Although conversions 302l and 302m are described as being performed at a certain point along a communication flow, conversions may additionally or alternatively be performed at different points along a communication flow. Additionally or alternatively, second communication device 102-2 may farm out conversions to a single network communication device 110.

Figure 4:
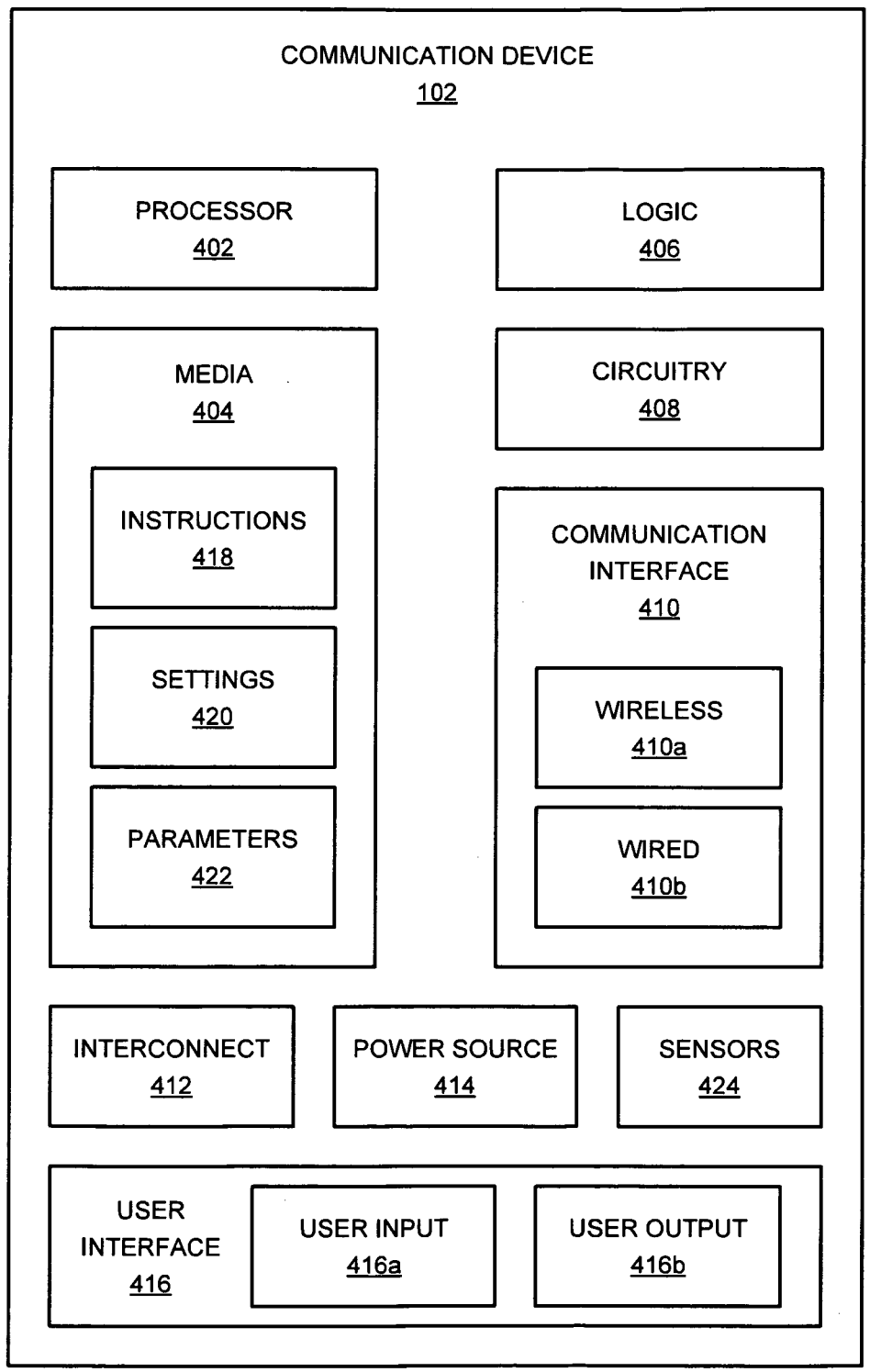
FIG. 4 is a schematic diagram of an example communication device including one or more example components in accordance with certain example embodiments.

FIG. 4 is a schematic diagram 400 of an example communication device including one or more example components in accordance with certain example embodiments. As shown in FIG. 4, a communication device 102 may include one or more components such as: at least one processor 402, one or more media 404, logic 406, circuitry 408, at least one communication interface 410, at least one interconnect 412, at least one power source 414, or at least one user interface 416, one or more sensors 424, any combination thereof, and so forth. Furthermore, as shown in schematic diagram 400, one or more media 404 may comprise one or more instructions 418, one or more settings 420, one or more parameters 422, some combination thereof, and so forth; communication interface 410 may comprise at least one wireless communication interface 410a, at least one wired communication interface 410b, some combination thereof, and so forth; or user interface 416 may comprise at least one user input interface 416a, at least one user output interface 416b, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 402 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 404 may bear, store, contain, provide access to, a combination thereof, etc. instructions 418, which may be executable by processor 402. Instructions 418 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 404 may comprise, by way of example but not limitation, processor-accessible or non-transitory media that is capable of bearing instructions, settings, parameters, a combination thereof, and so forth.

For certain example embodiments, execution of instructions 418 by one or more processors 402 may transform communication device 102 into a special-purpose computing device, apparatus, platform, or any combination thereof, etc. Instructions 418 may correspond to, for example, instructions that are capable of realizing at least a portion of one or more flow diagrams methods, processes, operations, functionality, technology, or mechanisms, etc. that are described herein or illustrated in the accompanying drawings. Settings 420 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings. Parameters 422 may comprise, by way of example but not limitation, one or more indicators that may be established by a user or other entity, one or more indicators that may be determined by a communication device 102, one or more values that may be determined by a user or other entity, one or more values that may be detected by communication device 102, one or more values that may be received from another device that detected them, one or more values that may be determined by communication device 102 or by another device, one or more indicators or values that may determine at least partly how a communication device 102 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 406 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 408 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 408 comprises at least one physical or hardware component or aspect.

For certain example embodiments, one or more communication interfaces 410 may provide one or more interfaces between communication device 102 and another device or a person/operator. With respect to a person/operator, a communication interface 410 may include, by way of example but not limitation, a screen, a speaker, a keyboard or keys, or other person-device input/output features. A wireless communication interface 410a or a wired communication interface 410b may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of communication device 102. Interconnect 412 may comprise, by way of example but not limitation, one or more buses, channels, switching fabrics, or combinations thereof, and so forth. Although not explicitly illustrated in FIG. 4, one or more components of communication device 102 may be coupled to interconnect 412 via a discrete or integrated interface. By way of example only, one or more interfaces may couple a communication interface 410 or a processor 402 to at least one interconnect 412. At least one power source 414 may provide power to components of communication device 102. Power source 414 may comprise, by way of example but not limitation, a battery, a power connector, a solar power source or charger, a mechanical power source or charger, a fuel source, any combination thereof, and so forth.

For certain example embodiments, at least one sensor 424 may sense, produce, or otherwise provide at least one sensor value. Sensors 424 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillator, a light sensor, an inertial measurement unit (IMU), a tactile sensor, a flexibility sensor, multiple ones thereof, any combination thereof, and so forth. Values provided by at least one sensor 424 may comprise, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, flex detections, any combination thereof, and so forth.

For certain example embodiments, a user interface 416 may enable one or more users to interact with communication device 102. Interactions between a user and device may relate, by way of example but not limitation, to touch/tactile/feeling/haptic sensory (e.g., a user may shake, bend, twist, or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 416 may comprise a user input interface 416a, a user output interface 416b, a combination thereof, and so forth. A user input interface 416a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, any combination thereof, and so forth. A user output interface 416b may comprise, by way of example but not limitation, a speaker, a screen (e.g., with or without touch-sensitivity), a vibrating haptic feature, any combination thereof, and so forth. Certain user interfaces 416 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 4 are not necessarily separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with a user, as a user input interface 416a, or as a user output interface 416b. Additionally or alternatively, one or more instructions 418 may function to realize at least one setting 420 or at least one parameter 422.

It should also be understood that for certain example implementations components illustrated in schematic diagram 400 or described herein may not be integral or integrated with a communication device 102. For example, a component may be removably connected to a communication device 102, a component may be wirelessly coupled to a communication device 102, any combination thereof, and so forth. By way of example only, instructions 418 may be stored on a removable card having at least one medium 404. Additionally or alternatively, a user interface 416 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset that may comprise a user interface 416.

Figure 5:
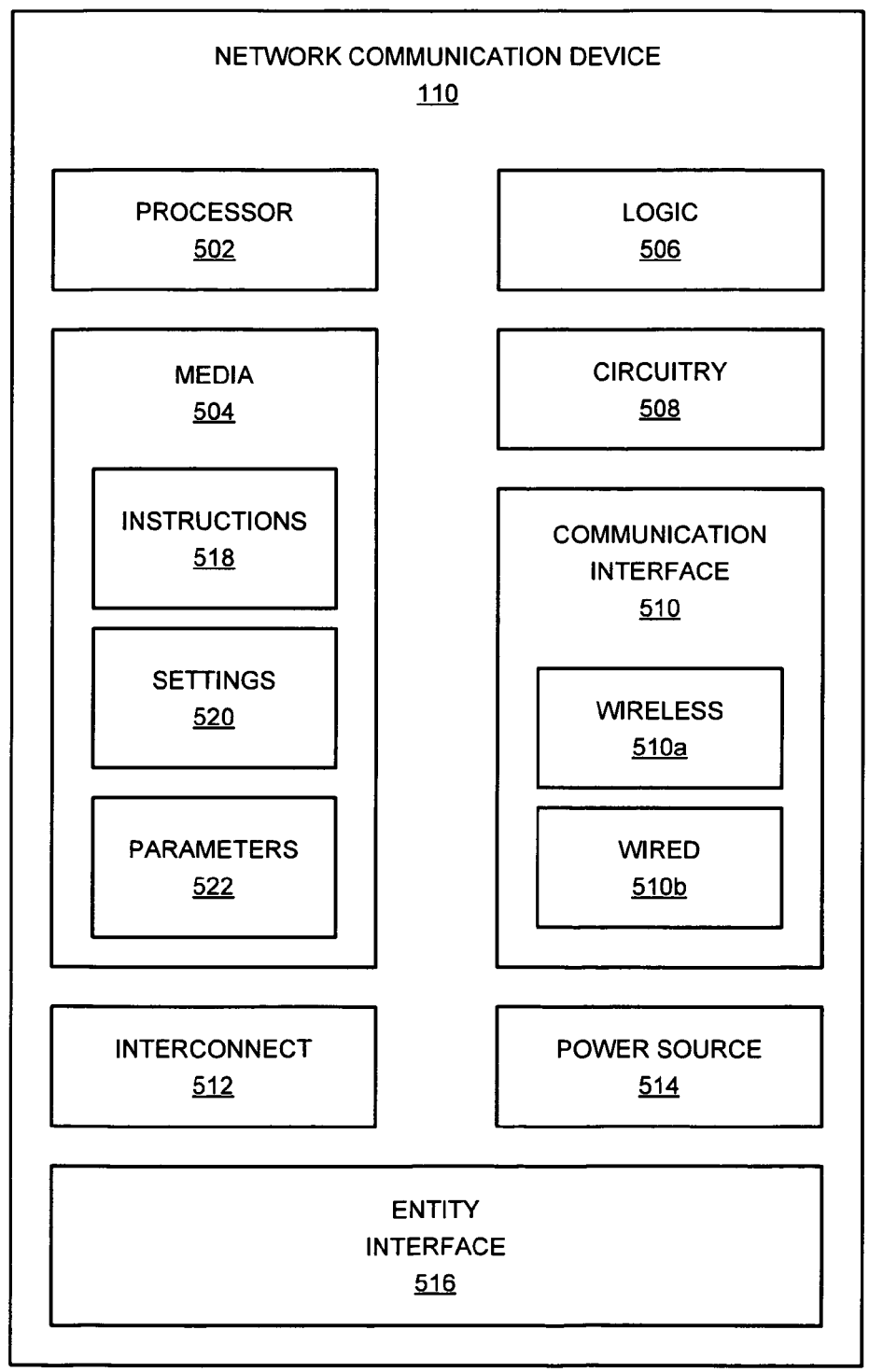
FIG. 5 is a schematic diagram of an example network communication device including one or more example components in accordance with certain example embodiments.

FIG. 5 is a schematic diagram 500 of an example network communication device including one or more example components in accordance with certain example embodiments. As shown in FIG. 5, a network communication device 110 may include one or more components such as: at least one processor 502, one or more media 504, logic 506, circuitry 508, at least one communication interface 510, at least one interconnect 512, at least one power source 514, or at least one entity interface 516, any combination thereof, and so forth. Furthermore, as shown in schematic diagram 500, one or more media 504 may comprise one or more instructions 518, one or more settings 520, one or more parameters 522, some combination thereof, and so forth; or communication interface 510 may comprise at least one wireless communication interface 510a, at least one wired communication interface 510b, some combination thereof, and so forth. However, a network communication device 110 may alternatively include more, fewer, or different components from those that are illustrated without deviating from claimed subject matter.

For certain example embodiments, a network communication device 110 may include or comprise at least one processing or computing device or machine. Network communication device 110 may comprise, for example, a computing platform or any electronic device or devices having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, parameters, a combination thereof, and so forth.

For certain example embodiments, execution of instructions 518 by one or more processors 502 may transform network communication device 110 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a network communication device 110 is to operate or respond to situations, one or more indicators or other values that may be used to realize flow diagrams, methods, processes, operations, functionality, technology, or mechanisms, etc. that are described herein or illustrated in the accompanying drawings. Parameters 522 may comprise, by way of example but not limitation, one or more indicators that may be established by a user or other entity, one or more indicators that may be determined by a network communication device 110, one or more values that may be determined by a user or other entity, one or more values that may be detected by a network communication device 110, one or more values that may be received from another device that detected them, one or more values that may be determined by network communication device 110 or by another device, one or more indicators or values that may determine at least partly how a network communication device 110 is to operate or respond to situations, one or more indicators or values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between network communication device 110 and another device or a person/operator/entity indirectly. A wireless communication interface 510a or a wired communication interface 510b may also or alternatively include, by way of example but not limitation, a transceiver (e.g., transmitter or receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, an internet or telecommunications backbone connector, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of network communication device 110. Interconnect 512 may comprise, by way of example but not limitation, one or more buses, channels, switching fabrics, local area networks (LANs), storage area networks (SANs), or combinations thereof, and so forth. Although not explicitly illustrated in FIG. 5, one or more components of network communication device 110 may be coupled to interconnect 512 via a discrete or integrated interface. By way of example only, one or more interfaces may couple a communication interface 510 or a processor 502 to at least one interconnect 512. At least one power source 514 may provide power to components of network communication device 110. Power source 514 may comprise, by way of example but not limitation, a power connector for accessing an electrical grid, a fuel cell, a solar power source, any combination thereof, and so forth.

For certain example embodiments, an entity interface 516 may enable one or more entities (e.g., other devices, persons, groups, a combination thereof, etc.) to provide input to or receive output from network communication device 110. Interactions between entities and a device may relate, by way of example but not limitation, to inputting instructions, commands, settings, parameters, any combination thereof, and so forth. Certain entity interfaces 516 may enable both entity input and entity output at network communication device 110 or over at least one network link.

It should be understood that for certain example implementations components illustrated separately in FIG. 5 are not necessarily separate or mutually exclusive. For example, a given component may provide multiple functionalities. By way of example only, hard-wired logic 506 may form circuitry 508. Additionally or alternatively, a single component such as connector may function as a communication interface 510 or as an entity interface 516. Additionally or alternatively, one or more instructions 518 may function to realize at least one setting 520 or at least one parameter 522.

It should also be understood that for certain example implementations components illustrated in schematic diagram 500 or described herein may not be integral or integrated with a network communication device 110. For example, a component may be removably connected to a network communication device 110, a component may be wirelessly coupled to a network communication device 110, any combination thereof, and so forth. By way of example only, instructions 518 may be stored on one medium 504, and settings 502 or parameters 522 may be stored on a different medium 504, which may comprise a part of a different server of e.g. a server farm. Additionally or alternatively, respective processor-media pairs may be physically realized on respective server blades. Multiple server blades, for instance, may be linked to realize at least one network communication device 110.

Figure 6A:
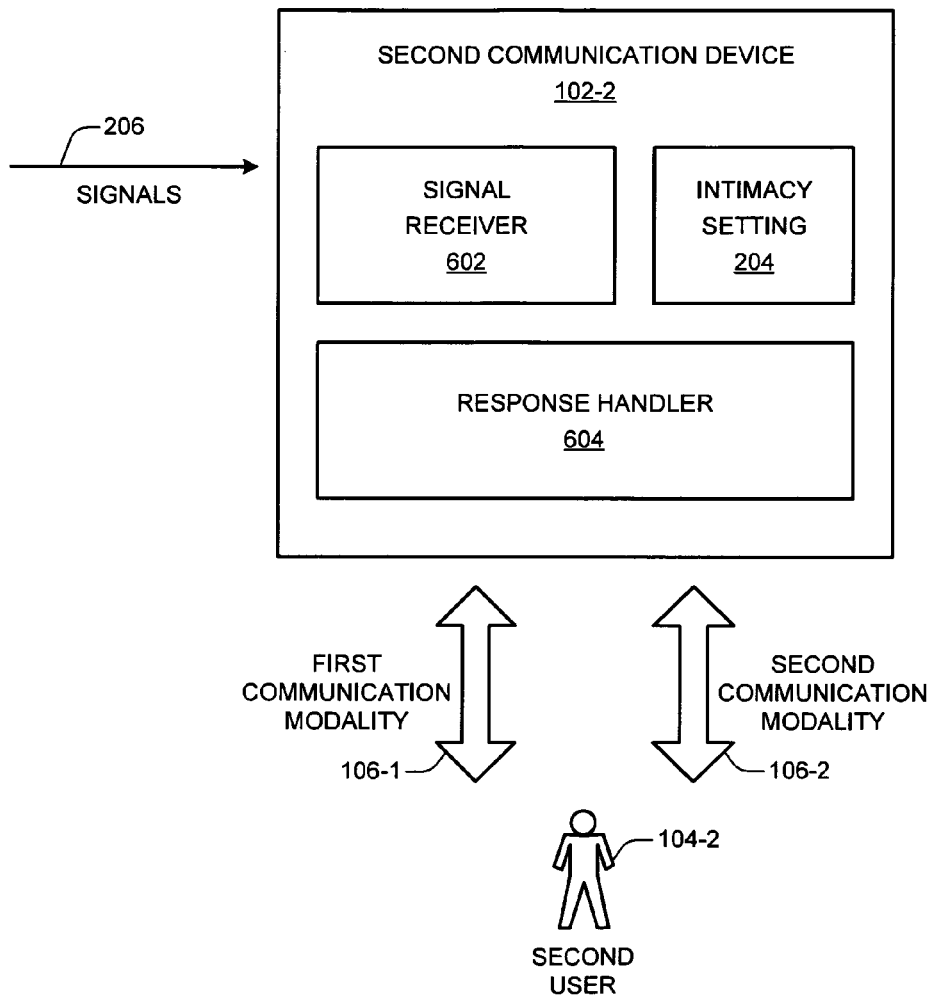
FIG. 6A is schematic diagram of an example communication device that may be participating in a communication using a signal receiver or a response handler in accordance with certain example embodiments.

FIG. 6A is a schematic diagram 600A of an example communication device that may be participating in a communication using a signal receiver or a response handler in accordance with certain example embodiments. As shown in FIG. 6A, by way of example but not limitation, schematic diagram 600A may include a second communication device 102-2, a second user 104-2, a second communication modality 106-2, or one or more signals 206. More specifically, a second communication device 102-2 of schematic diagram 600A may include at least one intimacy setting 204, a signal receiver 602, or a response handler 604.

For certain example embodiments, a second communication device 102-2 may receive one or more signals 206 corresponding to a first communication modality 106-1 (e.g., also of FIG. 1 or 2). A second communication device 102-2 may respond to one or more signals 206 corresponding to first communication modality 106-1 based at least partly on second user 104-2 interaction via a second communication modality 106-2 in accordance with at least one intimacy setting 204. By way of example but not limitation, at least one intimacy setting 204 may indicate what kind of one or more communication modalities a user is willing to expose for at least one communication.

For certain example embodiments, a signal receiver 602 may receive one or more signals 206 corresponding to a first communication modality 106-1. By way of example but not limitation, one or more signals 206 may correspond to first communication modality 106-1 if one or more signals 206 originated at a first communication device 102-1 (e.g., of FIG. 1 or 2) in at least partial dependence on interaction by a first user 104-1 with first communication device 102-1 via first communication modality 106-1, if one or more signals 206 are derived at least partly from interaction by first user 104-1 with first communication device 102-1 via first communication modality 106-1, if one or more signals 206 are encoded to support user input via first communication modality 106-1, if one or more signals 206 are encoded to support user output in accordance with first communication modality 106-1, any combination thereof, and so forth. A response handler 604 may respond to one or more signals 206 corresponding to first communication modality 106-1 based at least partly on second user 104-2 interaction via a second communication modality 106-2 in accordance with at least one intimacy setting 204. Example embodiments with respect to a response handler 604 are described herein below with particular reference to at least FIGS. 6A-6C.

For certain example embodiments, signal receiver 602 and response handler 604 may comprise a single component together, a single component apiece, multiple components, or any combination thereof, and so forth. Example components for a communication device 102 are described herein above with particular reference to at least FIG. 4. By way of example but not limitation, signal receiver 602 may comprise an antenna, a wired connector, a signal downconverter, a baseband processor, a signal processing module (e.g., to account for signal manipulation for a communication protocol, to decrypt, to extract data, a combination thereof, etc.), a processor, hardware, software, firmware, logic, circuitry, any combination thereof, and so forth. By way of example but not limitation, response handler 604 may comprise an intimacy-related module, hardware, software, firmware, logic, circuitry, any combination thereof, and so forth.

Figure 6B:
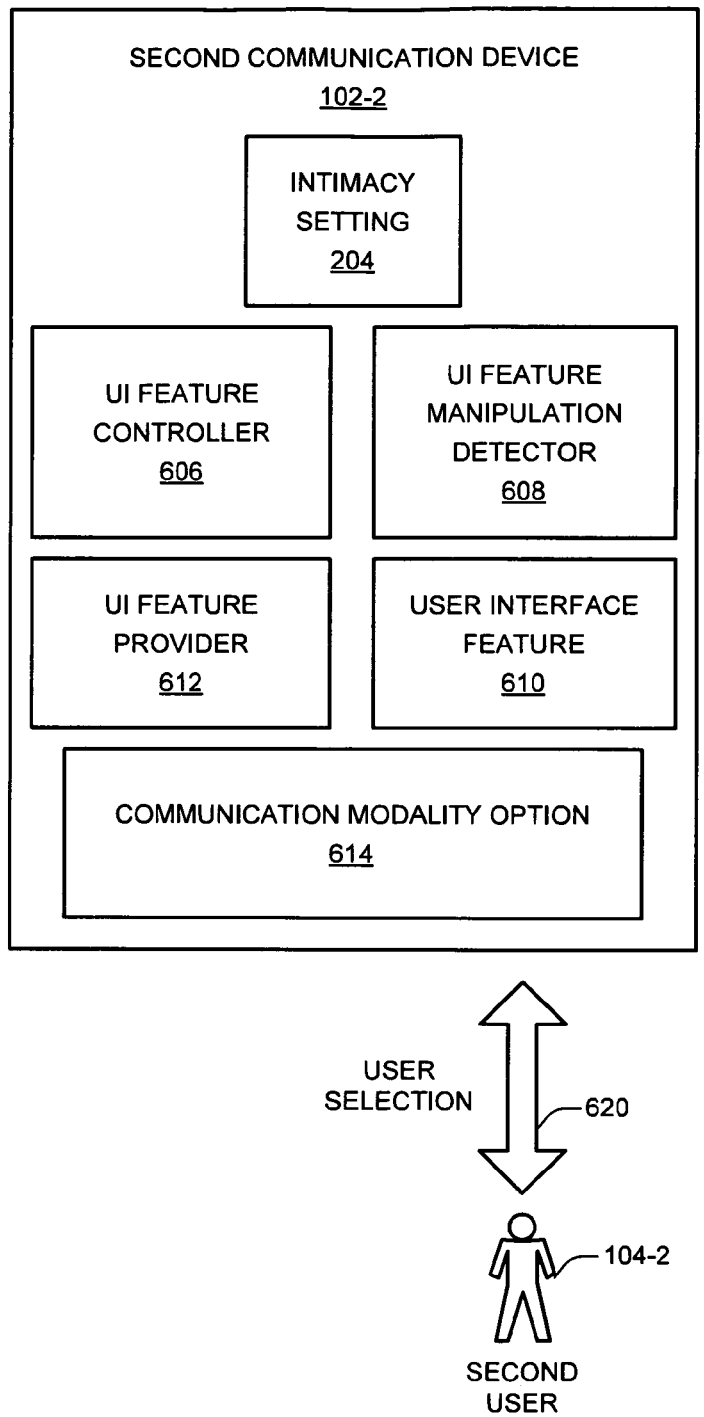
FIG. 6B is a schematic diagram of an example communication device that may realize a user interface feature in accordance with certain example embodiments.

FIG. 6B is a schematic diagram 600B of an example communication device that may realize a user interface feature in accordance with certain example embodiments. As shown in FIG. 6B, by way of example but not limitation, schematic diagram 600B may include a second communication device 102-2, a second user 104-2, or at least one intimacy setting 204. More specifically, a second communication device 102-2 of schematic diagram 600B may include at least one user interface (UI) feature controller 606, at least one user interface feature manipulation detector 608, at least one user interface feature 610, at least one user interface feature provider 612, one or more communication modality options 614, or at least one user selection 620.

For certain example embodiments, a user interface feature 610 may be realized by a second communication device 102-2. Example implementations for a user interface feature 610 are described herein with particular reference to FIGS. 6C-6F, but by way of example and not limitation. A user interface feature 610 may enable a user 104 to operate a communication device 102 with regard to multi-modality communications. A user interface feature 610 may, for example, provide visual, aural, haptic, a combination thereof, etc. output and accept optical, sound, touch, a combination thereof, etc. input to enable a user 104 to establish settings (e.g., at least one intimacy setting 204), to manually or automatically activate a multi-modality communication, any combination thereof, and so forth. For certain example implementations, a user interface feature 610 may include or present one or more communication modality options 614. Certain communication modality options 614 are described, by way of example but not limitation, with particular reference to FIGS. 6D-6F. In an example operation, user selection 620 of a communication modality option 614 may enable a user 104 to establish one or more settings, establish one or more auto-activation parameters, manually activate a multi-modality communication, any combination thereof, and so forth.

For certain example embodiments, a user interface feature provider 612 may provide a user interface feature 610. A user interface feature manipulation detector 608 may detect if or when a user interface feature 610 is being manipulated by a user 104. A user interface feature controller 606 may control an implementation or realization of a user interface feature. For certain example implementations, a user interface feature controller 606 may control interactions between user interface feature manipulation detector 608 or user interface feature provider 612, or a user interface feature controller 606 may control interactions among user interface feature provider 612, user interface feature manipulation detector 608, or one or more other components of a communication device 102. For instance, a user interface feature controller 606 may provide access to one or more signals 206 (e.g., of FIG. 2 or 6A) for user interface feature provider 612, may provide access to calling functionality of a communication device 102, may provide access to display functionality of a communication device 102, may provide access to speaker or vibratory functionality of a communication device 102, may provide access to an operating system resident on a communication device 102 (e.g., to make system or operating system calls, to interact with an application if a user interface feature or multi-modality communication is at least partially implemented by an application that is separate from or executing on an operating system), may provide access to user interface components 416, any combination thereof, and so forth. However, claimed subject matter is not limited to any particular described embodiments, implementations, examples, etc.

Figure 6C:
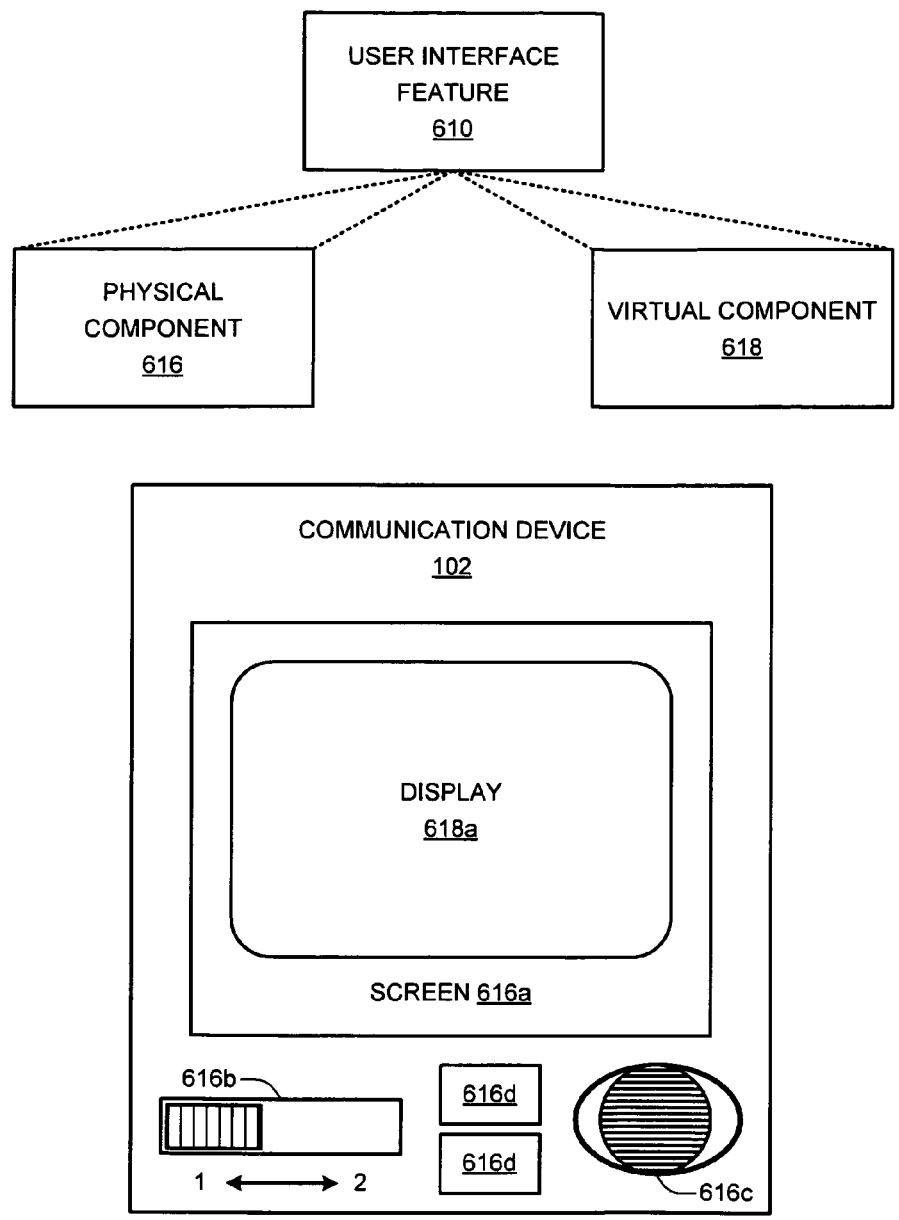
FIG. 6C is a schematic diagram of an example communication device that may include a physical component or a virtual component of a user interface feature in accordance with certain example embodiments.

FIG. 6C is a schematic diagram 600C of an example communication device that may include a physical component or a virtual component of a user interface feature in accordance with certain example embodiments. As shown in FIG. 6C, by way of example but not limitation, schematic diagram 600C may include a communication device 102 or a user interface feature 610. More specifically, schematic diagram 600C may include at least one physical component 616 of a user interface feature 610 or at least one virtual component 618 of a user interface feature 610.

For certain example embodiments, a user interface feature 610 may comprise one or more physical components 616, one or more virtual components 618, any combination thereof, and so forth. By way of example but not limitation, a physical component 616 of a user interface feature 610 may comprise a component that is at least partially implemented in hardware as part of a communication device 102. Examples of physical components 616 may include, but are not limited to, at least one knob, at least one dial, at least one slider, at least one switch, one or more keys (e.g., that are part of a numeric, alphabetical, alphanumeric, etc. keypad or keyboard), one or more buttons, at least one trackball, at least one track wheel, at least one joystick, a track stick, or at least one touch-sensitive surface (e.g., a touch-sensitive screen, a track pad, etc.). Physical components 616 (e.g., a knob, a switch, a slider, a dial, a key, a button, a trackball, a track wheel, etc.) may be physically moveable by a user. A physical component 616 may be integrated with a communication device 102. A physical component 616 may be a hardware input/output component that is dedicated (e.g., temporarily or permanently) to a user interface feature 610. Examples of physical components 616 that are illustrated in schematic diagram 600C may include, by way of example but not limitation, a touch-sensitive screen 616a, a switch 616b, a trackball or track wheel 616c, a button 616d or key 616d, a combination thereof, and so forth. As shown, by way of example but not limitation, a switch 616b may be switched between a first communication modality 106-1 or a second communication modality 106-2 (e.g., of FIG. 1, 2, or 6A). Examples of physical components 616 may further include, but are not limited to, a docking component, a device alteration component (e.g., to fold/unfold a device, to slide open or closed a device, a combination thereof, etc.), any combination thereof, and so forth. Examples of manipulations of a user interface feature 610 may further include, by way of example but not limitation, a gesture, an utterance, a tapping, a shaking, non-vocal audio, a physical movement of a device (e.g., opening, closing, unfolding, folding, sliding, unlocking, locking, docking, undocking, a combination thereof, etc.), any combination thereof, and so forth. However, claimed subject matter is not limited to any particular described embodiments, implementations, examples, etc.

For certain example embodiments, a user interface feature 610 may comprise one or more virtual components 618. By way of example but not limitation, a virtual component 618 of a user interface feature 610 may comprise a component that is at least partially implemented in software or firmware as part of a communication device 102. Examples of virtual components 618 may include, but are not limited to, a visual presentation, an aural presentation, a haptic presentation, any combination thereof, and so forth. For certain example implementations, a virtual component 618 may be displayed on a screen, played on a speaker, projected on a screen or other surface, vibrated by a device, any combination thereof, and so forth. A virtual component 618 may be reconfigurable during operation. A virtual component 618 may be displayed at one moment, altered at another moment, removed from a display at another moment, played momentarily, a combination thereof, and so forth. An example of a virtual component 618 that is illustrated in schematic diagram 600C may include, by way of example but not limitation, a display 618a. Physical components 616 or virtual components 618 may not be mutually exclusive. For example, a screen 616a may serve to present a virtual component 618 (e.g., a display 618a) on a physical component 616. Additionally or alternatively, a physical component 616 (e.g., a trackball 616c or a button/key 616d) may be used to select an aspect of a virtual component 618 (e.g., that is part of a display 618a, that has been presented as an aural menu of choices, any combination thereof, etc.). However, claimed subject matter is not limited to any particular described embodiments, implementations, examples, etc.

Figure 6D:
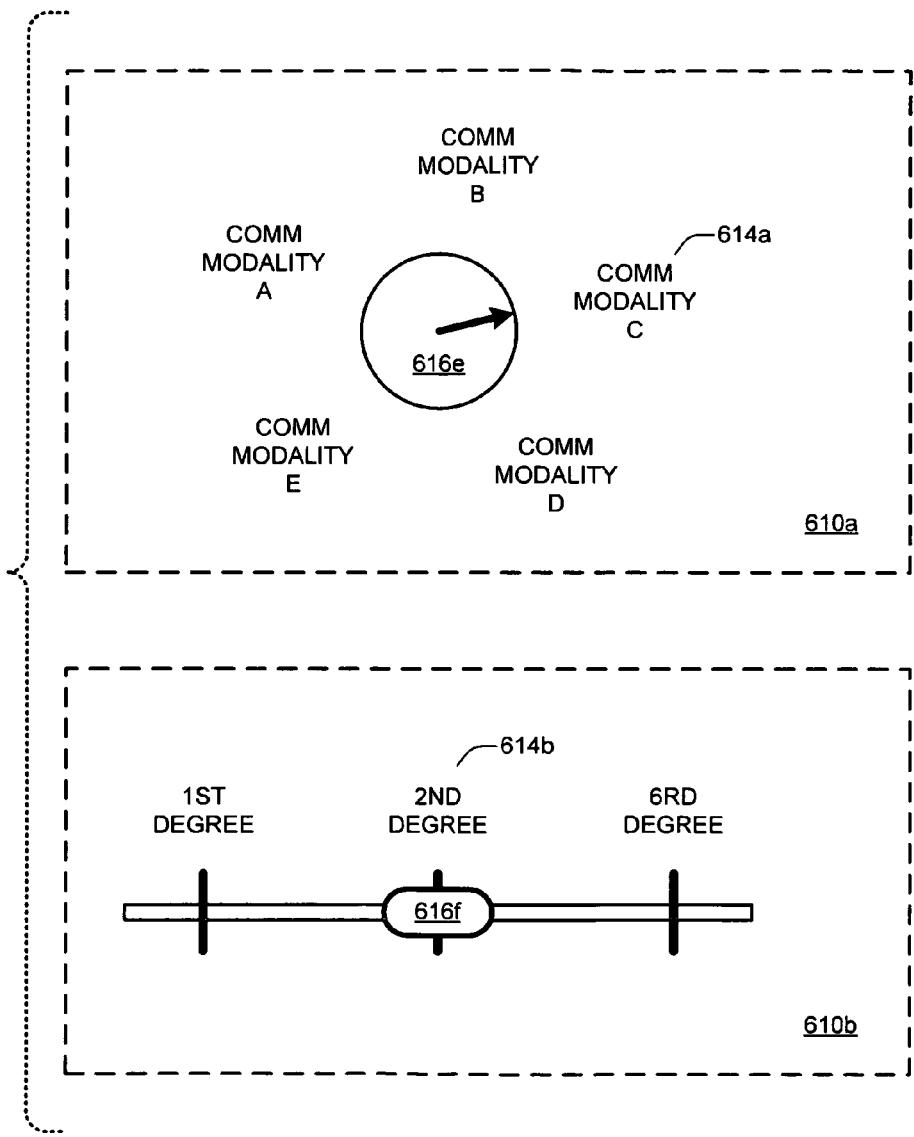
FIGS. 6D-6F are schematic diagrams of example user interface features in accordance with certain example embodiments.
Figure 6E:
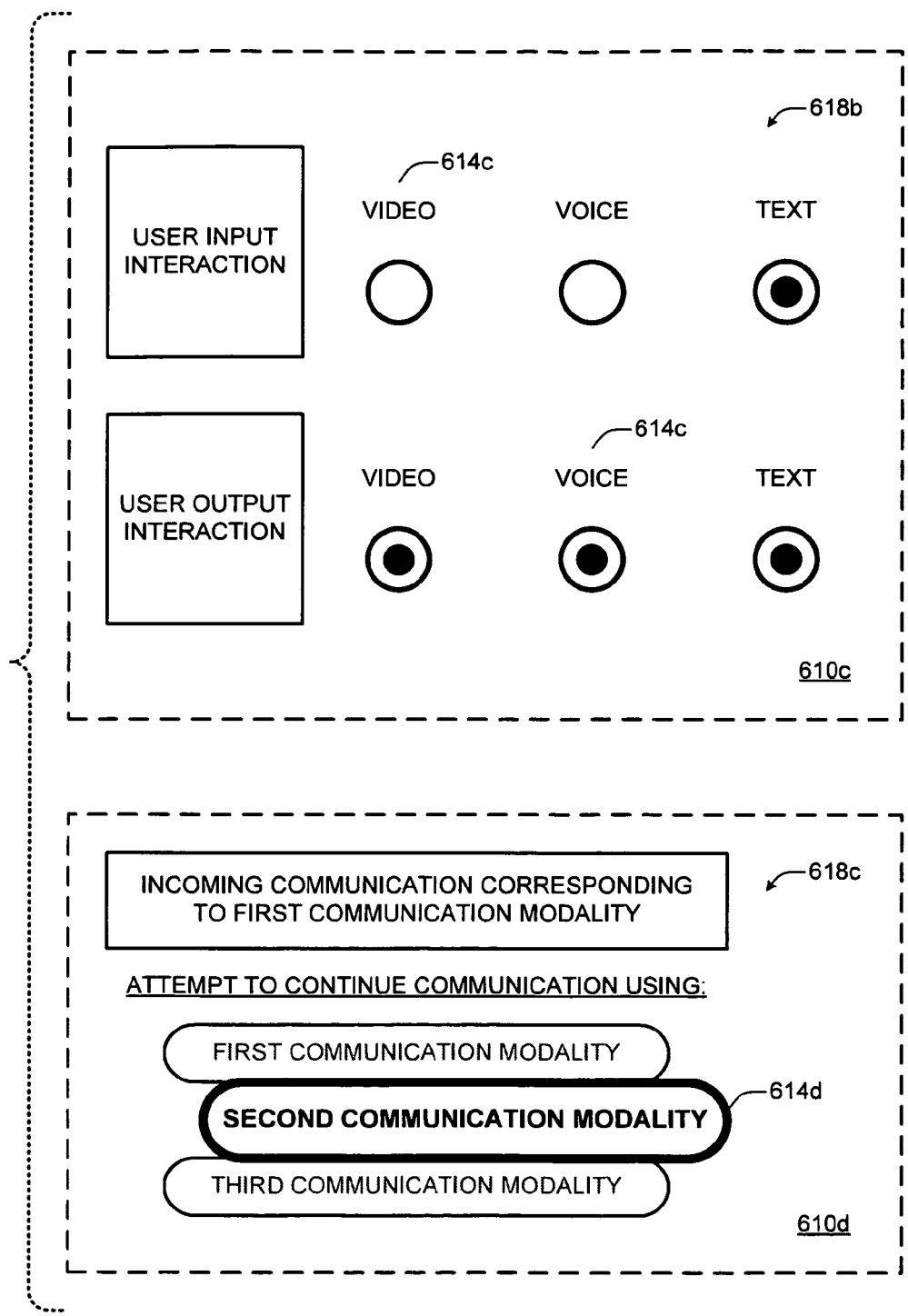
Figure 6F:
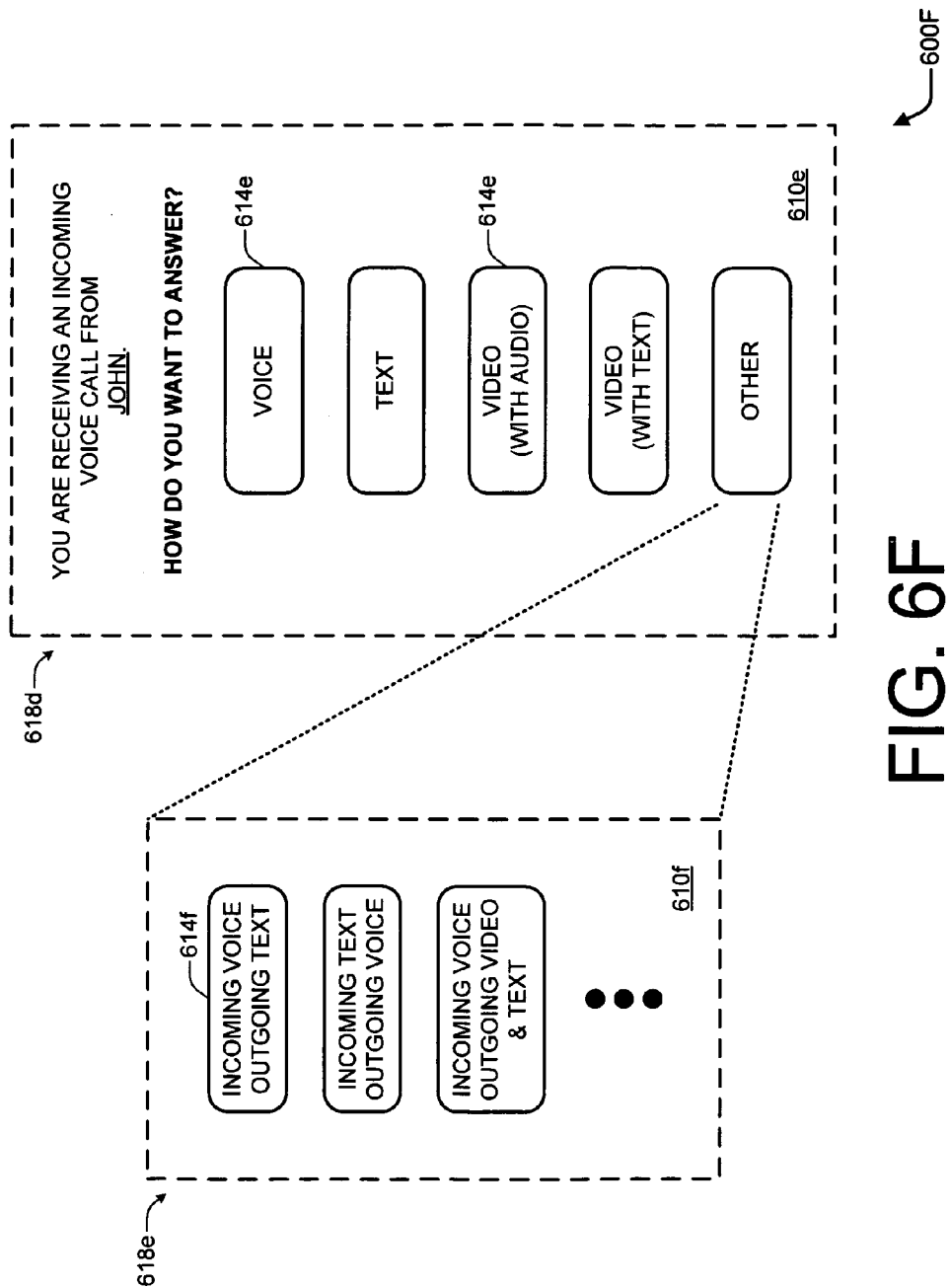

FIGS. 6D-6F are schematic diagrams 600D-600F of example user interface features in accordance with certain example embodiments. As shown in FIGS. 6D-6F, by way of example but not limitation, schematic diagrams 600D-600F may include one or more example user interface features 610a-610f. More specifically, schematic diagram 600D illustrates example user interface feature 610a or 610b that may be implemented at least partially as physical components 616. Schematic diagram 600E illustrates example user interface feature 610c or 610d that may be implemented at least partially as virtual components 618. Schematic diagram 600F illustrates example user interface feature 610e or 610f that may be implemented at least partially as virtual components 618. Schematic diagrams 600D-600F also illustrate examples of communication modality options 614. However, claimed subject matter is not limited to any particular described embodiments, implementations, examples, etc. in schematic diagrams 600D-600F of FIGS. 6D-6F

For certain example embodiments, as shown in schematic diagram 600D of FIG. 6D, a user interface feature 610a is illustrated. User interface feature 610a may comprise a dial or knob 616e that enables a user to adjust an intimacy setting 204 (e.g., of FIG. 2, 6A, 6B, etc.). For an example implementation, intimacy knob 616e may be rotated to any of five different communication modalities A, B, C, D, or E. Each respective communication modality A, B, C, D, or E may be represented by a respective communication modality option 614a. (For the sake of visual clarity, each communication modality option 614 may not be separately identified by reference number in each schematic diagram. For instance, one of five communication modality options 614a is explicitly identified for user interface feature 610a.) Each communication modality may correspond, by way of example but not limitation, to a type of user interaction with a communication device, to a type of user interaction with a communication device for user input interaction, to a type of user interaction with a communication device for user output interaction, any combination thereof, and so forth.

For certain example embodiments, as shown in schematic diagram 600D of FIG. 6D, a user interface feature 610b is illustrated. User interface feature 610b may comprise a slider 616f that enables a user to adjust an intimacy setting. For an example implementation, slider 616f may be slid to any of three different communication modalities that correspond to different degrees of communicative exposure: a first degree, a second degree, or a third degree. Each communicative exposure degree may be represented by a respective communication modality option 614b. Each communication modality may correspond, by way of example but not limitation, to textual communication, speech communication, video communication at a first resolution, video communication at a second higher resolution, video communication with stereoscopic (e.g., 3D) images, facial video communication, full-body video communication, any combination thereof, and so forth. Although shown and described in terms of a physical component 616, a dial 616e or a slider 616f may additionally or alternatively be implemented as a virtual component 618 (e.g., that is displayed on a screen, that is played on a speaker, a combination thereof, etc.).

For certain example embodiments, as shown in schematic diagram 600E of FIG. 6E, a user interface feature 610c is illustrated. User interface feature 610c may comprise a display 618b that is separated into user input interaction (e.g., at an upper row) and into user output interaction (e.g., at a lower row). For an example implementation, one or more communication modalities that are presented (e.g., in a menu, that are produced via selection of a menu item, a combination thereof, etc.) may be selected for user input interaction or user output interaction via one or more buttons (e.g., "radio-style" buttons in which selecting one button deselects other button(s), such as those shown at an upper row; buttons in which multiple ones may be selected, such as those shown in a lower row; a combination thereof; etc.). Display 618b may be presented to a user so that a user may adjust input or output user interaction communication modalities, which may be represented by one or more communication modality options 614c. By way of example but not limitation, a user may select video, voice, or text. As shown for example user interface feature 610c, a user has selected to provide input to a communication device as text but to accept output from a communication device as video, voice, or text. A user may make such selections if, for instance, a user is at home and may see, hear, read, etc. incoming communicative signals but wishes to limit outgoing communicative signals because the user has not yet made themselves professionally presentable. Additional or alternative implementations for a virtual component display 618b may include, but are not limited to, at least one selector, at least one checkbox, any combination thereof, and so forth.

For certain example embodiments, as shown in schematic diagram 600E of FIG. 6E, a user interface feature 610d is illustrated. User interface feature 610d may comprise a display 618c that is presented in response to receiving an incoming communication that corresponds to, e.g., a first communication modality. A communication device may ask a user if the user wishes to attempt to continue the communication using one or more communication modality options 614d. For an example implementation, one or more communication modality options 614d may be presented to a user via a menu that is capable of scrolling (e.g., up, down, left, right, a combination thereof, etc.) as shown. A user may scroll through communication modality options 614d until a desired communication modality option is identified or selected. As shown, a second communication modality option may be highlighted for selection by a user via a touch, a movement of a physical component (e.g., including at least one individual component; multiple components; components forming a communication device, such as those enabling sliding or folding; a combination thereof; etc.), some combination thereof, and so forth.

For certain example embodiments, as shown in schematic diagram 600F of FIG. 6F, a user interface feature 610e is illustrated. User interface feature 610e may comprise a display 618d having a pop-up menu that is presented to a user if, by way of example but not limitation, an incoming voice call from a particular person (e.g., "John") is received. A communication device may inquire as to how a user wishes to answer John's incoming voice call. Multiple communication modality options 614e are shown as virtual buttons that may be selected. By way of example but not limitation, available communication modality options may comprise "Voice", "Text", "Video (with Audio)", "Video (with Text)", "Other", and so forth. If a second user selects "Video (with Text)", for instance, a second communication device may answer the voice call and offer to continue the communication with a first user associated with a first communication device under a condition that the second user may interact with the second communication device in accordance with video and text (e.g., which might be desired if a local user is currently located in a noisy environment).

For certain example embodiments, as shown in schematic diagram 600F of FIG. 6F, a user interface feature 610f is illustrated. User interface feature 610f may comprise a display 618e comprising another pop-up menu, which may be presented if a user selects an "Other" virtual button of user interface feature 610e. Multiple communication modality options 614f are shown as virtual buttons that may be selected. By way of example but not limitation, available communication modality options may comprise "Incoming Voice—Outgoing Text", "Incoming Text—Outgoing Voice", and "Incoming Voice—Outgoing Video & Text", and so forth. If a second user selects an "Incoming Voice—Outgoing Text" button, for instance, the second user may interact with a second communication device in accordance with voice communications for device output interaction (e.g., may hear a voice via at least one speaker) and may interact with the second communication device in accordance with textual communications for device input interaction (e.g., may type in text via a physical or a virtual keyboard).

Multiple different embodiments may additionally or alternatively be implemented with regard to at least schematic diagrams 600D-600H of FIGS. 6D-6H. For example, degrees of communicative exposure (e.g., of communication modality options 614b of FIG. 6D) may be presented as radio-style buttons (e.g., like communication modality options 614c of FIG. 6E). As another example, display(s) at least similar or analogous to display 618c, 618d, or 618e may be presented to establish at least one intimacy setting 204 prior to arrival of an incoming communication notification (e.g., as a current default setting). As yet another example, communication modality options 614e (e.g., of user interface feature 610e of FIG. 6F) or communication modality options 614c (e.g., of user interface feature 610c of FIG. 6E) may be presented as a slider interface (e.g., as shown in schematic diagram 600D as part of user interface feature 610b of FIG. 6D). As another example, a user interface feature 610 may be accessible via a widget, an icon, a hotkey, a dropdown menu, a press or click and hold mechanism, a combination thereof, etc. of a communication device 102. However, claimed subject matter is not limited to any particular described embodiments, implementations, examples, etc.

Figure 6G:
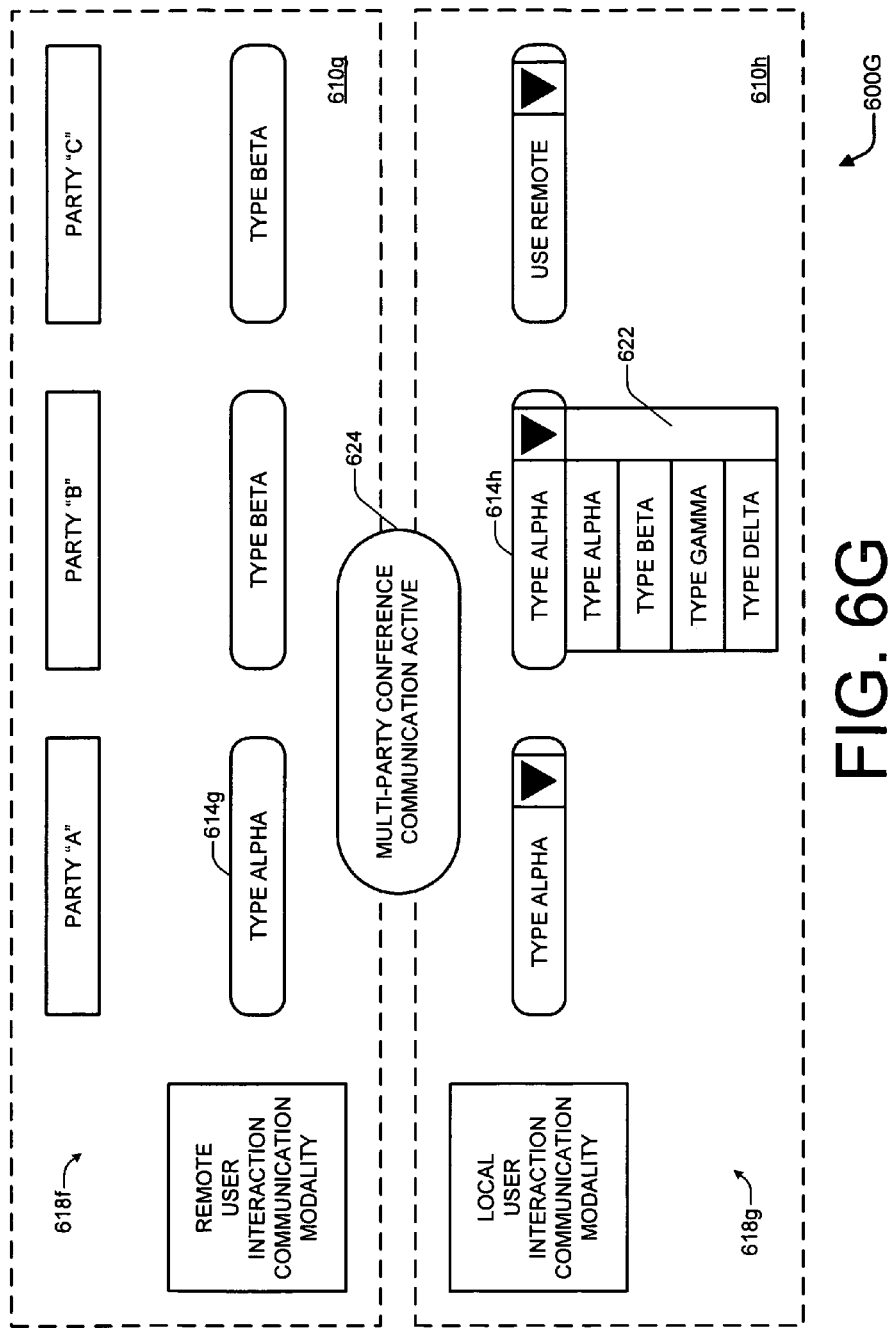
FIGS. 6G-6H are schematic diagrams of example multi-party user interface features in accordance with certain example embodiments.
Figure 6H:
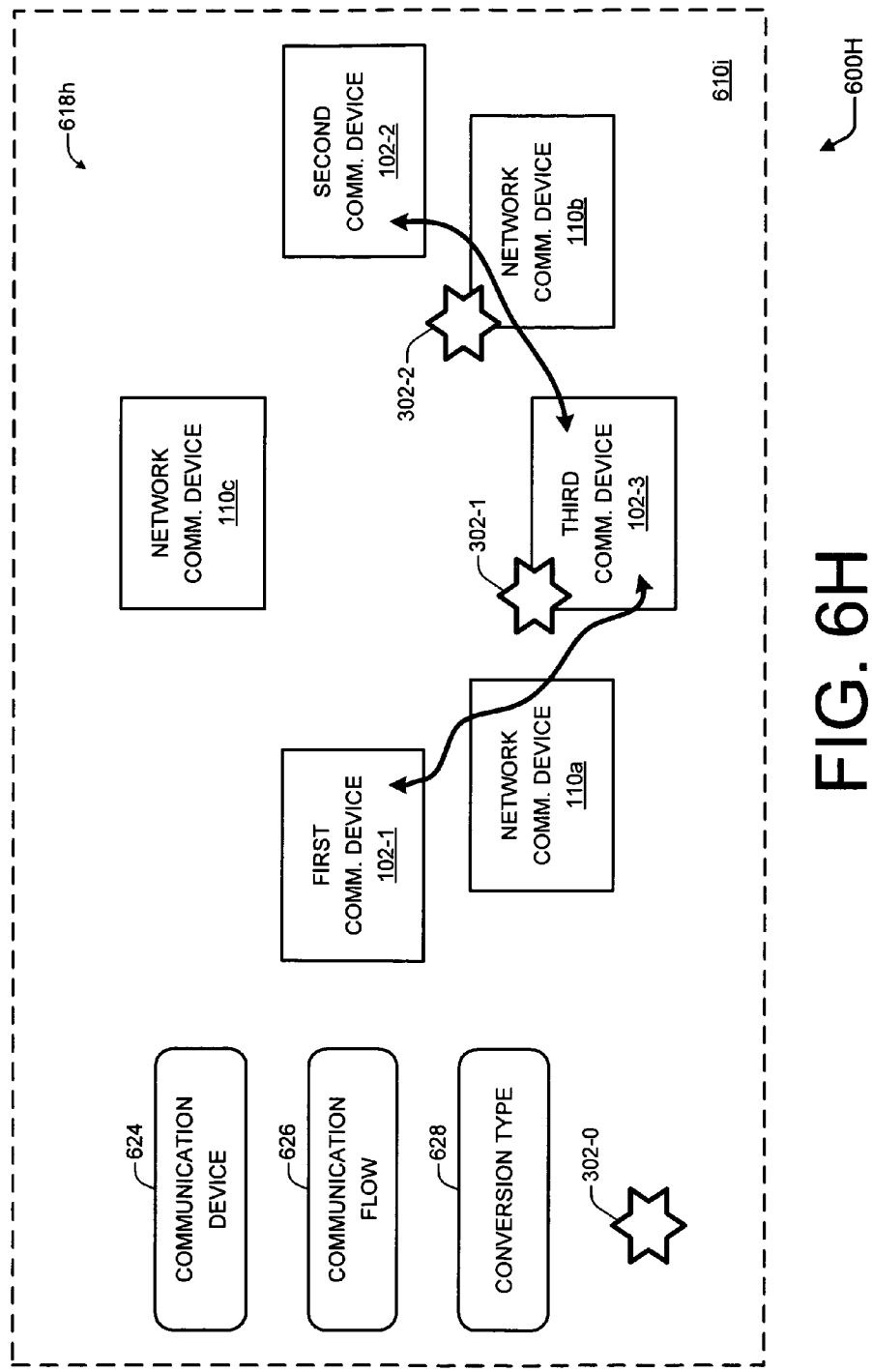

FIGS. 6G-6H are schematic diagrams 600G-600H of example multi-party user interface features in accordance with certain example embodiments. As shown in FIGS. 6G-6H, by way of example but not limitation, schematic diagrams 600G-600H may include one or more example user interface features 610g-610i. More specifically, schematic diagram 600G illustrates example user interface feature 610g or 610h that may be implemented at least partially as one or more virtual components 618. Schematic diagram 600H illustrates example user interface feature 610i that may be implemented at least partially as one or more virtual components 618. Schematic diagrams 600G-600H also illustrate examples of communication modality options 614. However, claimed subject matter is not limited to any particular described embodiments, implementations, examples, etc. in schematic diagrams 600G-600H of FIGS. 6G-6H.

For certain example embodiments, as shown in schematic diagram 600G of FIG. 6G, a user interface feature 610g is illustrated. User interface feature 610g may comprise a display 618f having one or more indicators for at least one user interaction communication modality for remote devices (e.g., a remote device may comprise a device that is not a local device presenting the one or more indicators) or for remote users. For an example implementation, a remote communication device or a remote user may be represented by a at least one icon (e.g., an image representing a kind, appearance, location, etc. of a device or user), by at least one identifier of the remote communication device (e.g., a phone number, a mobile subscriber number, a medium access control (MAC) value, a network address, an account, a user associated therewith, a combination thereof, etc.), by at least one identifier of at least one user of the remote communication device (e.g., a name of an individual, a relationship of an individual, an email address of an individual, a combination thereof, etc.), any combination thereof, and so forth. As shown in FIG. 6G, for instance, a remote communication device or user may be represented by "Party 'A'", "Party 'B'", "Party 'C'", and so forth. Although three participants are shown, more or fewer than three participants may be party to a multi-party multi-modality conference communication. For an example implementation, a participant may be illustrated in association with at least one communication modality type. As shown in schematic diagram 600G, for instance, a communication modality option 614g may indicate a user interaction type that a remote user is currently utilizing to interact with a remote communication device, such as "Type Alpha", "Type Beta", any combination thereof, and so forth. Although not explicitly shown in FIG. 6G, indicated or selectable communication modality types may be separated into or identifiable as a user input communication modality type or a user output communication modality type to separately relate to user input interaction or to user output interaction, respectively. However, claimed subject matter is not limited to any particular described embodiments, implementations, examples, etc.

For certain example embodiments, as shown in schematic diagram 600G of FIG. 6G, a user interface feature 610h is illustrated. User interface feature 610h may comprise a display 618g having one or more selectable indicators for at least one user interaction communication modality for a local device (e.g., a local device may comprise a device that is not a remote device but may be presenting one or more selectable indicators, which may correspond to one or more remote devices) or a local user. For an example implementation, a selectable local user interaction communication modality may be realized as a communication modality option 614h. As shown in FIG. 6G, for instance, a selectable indicator 622 for a user interaction communication modality for a local user may be realized as a drop-down menu. Additionally or alternatively, a selectable indicator 622 may be realized as at least one knob, as one or more buttons, as at least one slider, as a sliding menu, as a pop-up menu, as any combination thereof, and so forth. For an example implementation, a local user may select at least one respective user interaction communication modality to use locally with respect to at least one respective remote communication device or a respective remote user. Example interaction communication modalities are shown in FIG. 6G, for instance, as "Type Alpha", "Type Beta", "Type Gamma", "Type Delta", any combination thereof, and so forth. Additionally or alternatively, a local user may select that he or she intends or wishes to use a same communication modality that a remote user or a remote communication device is currently utilizing (e.g., a "Use Remote" communication modality option). By way of example but not limitation, a local user may be interacting with a local device in accordance with a "Type Alpha" user interaction communication modality with regard to one participant (e.g., "Party 'A'") and may be interacting with the local device in accordance with a "Type Beta" user interaction communication modality with regard to another participant (e.g., "Party 'B'"). Although not explicitly shown in FIG. 6G, indicated or selectable communication modality types may be separated into or identifiable as a user input communication modality type or a user output communication modality type to separately relate to user input interaction or to user output interaction, respectively. However, claimed subject matter is not limited to any particular described embodiments, implementations, examples, etc.

For certain example embodiments, at least one indicator or activator user interface feature 624 may be presented by a local communication device to a local user. An example indicator or activator user interface feature 624 as shown in FIG. 6G, for instance, may read "Multi-Party Conference Communication Active". For an example implementation, an indicator or activator user interface feature 624 may be presented by a local communication device if a multi-party multi-modality conference communication currently exists or is active. Additionally or alternatively, an indicator or activator user interface feature 624 may be selected by a user to cause a local communication device to initiate or create a multi-party multi-modality conference communication. However, claimed subject matter is not limited to any particular described embodiments, implementations, examples, etc.

For certain example embodiments, as shown in schematic diagram 600H of FIG. 6H, a user interface feature 610i is illustrated. User interface feature 610i may comprise a display 618h having multiple items (e.g., text, icons, images, symbols, buttons, combinations thereof, etc.). For an example implementation, items that may be presented may include or correspond to, but are not limited to, a first communication device 102-1, a second communication device 102-2, a third communication device 102-3, a network communication device 110*a*, a network communication device 110*b*, a network communication device 110*c*, any combination thereof, and so forth. Items that may be presented may additionally or alternatively include, but are not limited to, at least one conversion 302, a communication device 624, a communication flow 626, a conversion type 628, any combination thereof, and so forth. A display 618*h* may indicate a location of one or more conversions 302, may enable a user to establish at least one conversion 302 or stipulate where at least one conversion 302 is to be performed, any combination thereof, and so forth. For an example implementation, selection of a communication device 624 button, a communication flow 626 button, or a conversion type 628 button may reveal participating communication devices, extant communication flows, conversion types (e.g., an originating user interaction communication modality or a destination user interaction communication modality result from at least one conversion), respectively, to at least a local user. Additionally or alternatively, selection of a communication device 624 button, a communication flow 626 button, or a conversion type 628 button may enable at least a local user to add or remove a communication device to or from a multi-party multi-modality communication; add or remove a communication flow to or from a multi-party multi-modality communication; add, remove, or modify a conversion 302; respectively. A conversion 302 or a location of (e.g., a device to perform) a conversion 302 may be stipulated, by way of example but not limitation, by dragging a conversion 302-0 icon to a location, such as a location shown for a conversion 302-1 icon or a conversion 302-2 icon. Additionally or alternatively, a user may select a location and then stipulate a conversion (e.g., from a pop-up menu). By way of example only, a first example communication flow is depicted with display 618*h* as a double-headed arrow that extends between first communication device 102-1 and third communication device 102-3 and across network communication device 110*a*, and a second example communication flow is depicted as a double-headed arrow that extends between second communication device 102-2 and third communication device 102-3 and across network communication device 110*b*. However, claimed subject matter is not limited to any particular described embodiments, implementations, examples, etc.

FIGS. 7A-7F are schematic diagrams 700A-700F that include at least one example communication device and that depict example scenarios for multi-party multi-modality communication in accordance with certain example embodiments. As shown in FIGS. 7A-7F, by way of example but not limitation, schematic diagrams 700A-700F may include a first communication device 102-1, a second communication device 102-2, a third communication device 102-3, at least a third user 104-3, at least one network communication device 110, at least one user interaction communication modality 706, or at least one conversion 708. Each of schematic diagrams 700A-700F may include alternative or additional depictions, which may relate to multi-party multi-modality communication, as described herein below. In addition to or in alternative to description herein below with reference to FIGS. 7A-7F, schematic diagrams 700A-700F may have further example descriptions with reference to FIGS. 8A-8H. However, claimed subject matter is not limited to any particular described embodiments, implementations, examples, etc.

FIG. 7A is a schematic diagram 700A that includes at least one example communication device and that depicts at least one example scenario for multi-party multi-modality communication in accordance with certain example embodiments. As shown in FIG. 7A, by way of example but not limitation, schematic diagram 700A may include a first communication device 102-1, a second communication device 102-2, a third communication device 102-3, at least a third user 104-3, at least one network communication device 110, at least one communication flow 702, at least some communication data 704, at least one user interaction communication modality 706, or at least one conversion 708. More specifically, schematic diagram 700A may include a first communication flow 702-1, a second communication flow 702-2, first communication data 704-1, or second communication data 704-2.

For certain example embodiments, a multi-party multi-modality communication may include multiple participants (e.g., multiple users 104, multiple communication devices 102, a combination thereof, etc.). For an example implementation, a multi-party multi-modality communication may include at least first communication device 102-1, second communication device 102-2, and third communication device 102-3. A multi-party multi-modality communication may include one or more communication flows 702. A communication flow 702 may be unidirectional or bidirectional or multidirectional. A communication flow 702 may be comprised of communication data 704.

For certain example embodiments, a multi-party multi-modality communication may include a first communication flow 702-1 having first communication data 704-1 or a second communication flow 702-2 having second communication data 704-2. For an example implementation, a first communication flow 702-1 may comprise first communication data 704-1 that is transmitted between a first communication device 102-1 and a third communication device 102-3 (e.g., transmitted from first communication device 102-1 to third communication device 102-3, transmitted from third communication device 102-3 to first communication device 102-1, a combination thereof, etc.) A second communication flow 702-2 may comprise second communication data 704-2 that is transmitted between a second communication device 102-2 and a third communication device 102-3 (e.g., transmitted from second communication device 102-2 to third communication device 102-3, transmitted from third communication device 102-3 to second communication device 102-2, a combination thereof, etc.).

For certain example embodiments, although not explicitly shown, a communication flow 702 may transit through one or more network communication devices 110 as communication data 704 propagates between two communication devices 102. Additionally or alternatively, first communication data 704-1 may propagate to second communication device 102-2 (e.g., via a third communication device 102-3, via a network communication device 110, a combination thereof, etc.) as part of or separate from first communication flow 702-1. Additionally or alternatively, second communication data 704-2 may propagate to first communication device 102-1 (e.g., via a third communication device 102-3, via a network communication device 110, a combination thereof, etc.) as part of or separate from second communication flow 702-2. By way of example only, a third communication device 102-3, a network communication device 110, a combination thereof, etc. may forward first communication data 704-1 to a second communication device 102-2 or may forward second communication data 704-2 to a first communication device 102-1.

For certain example embodiments, at least one conversion 708 may be performed at any one or more devices (e.g., a first communication device 102-1, a second communication device 102-2, a third communication device 102-3, at least one network communication device 110, a combination thereof, etc.). At least one conversion 708 may be effectuated (e.g., via at least partial command or control by a third communication device 102-3), by way of example but not limitation, in accordance with at least one conversion 302 as described herein above with particular reference to any one or more of communication path or conversion scenarios 300A-300H (e.g., of FIGS. 3A-3H). For an example implementation, a conversion 708 may cause communication data to be converted from corresponding to one type of user interaction communication modality 706 to another type of user interaction communication modality 706. However, claimed subject matter is not limited to any particular described embodiments, implementations, examples, etc. with respect to schematic diagram 700A of FIG. 7A.

FIG. 7B is a schematic diagram 700B that includes at least one example communication device and that depicts at least one example scenario for multi-party multi-modality communication in accordance with certain example embodiments. As shown in FIG. 7B, by way of example but not limitation, schematic diagram 700B may further include at least one joint communication flow 710.

For certain example embodiments, a first communication flow 702-1 and a second communication flow 702-2 may be routed through at least one common network communication device 110. A network communication device 110 may link (e.g., tag as related, transmit on the same channel, mix, a combination thereof, etc.) at least a first communication flow 702-1 and a second communication flow 702-2 into at least one joint communication flow 710. A joint communication flow 710 that is thusly created may include at least first communication data 704-1 and second communication data 704-2. A joint communication flow 710 may be transmitted by a common network communication device 110 to a third communication device 102-3. If a fourth communication device (not explicitly shown) is participating in a multi-party multi-modality communication, a fourth communication flow may likewise be linked (e.g., into a joint communication flow 710) or may be received separately at third communication device 102-3. However, claimed subject matter is not limited to any particular described embodiments, implementations, examples, etc. with respect to schematic diagram 700B of FIG. 7B.

Figure 7C:
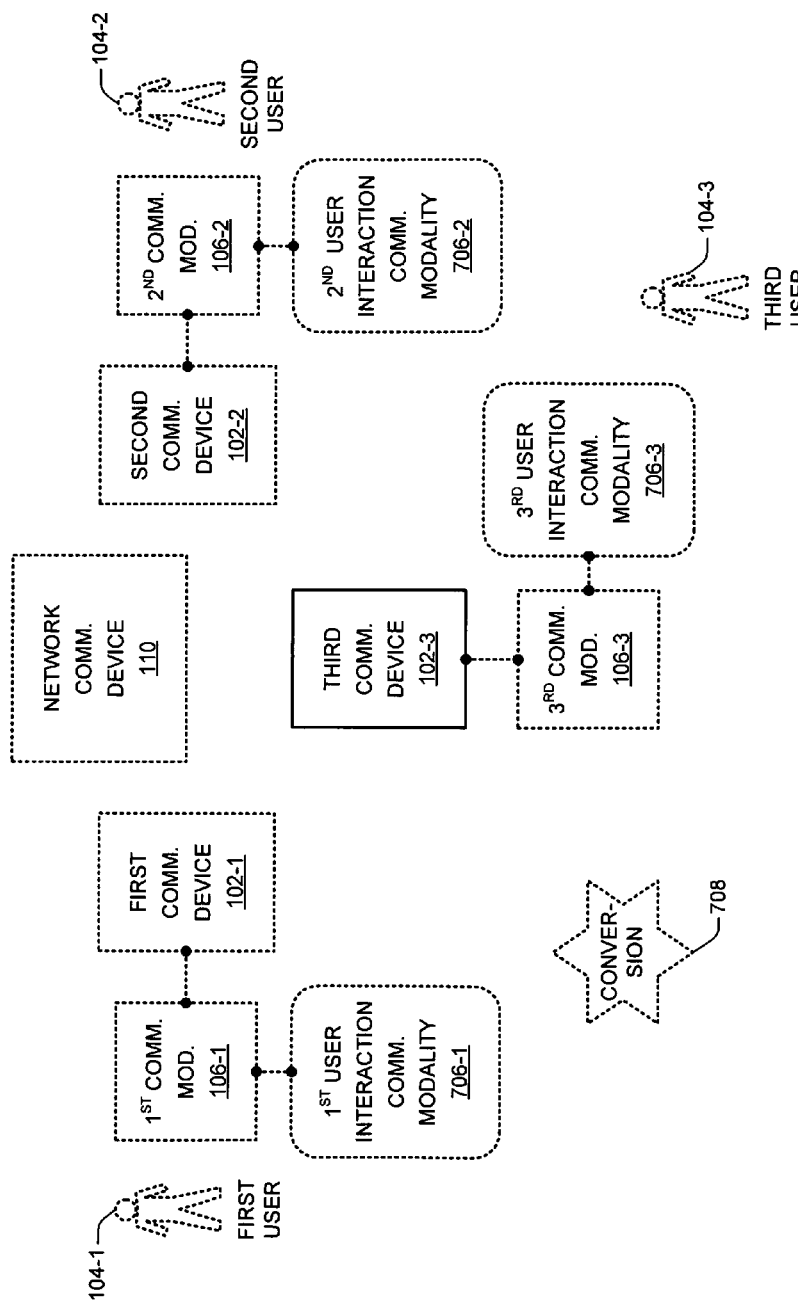

FIG. 7C is a schematic diagram 700C that includes at least one example communication device and that depicts at least one example scenario for multi-party multi-modality communication in accordance with certain example embodiments. As shown in FIG. 7C, by way of example but not limitation, schematic diagram 700C may further include a first communication modality 106-1, a first user interaction communication modality 706-1, a second communication modality 106-2, a second user interaction communication modality 706-2, a third communication modality 106-3, or a third user interaction communication modality 706-3.

For certain example embodiments, a first communication modality 106-1 may correspond to a first communication device 102-1 or a first user 104-1, or a first user interaction communication modality 706-1 may be associated with a first communication device 102-1 or a first user 104-1. A second communication modality 106-2 may correspond to a second communication device 102-2 or a second user 104-2, or a second user interaction communication modality 706-2 may be associated with a second communication device 102-2 or a second user 104-2. A third communication modality 106-3 may correspond to a third communication device 102-3 or a third user 104-3, or a third user interaction communication modality 706-3 may be associated with a third communication device 102-3 or a third user 104-3. As used herein, unless context dictates otherwise, a communication modality 106 may refer to a general modality with which a corresponding user is to interact with a corresponding communication device. As used herein, unless context dictates otherwise, a user interaction communication modality 706 may refer to a specific (e.g., actual, current, reported, indicated, requested, stipulated, expected, a combination thereof, etc.) modality with which an associated user is to interact with an associated communication device. However, claimed subject matter is not limited to any particular described embodiments, implementations, examples, etc. with respect to schematic diagram 700C of FIG. 7C.

FIG. 7D is a schematic diagram 700D that includes at least one example communication device and that depicts at least one example scenario for multi-party multi-modality communication in accordance with certain example embodiments. As shown in FIG. 7D, by way of example but not limitation, schematic diagram 700D may include a third communication device 102-3 that may include at least one reception unit 712, at least one conversion effectuator unit 714, or at least one presentation unit 716. By way of example but not limitation, a reception unit 712, a conversion effectuator unit 714, or a presentation unit 716 may comprise one or more modules, logic, circuitry, any combination thereof, and so forth.

For certain example embodiments, a reception unit 712 may be configured to receive first communication data for a first communication flow that is associated with a first communication device or to receive second communication data for a second communication flow that is associated with a second communication device; a conversion effectuator unit 714 may be configured to effectuate at least one conversion with respect to at least one of the first communication data or the second communication data to cause a conversion of communication data from corresponding to one type of user interaction communication modality to corresponding to another type of user interaction communication modality; or a presentation unit 716 may be configured to present to a third user of the third communication device a version of the first communication data while the second communication flow is extant or a version of the second communication data while the first communication flow is extant. For an example implementation, a reception unit 712 may be configured to receive first communication data 704-1 for a first communication flow 702-1 that is associated with a first communication device 102-1 or to receive second communication data 704-2 for a second communication flow 702-2 that is associated with a second communication device 102-2; a conversion effectuator unit 714 may be configured to effectuate at least one conversion 708 with respect to at least one of first communication data 704-1 or second communication data 704-2 to cause a conversion 708 of communication data 704 from corresponding to one type of user interaction communication modality 706 to corresponding to another type of user interaction communication modality 706; and a presentation unit 716 may be configured to present to a third user 104-3 of a third communication device 102-3 a version of first communication data 704-1 while second communication flow 702-2 is extant or a version of second communication data 704-2 while first communication flow 702-1 is extant. By way of example but not limitation, a communication flow 702 may be extant if the communication flow has not terminated, if involved users remain available to continue the communication flow at a conversational pace (e.g., a pace without pauses that exceed a length that a user interacting with voice would consider unacceptable), if a signal 206 (e.g., of FIG. 2) is being transmitted or received for the communication flow, if the communication flow is for an ongoing real-time communication, if a session for the communication flow remains open, any combination thereof, and so forth. However, claimed subject matter is not limited to any particular described embodiments, implementations, examples, etc. with respect to schematic diagram 700D of FIG. 7D.

Figure 7E:
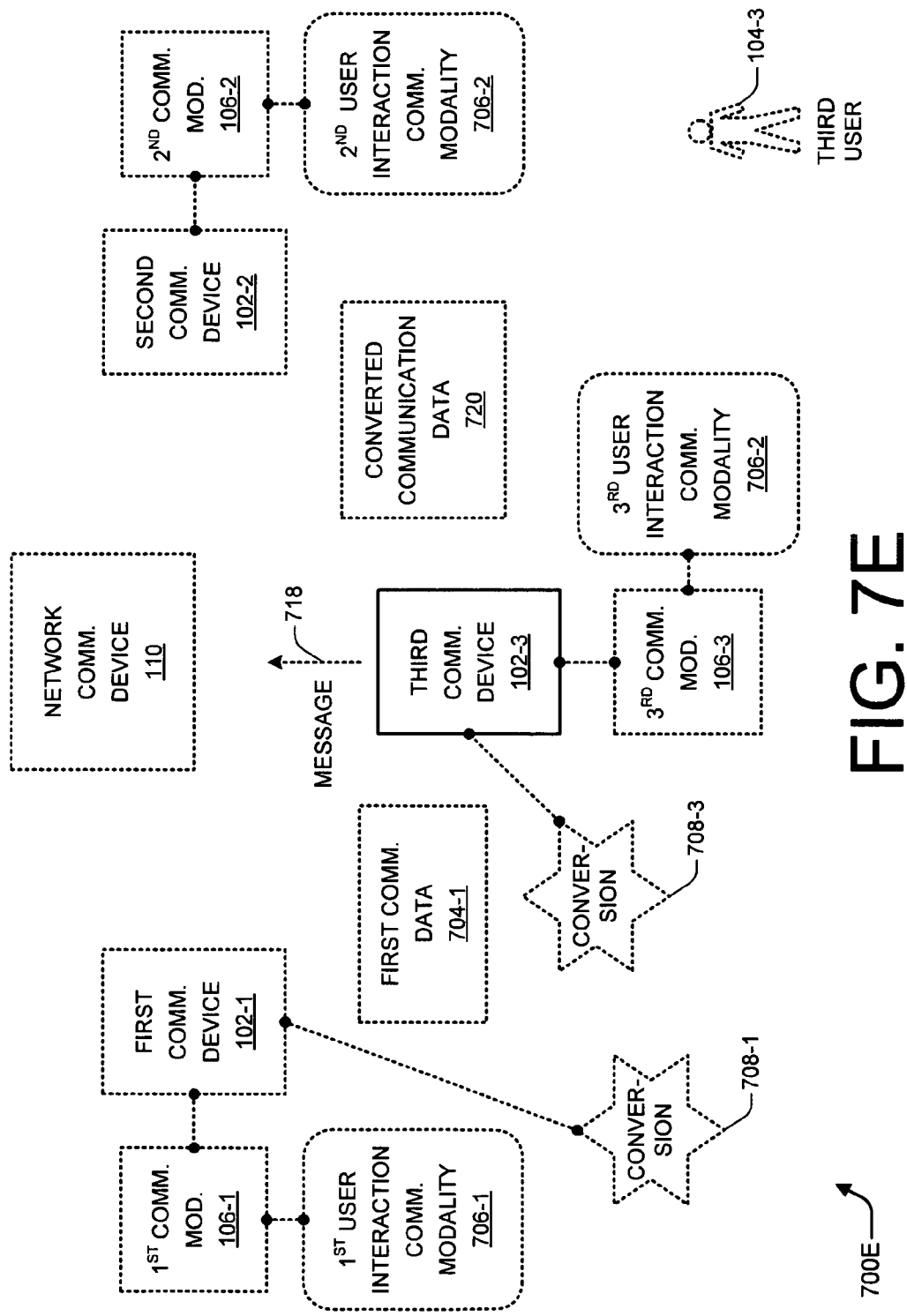

FIG. 7E is a schematic diagram 700E that includes at least one example communication device and that depicts at least one example scenario for multi-party multi-modality communication in accordance with certain example embodiments. As shown in FIG. 7E, by way of example but not limitation, schematic diagram 700E may further include at least one message 718, converted communication data 720, at least one conversion 708-1, or at least one conversion 708-3.

For certain example embodiments, at least one message 718 may be sent from a third communication device 102-3. A conversion 708-1 may be performed, by way of example only, by or at a first communication device 102-1. A conversion 708-3 may be performed, by way of example only, by or at a third communication device 102-3. For an example implementation, converted communication data 720 may be produced as a result of or via a conversion 708 (e.g., a conversion 708-1, a conversion 708-3, a combination thereof, etc.) of communication data 704 (not explicitly shown in FIG. 7E). However, claimed subject matter is not limited to any particular described embodiments, implementations, examples, etc. with respect to schematic diagram 700E of FIG. 7E.

Figure 7F:
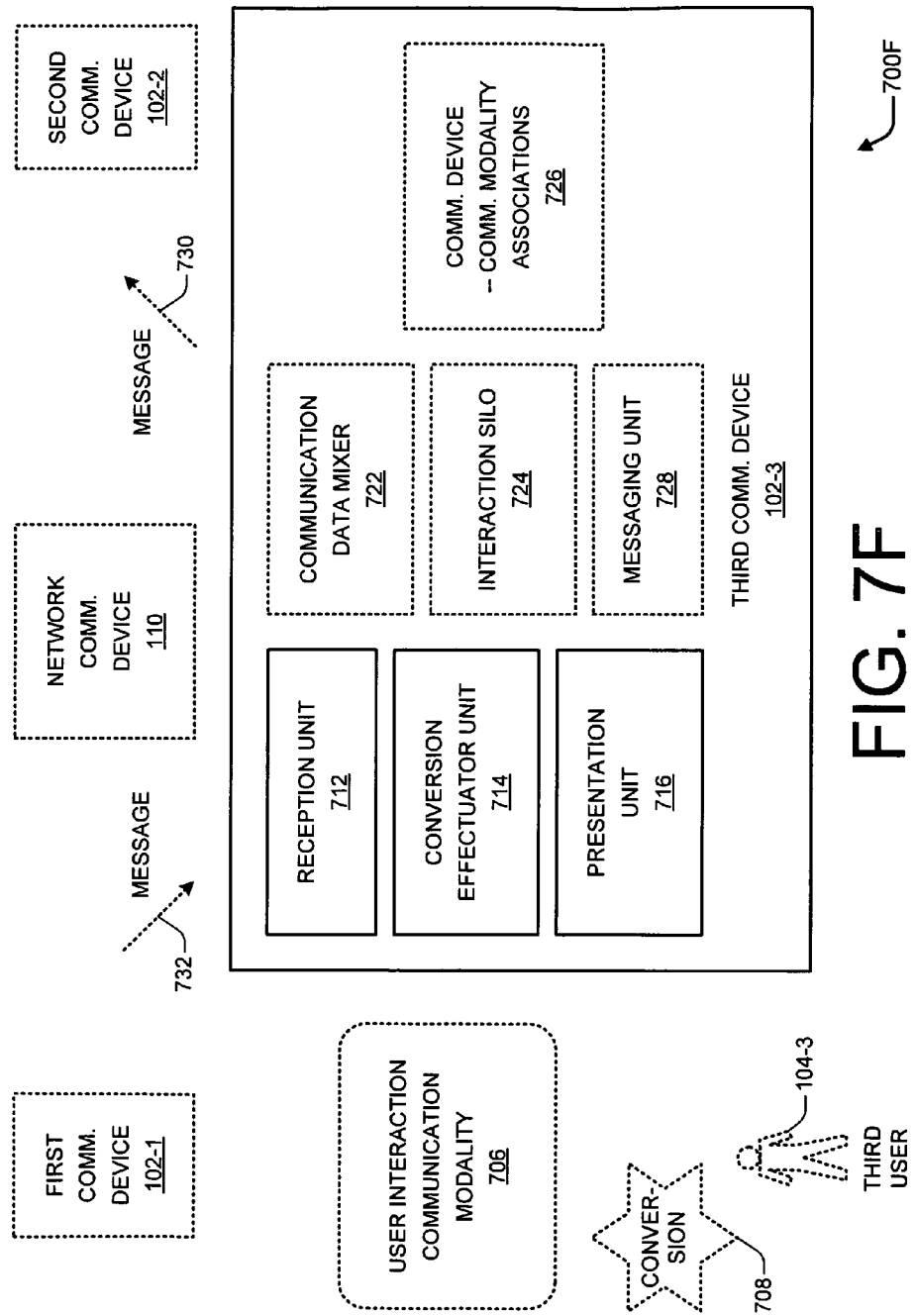

FIG. 7F is a schematic diagram 700F that includes at least one example communication device and that depicts at least one example scenario for multi-party multi-modality communication in accordance with certain example embodiments. As shown in FIG. 7F, by way of example but not limitation, schematic diagram 700F may further include at least one message 730 or at least one message 732. A third communication device 102-3 may further include at least one communication data mixer 722, one or more interaction silos 724, at least one messaging unit 728, or one or more communication device-communication modality associations 726.

For certain example embodiments, a communication data mixer 722 may mix (e.g., combine, commingle, harmonize, align temporally, prepare for joint presentation, prepare for overlapping or at least partial simultaneous presentation, a combination thereof, etc.) communication data from two or more communication flows 702 (not explicitly shown in FIG. 7F). For certain example embodiments, an interaction silo 724 may enable a communication device to present user output, may facilitate presentation of user output by a device, may enable a communication device to accept user input, may facilitate acceptance of user input by a device, may function in conjunction with a presentation unit 716, a combination thereof, etc. with respect to communication data 704 that is received or sent on or via one or more communication flows 702. An interaction silo 724 may comprise, by way of example but not limitation, a physical component that relates to interaction (e.g., a receiver, a transmitter, a speaker, a microphone, a screen, a camera, a sensor, an encoder, a decoder, a combination thereof, etc.), a logical component that relates to interaction (e.g., a video decoding or encoding module, a speech processing module, an application that processes a particular type or types of communication data, a combination thereof, etc.), any combination thereof, and so forth. However, claimed subject matter is not limited to any particular described embodiments, implementations, examples, etc.

For certain example embodiments, a messaging unit 728 may send from third communication device 102-3 one or more messages or may receive at third communication device 102-3 one or more messages. For an example implementation, a messaging unit 728 may receive a message 732 (e.g., from a first communication device 102-1), or a messaging unit 728 may send a message 730 (e.g., to a second communication device 102-2). For certain example embodiments, one or more communication device-communication modality associations 726 may include, store, have or provide access to, a combination thereof, etc. one or more respective associations between a respective communication device 102 and a respective user interaction communication modality 706. For an example implementation, a communication device-communication modality association 726 may include an association between a first communication device 102-1 and a first user interaction communication modality 706-1, wherein the association may link or indicate a specific user interaction communication modality that is being utilized by a user of the associated communication device. A user input interaction communication modality or a user output interaction communication modality may additionally or alternatively be associated with at least one communication device 102 to separately relate to user input interaction or to user output interaction, respectively. Additionally or alternatively, one or more communication device-communication modality associations 726 may be presented to a user (e.g., as shown in FIG. 6G at user interface feature 610*g*). However, claimed subject matter is not limited to any particular described embodiments, implementations, examples, etc. with respect to schematic diagram 700F of FIG. 7F.

FIG. 8A is a flow diagram 800A illustrating an example method for a communication device with regard to multi-party multi-modality communication in accordance with certain example embodiments. As illustrated, flow diagram 800 may include any of operations 802-808. Although operations 802-808 are shown or described in a particular order, it should be understood that methods may be performed in alternative manners without departing from claimed subject matter, including, but not limited to, with a different order or number of operations or with a different relationship between or among operations. Also, at least some operations of flow diagram 800 may be performed so as to be fully or partially overlapping with other operation(s). For certain example embodiments, one or more operations of flow diagram 800 may be performed by at least one communication device (e.g., a communication device 102).

For certain example embodiments, a method for handling multi-party multi-modality communication, which method may be at least partially implemented using hardware, such as that of a third communication device, may comprise an operation 802, an operation 804, an operation 806, or an operation 808. An operation 802 may be directed at least partially to receiving first communication data for a first communication flow that is associated with a first communication device and an operation 804 may be directed at least partially to receiving second communication data for a second communication flow that is associated with a second communication device. By way of example but not limitation, a third communication device 102-3 may receive first communication data 704-1 for a first communication flow 702-1 that is associated with a first communication device 102-1 or receive second communication data 704-2 for a second communication flow 702-2 that is associated with a second communication device 102-2. However, claimed subject matter is not limited to any particular described embodiments, implementations, examples, etc.

For certain example embodiments, an operation 806 may be directed at least partially to effectuating at least one conversion with respect to at least one of the first communication data or the second communication data to cause a conversion of communication data from corresponding to one type of user interaction communication modality to corresponding to another type of user interaction communication modality. By way of example but not limitation, a third communication device 102-3 may effectuate at least one conversion 708 with respect to at least one of first communication data 704-1 or second communication data 704-2 to cause a conversion 708 of communication data 704 from corresponding to one type of user interaction communication modality 706 to corresponding to another type of user interaction communication modality 706. For certain example implementations, a third communication device 102-3 may effectuate a conversion 708 by performing a conversion 708, by requesting that at least one other device (e.g., a first communication device 102-1, a second communication device 102-2, at least one network communication device 110, a combination thereof, etc.) perform a conversion 708, any combination thereof, and so forth. However, claimed subject matter is not limited to any particular described embodiments, implementations, examples, etc.

For certain example embodiments, an operation 808 may be directed at least partially to presenting to a third user of the third communication device a version of the first communication data while the second communication flow is extant or a version of the second communication data while the first communication flow is extant. By way of example but not limitation, a third communication device 102-3 may present to a third user 104-3 of third communication device 102-3 a version of first communication data 704-1 while a second communication flow 702-2 is extant or a version of second communication data 704-2 while first communication flow 702-1 is extant. For certain example implementations, a third communication device 102-3 may present to a third user 104-3 a version (e.g., original communication data as accepted at a communication device, received communication data, converted communication data that is received in a converted form, converted communication data that is converted by third communication device 102-3, a combination thereof, etc.) of communication data 704 of a communication flow 702. However, claimed subject matter is not limited to any particular described embodiments, implementations, examples, etc.

For certain example embodiments, a method may be implemented wherein the one type of user interaction communication modality comprises a communication modality selected from a group of communication modalities comprising: voice communication, textual communication, or video communication; wherein the other type of user interaction communication modality comprises a communication modality selected from a group of communication modalities comprising: voice communication, textual communication, or video communication; and wherein the one type of user interaction communication modality differs from the other type of user interaction communication modality. By way of example but not limitation, a third communication device 102-3 may effectuate a conversion of communication data 704 in which one type of user interaction communication modality 706 comprises a communication modality selected from a group of communication modalities comprising: voice communication, textual communication, or video communication; another type of user interaction communication modality 706 comprises a communication modality selected from a group of communication modalities comprising: voice communication, textual communication, or video communication; and the one type of user interaction communication modality 706 differs from the other type of user interaction communication modality 706. However, claimed subject matter is not limited to any particular described embodiments, implementations, examples, etc.

Figure 8E:
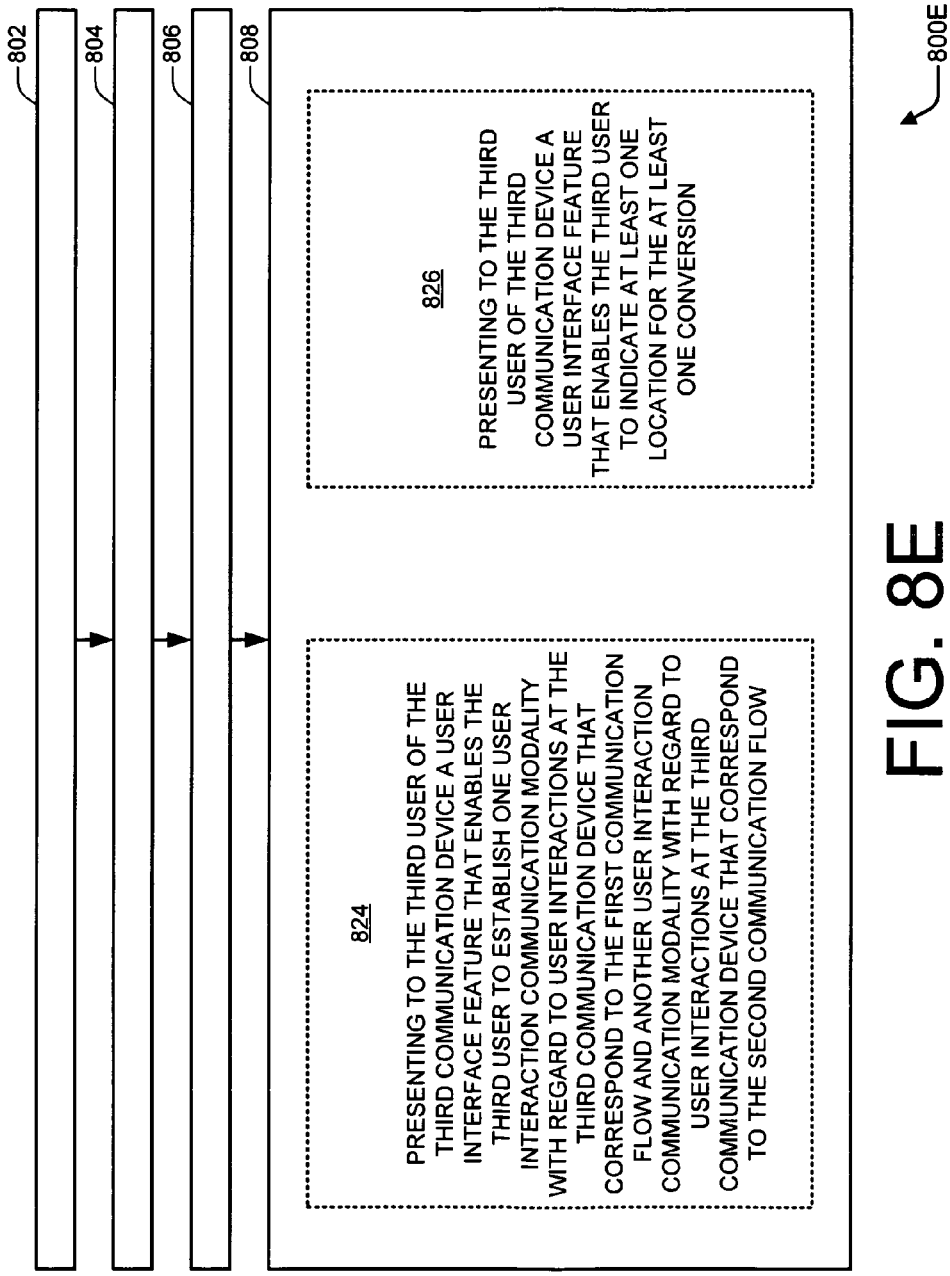

FIGS. 8B-8H depict example additions or alternatives for a flow diagram of FIG. 8A in accordance with certain example embodiments. As illustrated, flow diagrams of FIGS. 8B-8H may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations. Also, at least some operations of flow diagrams of FIGS. 8B-8H may be performed so as to be fully or partially overlapping with other operation(s).

FIG. 8B illustrates a flow diagram 800B having example operations 812 or 814. For certain example embodiments, a method having at least one additional operation 810 may include an operation 812 that may be directed at least partially to initiating the first communication flow and the second communication flow from the third communication device. By way of example but not limitation, a third communication device 102-3 may initiate a first communication flow 702-1 and a second communication flow 702-2 (e.g., in response to a third user 104-3 placing a phone call, making a video call, sending a text message, a combination thereof, etc. to two different devices). Additionally or alternatively, a third communication device 102-3 may initiate a first communication flow 702-1 (but not a second communication flow 702-2), may initiate a second communication flow 702-2 (but not a first communication flow 702-1), may terminate (e.g., receive or accept an incoming communication request for) a first communication flow 702-1 or a second communication flow 702-2, any combination thereof, and so forth. However, claimed subject matter is not limited to any particular described embodiments, implementations, examples, etc.

For certain example embodiments, an operation 814 may be directed at least partially to wherein the effectuating at least one conversion with respect to at least one of the first communication data or the second communication data to cause a conversion of communication data from corresponding to one type of user interaction communication modality to corresponding to another type of user interaction communication modality (of operation 806) comprises sending from the third communication device to another device at least one message to request performance of the at least one conversion with respect to at least one of the first communication data or the second communication data to cause the conversion of the communication data from corresponding to the one type of user interaction communication modality to corresponding to the other type of user interaction communication modality. By way of example but not limitation, a third communication device 102-3 may send to at least one other device (e.g., a first communication device 102-1, a second communication device 102-2, at least one network communication device 110, a combination thereof, etc.) at least one message 718 (e.g., at least one signal, packet, transmission or reception, notification, request, instruction, confirmation, a combination thereof, etc.) to request performance of at least one conversion 708 with respect to at least one of first communication data 704-1 or second communication data 704-2 to cause a conversion 708 of communication data 704 from corresponding to one type of user interaction communication modality 706 to corresponding to another type of user interaction communication modality 706. However, claimed subject matter is not limited to any particular described embodiments, implementations, examples, etc.

FIG. 8C illustrates a flow diagram 800C having example operations 816, 818a, or 818b. For certain example embodiments, an operation 816 may be directed at least partially to wherein the effectuating at least one conversion with respect to at least one of the first communication data or the second communication data to cause a conversion of communication data from corresponding to one type of user interaction communication modality to corresponding to another type of user interaction communication modality (of operation 806) comprises performing the at least one conversion with respect to at least one of the first communication data or the second communication data to cause the conversion of the communication data from corresponding to the one type of user interaction communication modality to corresponding to the other type of user interaction communication modality. By way of example but not limitation, a third communication device 102-3 may perform at least one conversion 708-3 with respect to at least one of first communication data 704-1 or second communication data 704-2 to cause a conversion 708 of communication data 704 from corresponding to one type of user interaction communication modality 706 to corresponding to another type of user interaction communication modality 706. However, claimed subject matter is not limited to any particular described embodiments, implementations, examples, etc.

For certain example embodiments, an operation 818 (e.g., an operation 818a or 818b) may be directed at least partially to wherein the performing the at least one conversion with respect to at least one of the first communication data or the second communication data to cause the conversion of the communication data from corresponding to the one type of user interaction communication modality to corresponding to the other type of user interaction communication modality (of operation 816) comprises producing first converted communication data from the first communication data via the at least one conversion (for operation 818a); and wherein a method comprises at least one additional operation 810 that may further include an operation 818b that may be directed at least partially to sending the first converted communication data to the second communication device (for operation 818b). By way of example but not limitation, a third communication device 102-3 may produce first converted communication data (e.g., converted communication data 720) from first communication data 704-1 via at least one conversion 708-3 and may further send first converted communication data (e.g., converted communication data 720) to a second communication device 102-2. For certain example implementations, a third communication device 102-3 may receive communication data from one communication device and transmit converted communication data to another communication device, with the communication device and the other communication device participating in a multi-party multimodality communication with third communication device 102-3. However, claimed subject matter is not limited to any particular described embodiments, implementations, examples, etc.

FIG. 8D illustrates a flow diagram 800D having example operations 820 or 822. For certain example embodiments, a method may be implemented wherein the presenting to a third user of the third communication device a version of the first communication data while the second communication flow is extant or a version of the second communication data while the first communication flow is extant (of operation 808) further comprises presenting to the third user of the third communication device the version of the first communication data while the second communication flow is extant and the version of the second communication data while the first communication flow is extant. By way of example but not limitation, a third communication device 102-3 may present to a third user 104-2 a version of first communication data 704-1 while a second communication flow 702-2 is extant and a version of second communication data 704-2 while a first communication flow 702-1 is extant. However, claimed subject matter is not limited to any particular described embodiments, implementations, examples, etc.

For certain example embodiments, an operation 820 may be directed at least partially to wherein the presenting to a third user of the third communication device a version of the first communication data while the second communication flow is extant or a version of the second communication data while the first communication flow is extant (of operation 808) comprises presenting to the third user of the third communication device a user interface feature that indicates a first user interaction communication modality for a first user that is associated with the first communication device for the first communication flow and a second user interaction communication modality for a second user that is associated with the second communication device for the second communication flow. By way of example but not limitation, a third communication device 102-3 may present to a third user 104-3 a user interface feature 610g that indicates a first user interaction communication modality 706 (e.g., with a communication modality option 614g, such as "Type Alpha" in connection with "Party 'A'") for a first user 104-1 that is associated with a first communication device 102-1 for a first communication flow 702-1 and a second user interaction communication modality 706 (e.g., via a display 618f indicating "Type Beta" in connection with a "Party 'B'") for a second user 104-2 that is associated with a second communication device 102-2 for a second communication flow 702-2. However, claimed subject matter is not limited to any particular described embodiments, implementations, examples, etc.

For certain example embodiments, an operation 822 may be directed at least partially to wherein the presenting to the third user of the third communication device a user interface feature that indicates a first user interaction communication modality for a first user that is associated with the first communication device for the first communication flow and a second user interaction communication modality for a second user that is associated with the second communication device for the second communication flow (of operation 820) comprises presenting to the third user of the third communication device a user interface feature that indicates an existence of a current multi-party conference communication that includes at least (i) the first user or the first communication device and (ii) the second user or the second communication device. By way of example but not limitation, a third communication device 102-3 may present to a third user 104-3 a user interface feature 610g or 610h that indicates an existence of a current multi-party conference communication (e.g., via a multi-party conference communication 624 item) that includes at least (i) a first user 104-1 or a first communication device 102-1 (e.g., as represented by a "Party 'A'") and (ii) a second user 104-2 or a second communication device 102-2 (e.g., as represented by a "Party 'B'"). However, claimed subject matter is not limited to any particular described embodiments, implementations, examples, etc.

FIG. 8E illustrates a flow diagram 800E having example operations 824 or 826. For certain example embodiments, an operation 824 may be directed at least partially to wherein the presenting to a third user of the third communication device a version of the first communication data while the second communication flow is extant or a version of the second communication data while the first communication flow is extant (of operation 808) comprises presenting to the third user of the third communication device a user interface feature that enables the third user to establish one user interaction communication modality with regard to user interactions at the third communication device that correspond to the first communication flow and another user interaction communication modality with regard to user interactions at the third communication device that correspond to the second communication flow. By way of example but not limitation, a third communication device 102-3 may present (e.g., via a display 618*g*) to a third user 104-3 a user interface feature 610*h* that enables third user 104-3 to establish one user interaction communication modality (e.g., via a communication modality option 614*h*) with regard to user interactions at third communication device 102-3 that correspond to a first communication flow 702-1 (e.g., as represented by a column labeled "Party 'A'") and another user interaction communication modality (e.g., via another communication modality option 614*h*) with regard to user interactions at third communication device 102-3 that correspond to a second communication flow 702-2 (e.g., as represented by a column labeled "Party 'B'"). Additionally or alternatively, a third communication device 102-3 may present to a third user 104-3 a user interface feature (e.g., a user interface feature 610*g* having at least one selectable indicator 622) that enables third user 104-3 to stipulate at least one user interaction communication modality (e.g., via a communication modality option 614*g* having at least one selectable indicator 622) for a user (e.g., a first user 104-1 or a second user 104-2) of at least one of first communication device 102-1 or second communication device 102-2. For certain example implementations, remote or local user interaction communication modality indications or selection options (e.g., of user interface feature 610*g* or 610*h*) may additionally or alternatively be presented or accepted via sound output or input, haptic output or input, any combination thereof, and so forth. However, claimed subject matter is not limited to any particular described embodiments, implementations, examples, etc.

For certain example embodiments, an operation 826 may be directed at least partially to wherein the presenting to a third user of the third communication device a version of the first communication data while the second communication flow is extant or a version of the second communication data while the first communication flow is extant (of operation 808) comprises presenting to the third user of the third communication device a user interface feature that enables the third user to indicate at least one location for the at least one conversion. By way of example but not limitation, a third communication device 102-3 may present to a third user 104-3 a user interface feature 610*i* that enables third user 104-3 to indicate at least one location for at least one conversion 708 (e.g., via a conversion 302-0, conversion 302-1, or conversion 302-2, a combination thereof, etc., such as an icon or text that is included as part of a display 618*h*). For certain example implementations, conversion location indications or selection options (e.g., of a user interface feature 610*i*) may additionally or alternatively be presented or accepted via sound output or input, haptic output or input, any combination thereof, and so forth. However, claimed subject matter is not limited to any particular described embodiments, implementations, examples, etc.

Figure 8F:
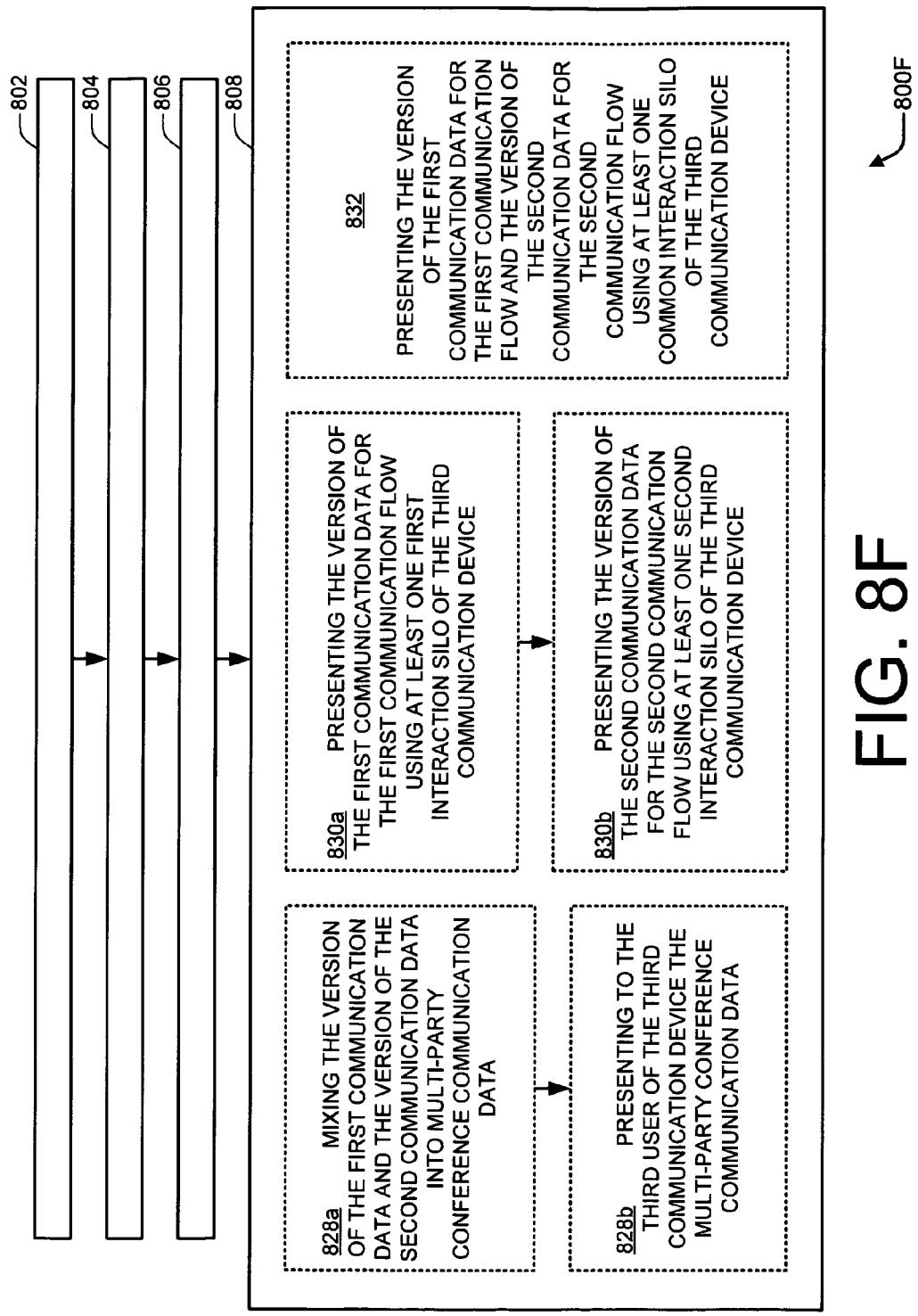

FIG. 8F illustrates a flow diagram 800F having example operations 828*a*, 828*b*, 830*a*, 830*b*, or 832. For certain example embodiments, an operation 828 (e.g., an operation 828*a* or 828*b*) may be directed at least partially to wherein the presenting to a third user of the third communication device a version of the first communication data while the second communication flow is extant or a version of the second communication data while the first communication flow is extant (of operation 808) comprises mixing the version of the first communication data and the version of the second communication data into multi-party conference communication data (for operation 828*a*) and presenting to the third user of the third communication device the multi-party conference communication data (for operation 828*b*). By way of example but not limitation, a third communication device 102-3 may mix (e.g., combine, commingle, harmonize, align temporally, prepare for joint presentation, prepare for overlapping or at least partial simultaneous presentation, a combination thereof, etc.) a version of first communication data 704-1 and a version of second communication data 704-2 into multi-party conference communication data or may present to a third user 104-3 of third communication device 102-3 the multi-party conference communication data (e.g., utilizing at least one user input interface 416*a* or at least one user output interface 416*b*). However, claimed subject matter is not limited to any particular described embodiments, implementations, examples, etc.

For certain example embodiments, an operation 830 (e.g., an operation 830*a* or 830*b*) may be directed at least partially to wherein the presenting to a third user of the third communication device a version of the first communication data while the second communication flow is extant or a version of the second communication data while the first communication flow is extant (of operation 808) comprises presenting the version of the first communication data for the first communication flow using at least one first interaction silo of the third communication device (for operation 830*a*) and presenting the version of the second communication data for the second communication flow using at least one second interaction silo of the third communication device (for operation 830*b*), wherein there is at least one different interaction silo between or among the at least one first interaction silo and the at least one second interaction silo. By way of example but not limitation, a third communication device 102-3 may present a version of first communication data 704-1 for a first communication flow 702-1 using at least one first interaction silo (e.g., a first interaction silo 724) of third communication device 102-3 or may present a version of second communication data 704-2 for a second communication flow 702-2 using at least one second interaction silo (e.g., a second interaction silo 724) of third communication device 102-3, with there being at least one different interaction silo 724 between or among the at least one first interaction silo and the at least one second interaction silo. For certain example implementations, communication data 704 from different communication devices 102 may be presented using at least one different application, user output interface 416*b*, any combination thereof, and so forth. However, claimed subject matter is not limited to any particular described embodiments, implementations, examples, etc.

For certain example embodiments, an operation 832 may be directed at least partially to wherein the presenting to a third user of the third communication device a version of the first communication data while the second communication flow is extant or a version of the second communication data while the first communication flow is extant (of operation 808) comprises presenting the version of the first communication data for the first communication flow and the version of the second communication data for the second communication flow using at least one common interaction silo of the third communication device. By way of example but not limitation, a third communication device 102-3 may present a version of first communication data 704-1 for a first communication flow 702-1 and a version of second communication data 704-2 for a second communication flow 702-2 using at least one common interaction silo (e.g., at least one common interaction silo 724) of third communication device 104-3. For certain example implementations, communication data 704 from different communication devices 102 may be presented using at least one common application, user output interface 416b, any combination thereof, and so forth. However, claimed subject matter is not limited to any particular described embodiments, implementations, examples, etc.

FIG. 8G illustrates a flow diagram 800G having example operations 834, 836, or 838. For certain example embodiments, at least one additional operation 810 for a method may comprise an operation 834 that may be directed at least partially to associating a first user interaction communication modality with at least one first identifier corresponding to the first communication device and a second user interaction communication modality with at least one second identifier corresponding to the second communication device. By way of example but not limitation, a third communication device 102-3 may associate (e.g., via one or more communication device-communication modality associations 726) a first user interaction communication modality 706 with at least one first identifier (e.g., a phone number, an email address, an account identifier, a name of a user, contact information, a MAC address, a network address, a URL, a combination thereof, etc.) corresponding to a first communication device 102-1 or a second user interaction communication modality 706 with at least one second identifier (e.g., a phone number, an email address, an account identifier, a name of a user, contact information, a MAC address, a network address, a URL, a combination thereof, etc.) corresponding to a second communication device 102-2. However, claimed subject matter is not limited to any particular described embodiments, implementations, examples, etc.

For certain example embodiments, at least one additional operation 810 for a method may comprise an operation 836 that may be directed at least partially to sending to the second communication device at least one message indicating that a first communication modality corresponding to the first communication device has changed to a different user interaction communication modality. By way of example but not limitation, a third communication device 102-3 may send to a second communication device 102-2 at least one message 730 indicating that a first communication modality 106-1 corresponding to a first communication device 102-1 has changed to a different user interaction communication modality 706. However, claimed subject matter is not limited to any particular described embodiments, implementations, examples, etc.

For certain example embodiments, at least one additional operation 810 for a method may comprise an operation 838 that may (e.g., in conjunction with an operation 836) be directed at least partially to receiving from the first communication device at least one message indicating that the first communication modality corresponding to the first communication device has changed to the different user interaction communication modality. By way of example but not limitation, a third communication device 102-3 may receive from a first communication device 102-1 at least one message 732 indicating that a first communication modality 106-1 corresponding to first communication device 102-1 has changed to a different user interaction communication modality 706. Additionally or alternatively, a third communication device 102-3 may send to a first communication device 102-1a message (not explicitly shown) instructing first communication device 102-1 to change a first communication modality 106-1 corresponding to first communication device 102-1 to a different user interaction communication modality 706. However, claimed subject matter is not limited to any particular described embodiments, implementations, examples, etc.

FIG. 8H illustrates a flow diagram 800H having example operations 840, 842, or 844. For certain example embodiments, an operation 840 may be directed at least partially to wherein the receiving first communication data for a first communication flow that is associated with a first communication device (of operation 802) comprises receiving first converted communication data, the first converted communication data comprising the first communication data as converted from corresponding to the one type of user interaction communication modality to corresponding to the other type of user interaction communication modality. By way of example but not limitation, a third communication device 102-3 may receive first converted communication data (e.g., converted communication data 720 corresponding to a first communication flow 702-1), with the first converted communication data comprising first communication data 704-1 as converted from corresponding to one type of user interaction communication modality 706 to corresponding to another type of user interaction communication modality 706. For certain example implementations, first converted communication data may be received by third communication device 102-3 from a first communication device 102-1, from at least one network communication device 110, any combination thereof, and so forth. However, claimed subject matter is not limited to any particular described embodiments, implementations, examples, etc.

For certain example embodiments, an operation 842 may be directed at least partially to wherein the version of the first communication data comprises the first converted communication data (e.g., in conjunction with an operation 840); and wherein the presenting to a third user of the third communication device a version of the first communication data while the second communication flow is extant or a version of the second communication data while the first communication flow is extant (of operation 808) comprises presenting to the third user of the third communication device the first converted communication data. By way of example but not limitation, a version of first communication data 704-1 may comprise received first converted communication data (e.g., converted communication data 720 that is produced from first communication data 704-1 via at least one conversion 708 that is performed at another device), and a third communication device 102-3 may present to a third user 104-3 the received first converted communication data. However, claimed subject matter is not limited to any particular described embodiments, implementations, examples, etc.

For certain example embodiments, at least one additional operation 810 for a method may comprise an operation 844 that may (e.g., in conjunction with an operation 840) be directed at least partially to sending the first converted communication data to the second communication device. By way of example but not limitation, a third communication device 102-3 may send received first converted communication data (e.g., converted communication data 720 that is received in converted form from at least one other device, such as a first communication device 102-1 or a network communication device 110) to a second communication device 102-2. For certain example implementations, a given communication device 102 may forward received converted communication data to another communication device 102 as part of a multi-party multi-modality communication. However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A machine comprising:
   circuitry for initiating a first communication flow and a second communication flow from a third communication device;
   circuitry for receiving first communication data for the first communication flow that is associated with at least one of a first communication device or a first user;
   circuitry for receiving second communication data for the second communication flow that is associated with at least one of a second communication device or a second user;
   circuitry for effectuating at least one conversion with respect to at least one of the first communication data or the second communication data to cause communication data to be converted from corresponding to one type of user interaction communication modality to corresponding to another type of user interaction communication modality; and
   circuitry for presenting via the third communication device at least one of: (i) a version of the first communication data while the second communication flow is extant or (ii) a version of the second communication data while the first communication flow is extant.

2. The machine of claim 1, wherein the one type of user interaction communication modality includes at least one of: voice communication, textual communication, or video communication; wherein the other type of user interaction communication modality includes at least one of: voice communication, textual communication, or video communication; and wherein the one type of user interaction communication modality is different from the other type of user interaction communication modality.

3. The machine of claim 1, wherein the circuitry for effectuating at least one conversion with respect to at least one of the first communication data or the second communication data to cause communication data to be converted from corresponding to one type of user interaction communication modality to corresponding to another type of user interaction communication modality comprises:
   circuitry for sending from the third communication device to at least one other device at least one message to request performance of the at least one conversion with respect to at least one of the first communication data or the second communication data to cause communication data to be converted from corresponding to the one type of user interaction communication modality to corresponding to the other type of user interaction communication modality.

4. The machine of claim 3, wherein the circuitry for sending from the third communication device to at least one other device at least one message to request performance of the at least one conversion with respect to at least one of the first communication data or the second communication data to cause communication data to be converted from corresponding to the one type of user interaction communication modality to corresponding to the other type of user interaction communication modality comprises:

circuitry for sending from the third communication device to at least the second communication device the at least one message to request performance of the at least one conversion with respect to at least one of the first communication data or the second communication data to cause communication data to be converted from corresponding to the one type of user interaction communication modality to corresponding to the other type of user interaction communication modality.

5. The machine of claim 3, wherein the circuitry for sending from the third communication device to at least one other device at least one message to request performance of the at least one conversion with respect to at least one of the first communication data or the second communication data to cause communication data to be converted from corresponding to the one type of user interaction communication modality to corresponding to the other type of user interaction communication modality comprises:

circuitry for sending from the third communication device to at least one network communication device the at least one message to request performance of the at least one conversion with respect to at least one of the first communication data or the second communication data to cause communication data to be converted from corresponding to the one type of user interaction communication modality to corresponding to the other type of user interaction communication modality.

6. The machine of claim 1, wherein the circuitry for effectuating at least one conversion with respect to at least one of the first communication data or the second communication data to cause communication data to be converted from corresponding to one type of user interaction communication modality to corresponding to another type of user interaction communication modality comprises:

circuitry for performing the at least one conversion with respect to at least one of the first communication data or the second communication data to cause communication data to be converted from corresponding to the one type of user interaction communication modality to corresponding to the other type of user interaction communication modality.

7. The machine of claim 6, wherein the circuitry for performing the at least one conversion with respect to at least one of the first communication data or the second communication data to cause communication data to be converted from corresponding to the one type of user interaction communication modality to corresponding to the other type of user interaction communication modality includes at least producing first converted communication data from the first communication data via the at least one conversion; and wherein the machine further includes at least:

circuitry for sending the first converted communication data to the second communication device.

8. The machine of claim 6, wherein the circuitry for performing the at least one conversion with respect to at least one of the first communication data or the second communication data to cause communication data to be converted from corresponding to the one type of user interaction communication modality to corresponding to the other type of user interaction communication modality comprises:

circuitry for performing the at least one conversion with respect to at least one of the first communication data or the second communication data to cause communication data to be converted from corresponding to text to corresponding to voice.

9. The machine of claim 1, wherein the circuitry for presenting via the third communication device at least one of: (i) a version of the first communication data while the second communication flow is extant or (ii) a version of the second communication data while the first communication flow is extant comprises:

circuitry for presenting via the third communication device the version of the first communication data while the second communication flow is extant and the version of the second communication data while the first communication flow is extant.

10. The machine of claim 1, wherein the circuitry for presenting via the third communication device at least one of: (i) a version of the first communication data while the second communication flow is extant or (ii) a version of the second communication data while the first communication flow is extant comprises:

circuitry for presenting via the third communication device at least one user interface feature that is indicative of at least one of: (i) a first user interaction communication modality of the first user that is associated with the first communication device of the first communication flow or (ii) a second user interaction communication modality of the second user that is associated with the second communication device of the second communication flow.

11. The machine of claim 10, wherein the circuitry for presenting via the third communication device at least one user interface feature that is indicative of at least one of: (i) a first user interaction communication modality of the first user that is associated with the first communication device of the first communication flow or (ii) a second user interaction communication modality of the second user that is associated with the second communication device of the second communication flow comprises:

circuitry for presenting via the third communication device at least one user interface feature that is indicative of an existence of a current multi-party conference communication that includes at least: (i) the first user or the first communication device and (ii) the second user or the second communication device.

12. The machine of claim 1, wherein the circuitry for presenting via the third communication device at least one of: (i) a version of the first communication data while the second communication flow is extant or (ii) a version of the second communication data while the first communication flow is extant comprises:

circuitry for presenting via the third communication device at least one user interface feature that enables a user of the third communication device to establish: (i) one user interaction communication modality with regard to one or more user interactions at the third communication device that correspond to the first communication flow and (ii) another user interaction communication modality with regard to one or more user interactions at the third communication device that correspond to the second communication flow.

13. The machine of claim 1, wherein the circuitry for presenting via the third communication device at least one of: (i) a version of the first communication data while the second communication flow is extant or (ii) a version of the second communication data while the first communication flow is extant comprises:

circuitry for presenting via the third communication device at least one user interface feature that enables a user of the third communication device to indicate at least one location selection for the at least one conversion.

14. The machine of claim 1, wherein the circuitry for presenting via the third communication device at least one of: (i) a version of the first communication data while the second communication flow is extant or (ii) a version of the second communication data while the first communication flow is extant comprises:
  circuitry for mixing the version of the first communication data and the version of the second communication data into multi-party conference communication data; and
  circuitry for presenting via the third communication device the multi-party conference communication data.

15. The machine of claim 1, wherein the circuitry for presenting via the third communication device at least one of: (i) a version of the first communication data while the second communication flow is extant or (ii) a version of the second communication data while the first communication flow is extant comprises:
  circuitry for presenting the version of the first communication data for the first communication flow using at least one first interaction silo of the third communication device; and
  circuitry for presenting the version of the second communication data for the second communication flow using at least one second interaction silo of the third communication device,
  wherein there is at least one different interaction silo between or among: (i) the at least one first interaction silo and (ii) the at least one second interaction silo.

16. The machine of claim 15, wherein:
  the circuitry for presenting the version of the first communication data for the first communication flow using at least one first interaction silo of the third communication device includes at least:
    circuitry for playing the version of the first communication data for the first communication flow using at least one speaker of the third communication device; and
  the circuitry for presenting the version of the second communication data for the second communication flow using at least one second interaction silo of the third communication device includes at least:
    circuitry for displaying the version of the second communication data for the second communication flow using at least one display screen of the third communication device.

17. The machine of claim 1, wherein the circuitry for presenting via the third communication device at least one of: (i) a version of the first communication data while the second communication flow is extant or (ii) a version of the second communication data while the first communication flow is extant comprises:
  circuitry for presenting the version of the first communication data for the first communication flow and the version of the second communication data for the second communication flow using at least one common interaction silo of the third communication device.

18. The machine of claim 1, further comprising:
  circuitry for associating at least one of: (i) at least a first user interaction communication modality with at least one first identifier corresponding to at least one of the first communication device or the first user or (ii) at least a second user interaction communication modality with at least one second identifier corresponding to at least one of the second communication device or the second user.

19. The machine of claim 1, further comprising:
  circuitry for sending to the second communication device at least one message indicative that a first user interaction communication modality corresponding to the first communication device has changed to a different user interaction communication modality.

20. The machine of claim 1, wherein the circuitry for receiving first communication data for the first communication flow that is associated with at least one of a first communication device or a first user comprises:
  circuitry for receiving at least one message indicative that a first user interaction communication modality corresponding to the first communication device has changed to a different user interaction communication modality.

21. The machine of claim 20, wherein the circuitry for effectuating at least one conversion with respect to at least one of the first communication data or the second communication data to cause communication data to be converted from corresponding to one type of user interaction communication modality to corresponding to another type of user interaction communication modality comprises:
  circuitry for effectuating that is configured to be operable at least partially responsive to the at least one message that is indicative that the first user interaction communication modality corresponding to the first communication device has changed to the different user interaction communication modality.

22. The machine of claim 1, wherein the circuitry for receiving first communication data for the first communication flow that is associated with at least one of a first communication device or a first user comprises:
  circuitry for receiving first converted communication data, the first communication data including at least the first converted communication data as converted from corresponding to the one type of user interaction communication modality to corresponding to the other type of user interaction communication modality.

23. The machine of claim 22, wherein the version of the first communication data includes at least the first converted communication data; and wherein the circuitry for presenting via the third communication device at least one of: (i) a version of the first communication data while the second communication flow is extant or (ii) a version of the second communication data while the first communication flow is extant includes at least:
  circuitry for presenting via the third communication device the first converted communication data.

24. The machine of claim 22, further comprising:
  circuitry for sending the first converted communication data to the second communication device.

25. The machine of claim 22, wherein the circuitry for receiving first converted communication data, the first communication data including at least the first converted communication data as converted from corresponding to the one type of user interaction communication modality to corresponding to the other type of user interaction communication modality, comprises:
  circuitry for receiving the first converted communication data from at least one other device, the first communication data comprising the first converted communication data as converted from corresponding to the one type of user interaction communication modality to corresponding to the other type of user interaction communication modality by the at least one other device.

26. The machine of claim 1, wherein the circuitry for presenting via the third communication device at least one of: (i) a version of the first communication data while the second communication flow is extant or (ii) a version of the second communication data while the first communication flow is extant comprises:

circuitry for presenting via the third communication device at least one of: (i) at least a converted version of the first communication data while the second communication flow is extant or (ii) at least a converted version of the second communication data while the first communication flow is extant.

27. The machine of claim 1, wherein the circuitry for initiating a first communication flow and a second communication flow from a third communication device comprises:

initiating at least one call with at least one of (i) the first communication device or (ii) the first user.

28. The machine of claim 1, wherein the circuitry for initiating a first communication flow and a second communication flow from a third communication device comprises:

initiating at least one real-time communication session with at least one of (i) the second communication device or (ii) the second user.

29. The machine of claim 1, wherein the machine forms at least a part of the third communication device.

30. A third communication device comprising:

means for initiating a first communication flow and a second communication flow from the third communication device;

means for receiving first communication data for the first communication flow that is associated with at least one of a first communication device or a first user;

means for receiving second communication data for the second communication flow that is associated with at least one of a second communication device or a second user;

means for effectuating at least one conversion with respect to at least one of the first communication data or the second communication data to cause communication data to be converted from corresponding to one type of user interaction communication modality to corresponding to another type of user interaction communication modality; and means for presenting via the third communication device at least one of: (i) a version of the first communication data while the second communication flow is extant or (ii) a version of the second communication data while the first communication flow is extant.

31. A process comprising:

initiating a first communication flow and a second communication flow from a third communication device;

receiving first communication data for the first communication flow that is associated with at least one of a first communication device or a first user;

receiving second communication data for the second communication flow that is associated with at least one of a second communication device or a second user;

effectuating at least one conversion with respect to at least one of the first communication data or the second communication data to cause communication data to be converted from corresponding to one type of user interaction communication modality to corresponding to another type of user interaction communication modality; and presenting via the third communication device at least one of: (i) a version of the first communication data while the second communication flow is extant or (ii) a version of the second communication data while the first communication flow is extant, wherein at least one of: (i) the initiating a first communication flow and a second communication flow, (ii) the receiving first communication data, (iii) the receiving second communication data, (iv) the effectuating at least one conversion, or (v) the presenting via the third communication device is at least partially implemented using at least the third communication device.

\* \* \* \* \*